(12) United States Patent
Sugio et al.

(10) Patent No.: US 10,129,561 B2
(45) Date of Patent: *Nov. 13, 2018

(54) VIDEO ENCODING METHOD, VIDEO ENCODING APPARATUS, VIDEO DECODING METHOD, VIDEO DECODING APPARATUS, AND VIDEO ENCODING/DECODING APPARATUS

(71) Applicant: Sun Patent Trust, New York, NY (US)

(72) Inventors: Toshiyasu Sugio, Osaka (JP); Takahiro Nishi, Nara (JP); Youji Shibahara, Tokyo (JP); Kyoko Tanikawa, Osaka (JP); Hisao Sasai, Osaka (JP); Toru Matsunobu, Osaka (JP)

(73) Assignee: SUN PATENT TRUST, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/140,949

(22) Filed: Apr. 28, 2016

(65) Prior Publication Data

US 2016/0241867 A1  Aug. 18, 2016

Related U.S. Application Data

(63) Continuation of application No. 13/565,384, filed on Aug. 2, 2012.

(Continued)

(51) Int. Cl.
*H04N 19/172* (2014.01)
*H04N 19/52* (2014.01)
(Continued)

(52) U.S. Cl.
CPC ........... *H04N 19/52* (2014.11); *H04N 19/105* (2014.11); *H04N 19/139* (2014.11);
(Continued)

(58) Field of Classification Search
None
See application file for complete search history.

(56) References Cited

U.S. PATENT DOCUMENTS

| | | | |
|---|---|---|---|
| 5,905,535 | A | 5/1999 | Kerdranvat |
| 5,995,080 | A | 11/1999 | Biro et al. |

(Continued)

FOREIGN PATENT DOCUMENTS

| | | |
|---|---|---|
| CN | 1525762 | 9/2004 |
| CN | 1537390 | 10/2004 |

(Continued)

OTHER PUBLICATIONS

Parsing Robustness for Merge/AMVP, Joint Collaborative Team on Video Coding (JCT-VC) of ITU-T SG16 WP3 and ISO/IEC JTC1/SC29/WG11. 6th Meeting: Torino, IT, Jul. 14-22, 2011.*

(Continued)

*Primary Examiner* — Mohammed S Rahaman
(74) *Attorney, Agent, or Firm* — Greenblum & Bernstein, P.L.C.

(57) ABSTRACT

Various embodiments for deriving a motion vector predictor for a current block are provided. At least one first candidate of a predictor of the motion vector for the current block is derived from a first motion vector of a first block that is adjacent to the current block in the current picture. At least one second candidate of the predictor is derived from a second motion vector of a second block that is included in a picture that is different from the current picture when a number of the first candidate is less than a maximum number. A zero motion vector is added as a third candidate of the predictor when a sum of the numbers of the first candidate and the second candidate is less than the maximum number. The third candidate is added until a total number of candidates is equal to the maximum number.

2 Claims, 53 Drawing Sheets

Related U.S. Application Data

(60) Provisional application No. 61/514,643, filed on Aug. 3, 2011.

(51) Int. Cl.
  *H04N 19/105* (2014.01)
  *H04N 19/139* (2014.01)
  *H04N 19/176* (2014.01)
  *H04N 19/70* (2014.01)
  *H04N 19/46* (2014.01)
  *H04N 19/513* (2014.01)

(52) U.S. Cl.
  CPC ......... *H04N 19/172* (2014.11); *H04N 19/176* (2014.11); *H04N 19/46* (2014.11); *H04N 19/513* (2014.11); *H04N 19/70* (2014.11)

(56) References Cited

U.S. PATENT DOCUMENTS

| | | |
|---|---|---|
| 6,192,080 B1 | 2/2001 | Sun et al. |
| 6,424,676 B1 | 7/2002 | Kono et al. |
| 6,427,027 B1 | 7/2002 | Suzuki et al. |
| 6,594,313 B1 | 7/2003 | Hazra et al. |
| 6,795,499 B1 | 9/2004 | Kato et al. |
| 6,842,483 B1 | 1/2005 | Au et al. |
| 7,154,952 B2 | 12/2006 | Tourapis et al. |
| 7,266,147 B2 | 9/2007 | Deshpande |
| 7,301,482 B1 | 11/2007 | Oberg |
| 7,372,905 B2 | 5/2008 | Foo et al. |
| 7,394,851 B2 | 7/2008 | Kato et al. |
| 7,660,354 B2 | 2/2010 | Shi et al. |
| 7,664,180 B2 | 2/2010 | Kondo et al. |
| 7,680,186 B2 | 3/2010 | Lee et al. |
| 7,697,783 B2 | 4/2010 | Lee et al. |
| 7,702,168 B2 | 4/2010 | Thoreau et al. |
| 7,742,526 B2 | 6/2010 | Kondo et al. |
| 7,746,929 B2 | 6/2010 | Valente |
| 7,801,219 B2 | 9/2010 | Kondo et al. |
| 7,835,436 B2 | 11/2010 | Aridome et al. |
| 7,852,936 B2 | 12/2010 | Mukerjee et al. |
| 7,856,060 B2 | 12/2010 | Kondo et al. |
| 7,940,845 B2 | 5/2011 | Kondo et al. |
| 8,005,144 B2 | 8/2011 | Ji et al. |
| RE43,062 E | 1/2012 | Deshpande |
| 8,175,444 B2 | 5/2012 | Kang et al. |
| 8,180,201 B2 | 5/2012 | Kang et al. |
| 8,190,003 B2 | 5/2012 | Kang et al. |
| 8,208,541 B2 | 6/2012 | Iguchi et al. |
| 8,208,544 B2 | 6/2012 | Song et al. |
| 8,249,147 B2 | 8/2012 | Watanabe et al. |
| 8,275,235 B2 | 9/2012 | Kang et al. |
| 8,325,819 B2 | 12/2012 | Karczewicz |
| 8,355,438 B2 | 1/2013 | Shimizu et al. |
| 8,374,245 B2 | 2/2013 | Tourapis et al. |
| 8,379,722 B2 | 2/2013 | Tourapis et al. |
| 8,396,344 B2 | 3/2013 | Kang et al. |
| 8,538,248 B2 | 9/2013 | Kang et al. |
| 8,542,977 B2 | 9/2013 | Kang et al. |
| 8,565,314 B2 | 10/2013 | Karczewicz et al. |
| 8,599,926 B2 | 12/2013 | Karczewicz |
| 8,670,486 B2 | 3/2014 | Hannuksela |
| 8,675,735 B2 | 3/2014 | Shimizu et al. |
| 8,718,141 B2 | 5/2014 | Kondo et al. |
| 8,761,258 B2 | 6/2014 | Au et al. |
| 8,774,280 B2 | 7/2014 | Tourapis et al. |
| 8,873,630 B2 | 10/2014 | Tourapis et al. |
| 9,185,427 B2 | 11/2015 | Tourapis et al. |
| RE45,983 E | 4/2016 | Deshpande |
| 9,319,700 B2 | 4/2016 | Karczewicz |
| 2003/0202605 A1 | 10/2003 | Hazra et al. |
| 2004/0001546 A1 | 1/2004 | Tourapis et al. |
| 2004/0008786 A1 | 1/2004 | Boyce |
| 2004/0028134 A1 | 2/2004 | Subramaniyan et al. |
| 2004/0047418 A1 | 3/2004 | Tourapis et al. |
| 2004/0052507 A1 | 3/2004 | Kondo et al. |
| 2004/0086044 A1 | 5/2004 | Kondo et al. |
| 2004/0136461 A1 | 7/2004 | Kondo et al. |
| 2004/0146109 A1 | 7/2004 | Kondo et al. |
| 2004/0179620 A1 | 9/2004 | Foo et al. |
| 2004/0190606 A1 | 9/2004 | Deshpande |
| 2004/0223551 A1 | 11/2004 | Hannuksela |
| 2004/0234143 A1 | 11/2004 | Hagai et al. |
| 2004/0264566 A1 | 12/2004 | Kato et al. |
| 2005/0013497 A1 | 1/2005 | Hsu et al. |
| 2005/0025244 A1 | 2/2005 | Lee et al. |
| 2005/0062885 A1 | 3/2005 | Kadono et al. |
| 2005/0078683 A1 | 4/2005 | Page |
| 2005/0141612 A1 | 6/2005 | Abe et al. |
| 2005/0152452 A1 | 7/2005 | Suzuki |
| 2005/0152682 A1 | 7/2005 | Kang et al. |
| 2005/0185928 A1 | 8/2005 | Kang et al. |
| 2005/0213828 A1 | 9/2005 | Thoreau et al. |
| 2005/0243927 A1 | 11/2005 | Hubrich et al. |
| 2005/0243928 A1 | 11/2005 | Hubrich et al. |
| 2006/0023790 A1 | 2/2006 | Tsai et al. |
| 2006/0050778 A1 | 3/2006 | Aridome et al. |
| 2006/0088094 A1 | 4/2006 | Cieplinski et al. |
| 2006/0088286 A1 | 4/2006 | Shibata et al. |
| 2006/0182436 A1 | 8/2006 | Tabuchi et al. |
| 2006/0204228 A1 | 9/2006 | Kang et al. |
| 2006/0209963 A1 | 9/2006 | Valente |
| 2006/0215999 A1 | 9/2006 | Kang et al. |
| 2006/0216000 A1 | 9/2006 | Kang et al. |
| 2006/0233530 A1 | 10/2006 | Kang et al. |
| 2006/0239358 A1 | 10/2006 | Soh et al. |
| 2006/0269153 A1 | 11/2006 | Shi et al. |
| 2006/0280253 A1 | 12/2006 | Tourapis et al. |
| 2006/0291556 A1 | 12/2006 | Watanabe et al. |
| 2007/0014358 A1 | 1/2007 | Tourapis et al. |
| 2007/0014360 A1 | 1/2007 | Botzko et al. |
| 2007/0025621 A1 | 2/2007 | Lee et al. |
| 2007/0030899 A1 | 2/2007 | Iguchi et al. |
| 2007/0041452 A1 | 2/2007 | Kondo et al. |
| 2007/0110156 A1 | 5/2007 | Ji et al. |
| 2007/0154103 A1 | 7/2007 | Au et al. |
| 2007/0183499 A1 | 8/2007 | Kimata et al. |
| 2007/0200949 A1 | 8/2007 | Walker et al. |
| 2008/0063060 A1 | 3/2008 | Kondo et al. |
| 2008/0063061 A1 | 3/2008 | Kondo et al. |
| 2008/0063075 A1 | 3/2008 | Kondo et al. |
| 2008/0069231 A1 | 3/2008 | Kondo et al. |
| 2008/0069232 A1 | 3/2008 | Kondo et al. |
| 2008/0084927 A1 | 4/2008 | Rosenzweig et al. |
| 2008/0089420 A1 | 4/2008 | Karczewicz |
| 2008/0089422 A1 | 4/2008 | Karczewicz |
| 2008/0089423 A1 | 4/2008 | Karczewicz |
| 2008/0089424 A1 | 4/2008 | Karczewicz et al. |
| 2008/0117978 A1 | 5/2008 | Kapasi et al. |
| 2008/0175491 A1 | 7/2008 | Kondo |
| 2008/0219350 A1 | 9/2008 | Guo et al. |
| 2009/0074069 A1 | 3/2009 | Jeon |
| 2009/0147855 A1 | 6/2009 | Song et al. |
| 2009/0257495 A1 | 10/2009 | Chujoh et al. |
| 2009/0304084 A1 | 12/2009 | Hallapuro et al. |
| 2010/0086053 A1 | 4/2010 | Okada et al. |
| 2010/0118939 A1 | 5/2010 | Shimizu et al. |
| 2010/0124273 A1 | 5/2010 | Divorra Escoda et al. |
| 2010/0135387 A1 | 6/2010 | Divorra Escoda et al. |
| 2010/0177824 A1 | 7/2010 | Koo et al. |
| 2010/0284465 A1 | 11/2010 | Benzler et al. |
| 2011/0038420 A1 | 2/2011 | Lee et al. |
| 2011/0080954 A1 | 4/2011 | Bossen et al. |
| 2011/0090969 A1 | 4/2011 | Sung et al. |
| 2011/0113451 A1 | 5/2011 | Kang et al. |
| 2011/0176612 A1 | 7/2011 | Tsai et al. |
| 2011/0194608 A1 | 8/2011 | Rusert et al. |
| 2011/0194609 A1 | 8/2011 | Rusert et al. |
| 2011/0206123 A1 | 8/2011 | Panchal et al. |
| 2011/0261882 A1 | 10/2011 | Zheng et al. |
| 2011/0286527 A1 | 11/2011 | Kadono et al. |
| 2012/0008688 A1 | 1/2012 | Tsai et al. |
| 2012/0106645 A1 | 5/2012 | Lin et al. |
| 2012/0128060 A1 | 5/2012 | Lin et al. |

(56) References Cited

U.S. PATENT DOCUMENTS

| | | |
|---|---|---|
| 2012/0128072 A1 | 5/2012 | Kobayashi et al. |
| 2012/0134415 A1 | 5/2012 | Lin et al. |
| 2012/0195368 A1 | 8/2012 | Chien et al. |
| 2012/0207221 A1 | 8/2012 | Aono et al. |
| 2012/0230408 A1 | 9/2012 | Zhou |
| 2012/0243609 A1 | 9/2012 | Zheng et al. |
| 2012/0263235 A1 | 10/2012 | Sugio et al. |
| 2012/0307905 A1 | 12/2012 | Kim et al. |
| 2012/0320969 A1 | 12/2012 | Zheng et al. |
| 2012/0320984 A1* | 12/2012 | Zhou .................. H04N 19/50 375/240.16 |
| 2013/0023801 A1 | 1/2013 | Wang et al. |
| 2013/0101038 A1 | 4/2013 | Shimizu et al. |
| 2013/0107959 A1 | 5/2013 | Park et al. |
| 2013/0148737 A1 | 6/2013 | Tourapis et al. |
| 2013/0208798 A1 | 8/2013 | Tourapis et al. |
| 2014/0037003 A1 | 2/2014 | Kadono et al. |
| 2014/0037009 A1 | 2/2014 | Kadono et al. |
| 2014/0105302 A1 | 4/2014 | Takehara et al. |
| 2014/0140408 A1 | 5/2014 | Lee et al. |
| 2014/0190606 A1 | 7/2014 | Takemoto |
| 2014/0241434 A1 | 8/2014 | Lin et al. |
| 2014/0301472 A1 | 10/2014 | Kadono et al. |
| 2015/0016527 A1 | 1/2015 | Tourapis et al. |
| 2015/0288968 A1 | 10/2015 | Kadono et al. |
| 2015/0312585 A1 | 10/2015 | Kadono et al. |
| 2016/0088311 A1 | 3/2016 | Kadono et al. |
| 2016/0094857 A1 | 3/2016 | Kadono et al. |
| 2016/0094858 A1 | 3/2016 | Kadono et al. |
| 2016/0134890 A1 | 5/2016 | Tourapis et al. |
| 2016/0269741 A1 | 9/2016 | Kim et al. |

FOREIGN PATENT DOCUMENTS

| | | |
|---|---|---|
| CN | 1578469 | 2/2005 |
| CN | 1833259 | 9/2006 |
| CN | 101090491 | 12/2007 |
| CN | 101198064 | 6/2008 |
| CN | 101379816 | 3/2009 |
| CN | 101600114 | 12/2009 |
| CN | 101860754 | 10/2010 |
| EP | 0314018 | 5/1989 |
| EP | 1414245 | 4/2004 |
| EP | 1521477 | 4/2005 |
| EP | 1906676 | 4/2008 |
| EP | 2250816 | 11/2010 |
| EP | 2448266 | 5/2012 |
| EP | 2717573 | 4/2014 |
| JP | 8-251601 | 9/1996 |
| JP | 10-224800 | 8/1998 |
| JP | 2002-152750 | 5/2002 |
| JP | 2002-534014 | 10/2002 |
| JP | 2005-136979 | 5/2005 |
| JP | 2005-318576 | 11/2005 |
| JP | 2006-519517 | 8/2006 |
| JP | 2007-028617 | 2/2007 |
| JP | 2007-142637 | 6/2007 |
| JP | 2008-211697 | 9/2008 |
| JP | 2008-283490 | 11/2008 |
| JP | 2009-124748 | 6/2009 |
| JP | 2010-529811 | 8/2010 |
| JP | 2013-517853 | 5/2013 |
| JP | 2014-514814 | 6/2014 |
| KR | 10-2007-0120416 | 12/2007 |
| KR | 1020090058954 | 6/2009 |
| RU | 2381630 | 10/2005 |
| RU | 2310231 | 11/2007 |
| RU | 2387093 | 4/2010 |
| RU | 2009114363 | 10/2010 |
| RU | 2419244 | 5/2011 |
| TW | 545058 | 8/2003 |
| TW | 200604847 | 2/2006 |
| TW | I259726 | 8/2006 |
| TW | I264227 | 10/2006 |
| TW | 2007-42443 | 11/2007 |
| TW | I335183 | 11/2008 |
| TW | I317107 | 11/2009 |
| TW | I325281 | 5/2010 |
| TW | I328357 | 8/2010 |
| TW | I329843 | 9/2010 |
| TW | I330976 | 9/2010 |
| TW | I331877 | 10/2010 |
| WO | 2004/014060 | 2/2004 |
| WO | 2004/088988 | 10/2004 |
| WO | 2005/013201 | 2/2005 |
| WO | 2006/019093 | 2/2006 |
| WO | 2007/018626 | 2/2007 |
| WO | 2008/086197 | 7/2008 |
| WO | 2009/011501 | 1/2009 |
| WO | 2009/051419 | 4/2009 |
| WO | 2009/115901 | 9/2009 |
| WO | 2009/126260 | 10/2009 |
| WO | 2010/148919 | 12/2010 |
| WO | 2011/046008 | 4/2011 |
| WO | 2011/047994 | 4/2011 |
| WO | 2011/062392 | 5/2011 |
| WO | 2011/064673 | 6/2011 |
| WO | 2011/103482 | 8/2011 |
| WO | 2012/128903 | 9/2012 |
| WO | 2012/173415 | 12/2012 |
| WO | 2013/001803 | 1/2013 |

OTHER PUBLICATIONS

Guillaume Laroche et al: "Robust solution for the AMVP parsing issue" MPEG Meeting; 21-3-2811-25-3-2811; Geneva; (Motion Picture Expert Group, ISO/I EC JTC1/SC29/WG11).

Extended European Search Report from European Patent Office (EPO) in European Patent Application No. 12793067.5, dated Jan. 5, 2016.

Guillaume Laroche et al.: "Competition Based Prediction for Skip Mode Motion Vector Using Macroblock Classification for the H.264 JM KTA Software", Advanced Concepts for Intelligent Vision Systems, Lecture Notes in Computer Science pp. 789-799, Springer Berlin Heidelberg, XP19069087 (Aug. 28, 2007).

Official Communication from European Patent Office (EPO) in European Patent Application No. 12819464.4, dated Apr. 6, 2016.

Office Action issued by Taiwan Intellectual Property Office (TIPO) in Taiwanese Patent Appl. No. 101128027, dated Sep. 21, 2015, along with a partial English language translation thereof.

Yunfei Zheng et al., Extended Motion Vector Prediction for Bi predictive Mode, Joint Collaborative Team on Video Coding (JCT-VC) of ITU-T SG 16 WP3 and ISO/IEC JTC1/SC29/WG11, 5$^{th}$ Meeting: Geneva, Mar. 2011(Mar. 19, 2011), JCTVC-E343, pp. 1-4.

Toshiyasu Sugio and Takahiro Nishi, "Parsing Robustness for Merge/AMVP", Joint Collaborative Team on Video Coding (JCT-VC) of ITU-T SG16 WP3 and ISO/IEC JTC1/SC29/WG11, 6$^{th}$ Meeting: Torino IT, Jul. 2011 (Jul. 22, 2011), JCTV-F470 r4.

Extended European Search Report (EESR) from European Patent Office (EPO) in European Patent Application No. 12793037.8, dated Nov. 17, 2014 (corrected version).

Thomas Wiegand et al., "WD3: Working Draft 3 of High-Efficiency Video Coding", Joint Collaborative Team on Video Coding (JCT-VC) of ITU-T SG16 WP3 and ISO/IEC JTC1/SC29/WG11, JCTVC-E603, Ver.2, 5th Meeting: Geneva, CH, Mar. 16-23, 2011.

Extended European Search Report issued for European Patent Application No. 12771702.3 , dated Feb. 4, 2014.

Steffen Kamp et al., "Multihypothesis prediction using decoder side-motion vector derivation in inter-frame video coding", Visual Communications and Image Processing; Jan. 20, 2009-Jan. 22, 2009; San Jose, Jan. 20, 2009 (Jan. 20, 2009), XP030081712.

Byeong-Moon Jeon, "New syntax for Bi-directional mode in MH pictures", 3. JVT Meeting; 60. MPEG Meeting; May 6, 2002-May 10, 2002; Fairfax, US; (Joint Video Team of ISO/IEC JTC1/SC29/ WG11 and ITU-T SG16 Q.6), No. JVT-C121, May 10, 2002 (May 10, 2002), XP030005233, ISSN: 0000-0442.

Yoshinori Suzuki et al., "Extension of uni-prediction simplification in B slices", 95. MPEG Meeting; Jan. 24, 2011-Jan. 28, 2011;

(56) References Cited

OTHER PUBLICATIONS

Daegu; (Motion Picture Expert Group or ISO/IEC JTC1/SC29/WG11) No. m19400, Jan. 25, 2011 (Jan. 25, 2011), XP030047967.
Markus Flierl et al., "Generalized B pictures and the draft H.264/AVC video-compression standard", IEEE Transactions on Circuits and Systems for Video Technology, IEEE Service Center, Piscataway, NJ, US, vol. 13, No. 7, Jul. 1, 2003 (Jul. 1, 2003), pp. 587-597, XP011099251, ISSN: 1051-8215,DOI: 10.1109/TCSVT.2003.814963.
Hideaki Kimata et al., "Spatial temporal adaptive direct prediction for Bi-Directional prediction coding on H.264", 23. Picture Coding Symposium;Apr. 23, 2003-Apr. 25, 2003; Saint Malo, Apr. 23, 2003 (Apr. 23, 2003), XP030080000.
Athanasios Leontaris et al., "Weighted prediction methods for improved motion compensation", Image Processing (ICIP), 2009 16th IEEE International Conference on, IEEE, Piscataway, NJ, USA, Nov. 7, 2009 (Nov. 7, 2009), pp. 1029-1032, XP031628457, ISBN:978-1-4244-5653-6.
International Preliminary Report on Patentability issued for International Application No. PCT/JP2012/006110, dated Feb. 18, 2014.
Benjamin Bross et al., "WD4: Working Draft 4 of High-Efficiency Video Coding", Joint Collaborative Team on Video Coding (JCT-VC) of ITU-T SG16 WP3 and ISO/IEC JTC1/SC29/WG11 6th Meeting: Torino, IT, Oct. 8, 2011, [JCTVC-F803] (version 5).
Extended European Search Report issued for European Patent Application No. 12792164.1, dated Sep. 11, 2014.
Wiegand T et al: "High Efficiency Video Coding (HEVC) text specification Working Draft 1", 3. JCT-VC MEETING; 95. MPEG Meeting; Oct. 7, 2010-Oct. 15, 2010; Guangzhou; (Joint Collaborative Team on Video Coding of ISO/IECJTC1/SC29/WG11 and ITU-T SG.16); URL: http://wftp3.itu.int/av-arch/jctvc-site/, No. JCTVC-C403, Jan. 6, 2011 (Jan. 6, 2011), XP030008032, ISSN: 0000-0018.
Thomas Wiegand et al: "WD2: Working Draft 2 of High-Efficiency Video Coding", 4. JCT-VC MEETING; 95. MPEG Meeting; Jan. 20, 2011-Jan. 28, 2011; Daegu; (Joint Collaborative Team on Video Coding of ISO/IEC JTC1/SC29/WG11 and ITU-T SG.16); URL: http://wftp3.itu.int/av-arch/jctvc-site/, No. JCTVC-D503, Apr. 15, 2011 (Apr. 15, 2011), XP030113315, pp. 62-63.
Lim J et al: "Extended merging scheme using motion-hypothesis prediction", 2. JVT-VC Meeting; Jul. 21, 2010-Jul. 28, 2010; Geneva; (Joint Collaborativeteam on Video Coding of ISO/IEC JTC1/SC29/WG11 and ITU-T SG.16); URL: http://wftp3.itu.int/av-arch/jctvc-site/, No. JCTVC-B023, Jul. 23, 2010 (Jul. 23, 2010), XP030007603, ISSN: 0000-0048.
Jungyoup Yang et al: "Motion Vector Coding with Optimal Predictor", 87. MPEG Meeting; Feb. 2, 2009-Feb. 6, 2009; Lausanne; (Motion Picture Expert Group or ISO/IEC JTC1/SC29/WG11), No. M16209, Jan. 29, 2009 (Jan. 29, 2009), XP030044806.
Toshiyasu Sugio et al: "Modified usage of predicted motion vectors in forward directional bi-predictive coding frame", 4. JCT-VC Meeting; 95. MPEG Meeting; Jan. 20, 2011-Jan. 28, 2011; Daegu; (Joint Collaborative Team on Video Coding of ISO/IEC JTC1/SC29/WG11and ITU-T SG.16); URL: http://wftp3.itu.int/av-arch/jctvc-site/, No. JCTVC-D274, Jan. 15, 2011 (Jan. 15, 2011), XP030008314, ISSN: 0000-0013.
Shijun Sun and Shawmin Lei: "Predictive motion estimation with global motion predictor", Visual Communications and Image Processing; Jan. 20, 2004-Jan. 20, 2004; San Jose, Jan. 20, 2004 (Jan. 20, 2004), XP030081305.
Bross B et al: "CE9: Motion Vector Coding Test Report", 4. JCT-VC Meeting; 95. MPEG Meeting; Jan. 20, 2011-Jan. 28, 2011; Daegu: (Joint Collaborative Team on Video Coding of ISO/IEC JTC1/SC29/WG11and ITU-T SG.16); URL: http://wftp3.itu.int/av-arch/jctvc-site/, No. JCTVC-D314, Jan. 15, 2011 (Jan. 15, 2011), XP030008354.
Y-J Chiu et al: "CE1 Subtest1: A joint proposal of candidate-based decoder-side motion vector derivation", 4. JCT-VC Meeting; 95. MPEG Meeting; Jan. 20, 2011-Jan. 28, 2011; Daegu: (Joint Collaborative Team on Video Coding of ISO/IEC JTC1/SC29/ WG11and ITU-T SG.16); URL: http://wftp3.itu.int/av-arch/jctvc-site/, No. JCTVC-D448, Jan. 25, 2011 (Jan. 25, 2011), XP030008487, ISSN: 0000-0013.
Guillaume Laroche et al.: "Robust solution for the AMVP parsing issue", Mar. 10, 2011, No. JCTVC-E219, Mar. 10, 2011 (Mar. 10, 2011), XP030008725, ISSN: 0000-0007.
Sugio T et al: "Parsing Robustness Merge/AMVP", 6. JCT-VC Meeting; 97. MPEG Meeting; Jul. 14, 2011-Jul. 22, 2011; Torino: (Joint Collaborative Team on Video Coding of ISO/IEC JTC1/SC29/WG11and ITU-T SG.16); URL: http://wftp3.itu.int/av-arch/jctvc-site/, No. JCTVC-F470, Jul. 1, 2011 (Jul. 1, 2011), XP030009493.
Chen J et al: "MVP index parsing with fixed Number of candidates", 6. JCT-VC Meeting; 97. MPEG Meeting; Jul. 14, 2011-Jul. 22, 2011; Torino: (Joint Collaborative Team on Video Coding of ISO/IEC JTC1/SC29/WG11 and ITU-T SG.16); URL: http://wftp3.itu.int/av-arch/jctvc-site/ No. JCTVC-F402, Jul. 2, 2011 (Jul. 2, 2011), XP030009425.
Extended European Search Report issued for European Patent Application No. 12789922.7, dated Oct. 1, 2014.
Zhou M et al: "A study on HM3.0 parsing throughput issue", 6. JCT-VC Meeting; 97. MPEG Meeting; Jul. 14, 2011-Jul. 22, 2011; Torino: (Joint Collaborative Team on Video Coding of ISO/IEC JTC1/SC29/WG11 and ITU-T SG.16); URL: http://wftp3.itu.int/av-arch/jctvc-site/, No. JCTVC-F068, Jul. 2, 2011 (Jul. 2, 2011), XP030009091.
Li (USTC) B et al: "An investigation on robust parsing", Mar. 11, 2011, No. JCTVC-E148, Mar. 11, 2011(Mar. 11, 2011), XP030008654, ISSN:0000-0007.
Extended European Search Report issued for European Patent Application No. 12793037.8, dated Oct. 2, 2014.
Extended European Search Report issued for European Patent Application No. 12793588.0, dated Oct. 2, 2014.
Extended European Search Report issued for European Patent Application No. 12819464.4, dated Nov. 12, 2014.
International Search Report from WIPO in International Patent Application No. PCT/JP2012/001351, dated May 22, 2012.
Thomas Wiegand et al., "WD2: Working Draft 2 of High-Efficiency Video Coding", Joint Collaborative Team on Video Coding (JCT-VC) of ITU-T SG16 WP3 and ISO/IEC JTC1/SC29/WG11, JCTVC-D503_r1, 4th Meeting: Daegu, KR, Jan. 20-28, 2011, pp. i-viii, 9-10, 85-94.
J. Jung and G. Clare, "Temporal MV predictor modification for MV-Comp, Skip, Direct and Merge schemes", Joint Collaborative Team on Video Coding (JCT-VC) of ITU-T SG16 WP3 and ISO/IEC JTC1/SC29/WG11, JCTVC-D164, $4^{th}$ Meeting: Daegu, KR, Jan. 20-28, 2011, pp. 1-5.
Hideki Takehara et al., "Bi-derivative merge candidate", Joint Collaborative Team on Video Coding (JCT-VC) of ITU-T SG16 WP3 and ISO/IEC JCT1/SC29/WG11, JCTVC-F372, $6^{th}$ Meeting: Torino, IT, Jul. 14-22, 2011, pp. 1-5.
Guillaume Laroche et al., "Robust solution for the AMVP parsing issue", Joint Collaborative Team on Video Coding (JCT-VC) of ITU-T SG16 WP3 and ISO/IEC JTC1/SC29/WG11, JCTVC-E219, $5^{th}$ Meeting: Geneva, CH, Mar. 16-23, 2011.
Minhua Zhou et al., "A study on HM2. 0 bitstream parsing and error resiliency issue", Joint Collaborative Team on Video Coding (JCT-VC) of ITU-T SG16 WP3 and ISO/IEC JTC1/SC29/WG11, JCTVC-E0118, $5^{th}$ Meeting: Geneva, CH, Mar. 16-23, 2011.
J. Jung et al., "Proposition for robust parsing with temporal predictor", Joint Collaborative Team on Video Coding (JCT-VC) of ITU-T SG16 WP3 and ISO/IEC JTC1/SC29/WG11, JCTVC-D197, $4^{th}$ Meeting: Daegu, KR, Jan. 20-28, 2011.
International Search Report from WIPO in International Patent Application No. PCT/JP2012/003316, dated Aug. 21, 2012.
Bin Li et al., "On merge candidate construction", Joint Collaborative Team on Video Coding (JCT-VC) of ITU-T SG16 WP3 and ISO/IEC JTC1/SC29/WG11, JCTVC-E146_r3, $5^{th}$ Meeting: Geneva, CH, Mar. 16-23, 2011, pp. 1-5.
International Search Report from WIPO in International Patent Application No. PCT/JP2012/003386, dated Aug. 28, 2012.
International Search Report from WIPO in International Patent Application No. PCT/JP2012/003416, dated Aug. 28, 2012.

(56) References Cited

OTHER PUBLICATIONS

International Search Report from WIPO in International Patent Application No. PCT/JP2012/003496, dated Aug. 28, 2012.
International Search Report from WIPO in International Patent Application No. PCT/JP2012/003493, dated Aug. 28, 2012.
Minhua Zhou et al., "A study on HM3.0 parsing throughput issue", Joint Collaborative Team on Video Coding (JCT-VC) of ITU-T SG16 WP3 and ISO/IEC JTC1/SC29/WG11, JCTVC-F068, 6th Meeting: Torino, IT, Jul. 14-22, 2011.
Benjamin Bross et al., "WD4: Working Draft 4 of High-Efficiency Video Coding", Joint Collaborative Team on Video Coding (JCT-VC) of ITU-T SG16 WP3 and ISO/IEC JTC1/SC29/WG11, JCTVC-F803_d2, Ver. 4, 6th Meeting: Torino, IT, Jul. 14-22, 2011.
International Search Report from WIPO in International Patent Application No. PCT/JP2012/006110, dated Jan. 8, 2013.
International Preliminary Report on Patentability from WIPO in International Patent Application No. PCT/JP2012/004924, dated Dec. 3, 2013.
Thomas Wiegand et al., "WD3: Working Draft 3 of High-Efficiency Video Coding", Joint Collaborative Team on Video Coding (JCT-VC) of ITU-T SG16 WP3 and ISO/IEC JTC1/SC29/WG11, Document: JCTVC-E603, Ver. 8, 5th Meeting: Geneva, CH, Mar. 16-23, 2011.
International Search Report from WIPO in International Patent Application No. PCT/JP2012/004924, dated Oct. 30, 2012.
Toshiyasu Sugio et al., "Parsing Robustness for Merge/AMVP", Joint Collaborative Team on Video Coding (JCT-VC) of ITU-T SG16 WP3 and ISO/IEC JTCI/SC29/WG11, 6th Meeting, Torino, IT, Jul. 14-22, 2011 [Document: JCTVC-F470].
Jianle Chen, "MVP index parsing with fixed number of candidates", Joint Collaborative Team on Video Coding (JCT-VC) of ITU-T SG16 WP3 and ISO/IEC JTCI/SC29/WG11, 6th Meeting, Torino, IT, Jul. 14-22, 2011 [Document: JCTVC-F402].
"Advanced Video Coding for Generic Audiovisual Services", ITU-T Recommendation H.264, Mar. 2010.
Thomas Wiegand et al., "WD3: Working Draft 3 of High-Efficiency Video Coding", Joint Collaborative Team on Video Coding (JCT-VC) of ITU-T SG16 WP3 and ISO/IEC JTC1/SC29/WG11, JCTVC-E603, 5th Meeting: Geneva, CH, Mar. 2011.
U.S. Appl. No. 13/477,606 to Toshiyasu Sugio et al., which was filed May 22, 2012.
U.S. Appl. No. 13/479,636 to Toshiyasu Sugio et al., which was filed May 24, 2012.
U.S. Appl. No. 13/479,669 to Toshiyasu Sugio et al., which was filed May 24, 2012.
U.S. Appl. No. 13/482,549 to Toshiyasu Sugio et al., which was filed May 29, 2012.
U.S. Appl. No. 13/482,411 to Toshiyasu Sugio et al., which was filed May 29, 2012.
Extended European Search Report issued for European Patent Application No. 12804429.4, dated Apr. 15, 2016.
J. Jung et al., "Proposition for robust parsing with temporal predictor", Joint Collaborative Team on Video Coding (JCT-VC) of ITU-T SG16 WP3 and ISO/IEC JTC1/SC29/WG11 4th Meeting: Daegu, KR, Jan. 20-28, 2011 [JCTVC-D197] WG11 No. m18957. XP30008237.
Yeping Su et al., "On motion vector competition", Joint Collaborative Team on Video Coding (JCT-VC) of ITU-T SG16 WP3 and ISO/IEC JTC1/SC29/WG11 3rd Meeting: Guangzhou, CN, Oct. 7-15, 2010 [JCTVC-C257] WG11 No. m18298. XP30007964.
Guillaume Laroche et al., "RD Optimized Coding for Motion Vector Predictor Selection" IEEE Transactions on Circuits and Systems for Video Technology, vol. 18, No. 9, Sep. 2008.
Martin Winken et al., "Description of video coding technology proposal by Fraunhofer HHI" Joint Collaborative Team on Video Coding (JCT-VC) of ITU-T SG16 WP3 and ISO/IEC JTC1/SC29/WG11 1st Meeting: Dresden, DE, Apr. 15-23, 2010 Document: JCTVC-A116.

Sugio T et al., "Parsing Robustness for Merge/AMVP", 97. MPEG Meeting; Jul. 18, 2011-Jul. 22, 2011; Torino, IT, (Motion Picture Expert Group or ISO/IEC JTC1/SC29/WG11) F-470 Version 6, Jul. 22, 2011 XP002758863.
Extended European Search Report issued for European Patent Application No. 12841970.2, dated Jun. 27, 2016.
Bin Li, Jizheng Xu, Feng Wu, Houqiang Li, "Constrained temporal motion vector prediction for error resilience", JCTVC-D139, Daegu, KR, Jan. 20-28, 2011.
Jian-Liang Lin, Yu-Wen Huang, Chih-Ming Fu, Ching-Yeh Chen, Yu-Pao Tsai, Shawmin Lei, "Syntax for AMVP Parsing Error Control", JCTVC-D126, Daegu, KR, Jan. 20-28, 2011.
Office Action dated Jul. 29, 2016 in U.S. Appl. No. 14/725,180.
Office Action from State Intellectual Property Office (SIPO) of the People's Republic of China in Chinese Patent Application No. 201280037093.4, dated Jul. 4, 2016, together with an English language translation of the Search report.
Notice of Allowance from Taiwan Intellectual Property Office (TIPO) in Taiwanese Patent Appl. No. 105105919, dated Jul. 1, 2016, along with an English language translation thereof.
Yunfei Zheng et al., Extended Motion Vector Prediction for Bi predictive Mode, Joint Collaborative Team on Video Coding (JCT-VC) of ITU-T SG 16 WP3 and ISO/IEC JTC1/SC29/WG11, 5th Meeting: Geneva, Mar. 2011(Mar. 19, 2011), JCTVC-E343, pp. 1-4.
Toshiyasu Sugio and Takahiro Nishi, "Parsing Robustness for Merge/AMVP", Joint Collaborative Team on Video Coding (JCT-VC) of ITU-T SG16 WP3 and ISO/IEC JTC1/SC29/WG11, 6th Meeting: Torino IT, Jul. 2011 (Jul. 22, 2011), JCTVC-F470 r4.
Toshiyasu Sugio et al., "Parsing Robustness for Merge/AMVP", Joint Collaborative Team on Video Coding (JCT-VC) of ITU-T SG16 WP3 and ISO/IEC JTC1/SC29/WG11, 6th Meeting, Torino, IT, Jul. 14-22, 2011 [Document: JCTVC-F470].
Office Action from U.S. Patent and Trademark Office (USPTO) in U.S. Appl. No. 15/434,094, dated May 5, 2017.
Office Action from U.S. Patent and Trademark Office (USPTO) in U.S. Appl. No. 15/228,009, dated May 30, 2017.
Office Action from United States Patent and Trademark Office (USPTO) in U.S. Appl. No. 13/536,309, dated Oct. 19, 2016.
Office Action from United States Patent and Trademark Office (USPTO) in U.S. Appl. No. 15/140,962, dated Oct. 26, 2016.
Office Action from U.S. Patent and Trademark Office (USPTO) in U.S. Appl. No. 14/725,180, dated Feb. 24, 2017.
Office Action from U.S. Patent and Trademark Office (USPTO) in U.S. Appl. No. 15/140,962, dated Mar. 15, 2017.
Office Action from U.S. Patent and Trademark Office (USPTO) in U.S. Appl. No. 13/652,643, dated Apr. 24, 2017.
Office Action from United States Patent and Trademark Office (USPTO) in U.S. Appl. No. 15/266,004, dated Jan. 19, 2017.
Office Action from United States Patent and Trademark Office (USPTO) in U.S. Appl. No. 15/379,993, dated Feb. 9, 2017.
Extended European Search Report from European Patent Office (EPO) in European Patent Appl. No. 16193061.5, dated Jan. 27, 2017.
Office Action from United States Patent and Trademark Office (USPTO) in U.S. Appl. No. 15/228,009, dated Nov. 16, 2016.
Office Action from United States Patent and Trademark Office (USPTO) in U.S. Appl. No. 15/140,921, dated Nov. 18, 2016.
Office Action from European Patent Office (EPO) in European Patent Appl. No. 12789922.7, dated Oct. 19, 2016.
Office Action from European Patent Office (EPO) in European Patent Appl. No. 12793588.0, dated Oct. 19, 2016.
Office Action from European Patent Office (EPO) in European Patent Appl. No. 12793037.8, dated Oct. 19, 2016.
Office Action from U.S. Patent and Trademark Office (USPTO) in U.S. Appl. No. 15/228,018, dated Jun. 14, 2017.
Summons to attend oral proceedings from European Patent Office (EPO) in European Patent Appl. No. 12789922.7, dated May 24, 2017.
Office Action from European Patent Office (EPO) in European Patent Appl. No. 12793067.5, dated Jun. 8, 2017.
Office Action from European Patent Office (EPO) in European Patent Appl. No. 12804429.4, dated Jun. 27, 2017.

(56) References Cited

OTHER PUBLICATIONS

Benjamin Bross et al., "WD4: Working Draft 4 of High-Efficiency Video Coding", Joint Collaborative Team on Video Coding (JCT-VC) of ITU-T SG16 WP3 and ISO/IEC JTC1/SC29/WG11 6th Meeting: Torino, IT, Jul. 14-22, 2011, JCTVC-F803_d6.
Office Action from U.S. Patent and Trademark Office (USPTO) in U.S. Appl. No. 14/725,180, dated Aug. 15, 2017.
Office Action from Intellectual Property Corporation of Malaysia in Malaysian Patent Appl. No. PI 2013702134, dated Aug. 30, 2017.
Office Action from Canadian Intellectual Property Office in Canadian Patent Appl. No. 2830036, dated Dec. 8, 2017.
Office Action from United States Patent and Trademark Office (USPTO) in U.S. Appl. No. 15/602,631, dated Nov. 22, 2017.
Office Action from United States Patent and Trademark Office (USPTO) in U.S. Appl. No. 15/729,006, dated Jan. 26, 2018.
Office Action from United States Patent and Trademark Office (USPTO) in U.S. Appl. No. 15/629,101, dated Jan. 26, 2018.
Office Action from United States Patent and Trademark Office (USPTO) in U.S. Appl. No. 14/725,180, dated Feb. 5, 2018.
Office Action from Canadian Intellectual Property Office in Canadian Patent Appl. No. 2834191, dated Feb. 8, 2018.
Office Action from European Patent Office (EPO) in European Patent Appl. No. 12793588.0, dated Feb. 14, 2018.
Office Action from European Patent Office (EPO) in European Patent Appl. No. 12793037.8, dated Feb. 14, 2018.
Office Action from Canadian Intellectual Property Office in Canadian Patent Appl. No. 2834123, dated Feb. 20, 2018.
Office Action from Canadian Intellectual Property Office in Canadian Patent Appl. No. 2834125, dated Feb. 20, 2018.
Office Action from Canadian Intellectual Property Office in Canadian Patent Appl. No. 2834190, dated Feb. 20, 2018.
Office Action from Canadian Intellectual Property Office in Canadian Patent Appl. No. 2836063, dated Mar. 16, 2018.
Summons to attend oral proceedings from European Patent Office (EPO) in European Patent Appl. No. 12819464.4, dated Mar. 5, 2018.
Office Action from United States Patent and Trademark Office (USPTO) in U.S. Appl. No. 15/228,009, dated Apr. 17, 2018.
Office Action from United States Patent and Trademark Office (USPTO) in U.S. Appl. No. 15/602,631, dated May 7, 2018.
Office Action from Canadian Intellectual Property Office in Canadian Patent Appl. No. 2843560, dated Apr. 30, 2018.
Office Action from United States Patent and Trademark Office (USPTO) in U.S. Appl. No. 13/652,643, dated Oct. 30, 2017.
Search and Examination Report from Intellectual Property Office of Singapore (IPOS) in Singapore Patent Appl. No. 2013078837, dated Sep. 26, 2016.
Office Action from European Patent Office (EPO) in European Patent Appl. No. 12792164.1, dated Oct. 6, 2016.
Office Action from European Patent Office (EPO) in European Patent Appl. No. 12819464.4, dated Oct. 19, 2016.
Yoshinori Suzuki et al., "Extension of uni-prediction simplification in B slices", Joint Collaborative Team on Video Coding (JCT-VC) of ITU-T SG16 WP3 and ISO/IEC JTC1/SC29/WG11 4th Meeting: Daegu, Korea, Jan. 20-28, 2011 Document: JCTVC-D421 WG11 No. m19400.
Office Action from Canadian Intellectual Property Office in Canadian Patent Appl. No. 2850595, dated Jun. 20, 2018.

* cited by examiner

| Motion vector predictor index for prediction direction 1 | Motion vector predictor candidate in prediction direction 1 |
|---|---|
| 0 | Adjacent block A (sMvL1_A, RefL1) |
| 1 | Adjacent block B (MvL1_B, RefL1) |
| 2 | Co-located block (MvL1_Col, RefL1) |
| 3 | Non-available prediction block (since adjacent block C is intra-predicted) |
| 4 | Adjacent block D (sMvL1_D, RefL1) |

When MvL1_B = MvL1_Col = sMvL1_D

→ Delete redundant candidate and non-available predictor candidate (b)

| Motion vector predictor index for prediction direction 1 | Motion vector predictor candidate in prediction direction 1 |
|---|---|
| 0 | Adjacent block A (sMvL1_A, RefL1) |
| 1 | Adjacent block B (MvL1_B, RefL1) |

The number of motion vector predictor candidates in prediction direction 1 = 2

FIG. 6

Motion vector predictor candidate list size = 2

| Motion vector predictor index | Assigned bit string |
|---|---|
| 0 | 0 |
| 1 | 1 |

Motion vector predictor candidate list size = 3

| Motion vector predictor index | Assigned bit string |
|---|---|
| 0 | 0 |
| 1 | 10 |
| 2 | 11 |

Motion vector predictor candidate list size = 4

| Motion vector predictor index | Assigned bit string |
|---|---|
| 0 | 0 |
| 1 | 10 |
| 2 | 110 |
| 3 | 111 |

Motion vector predictor candidate list size = 5

| Motion vector predictor index | Assigned bit string |
|---|---|
| 0 | 0 |
| 1 | 10 |
| 2 | 110 |
| 3 | 1110 |
| 4 | 1111 |

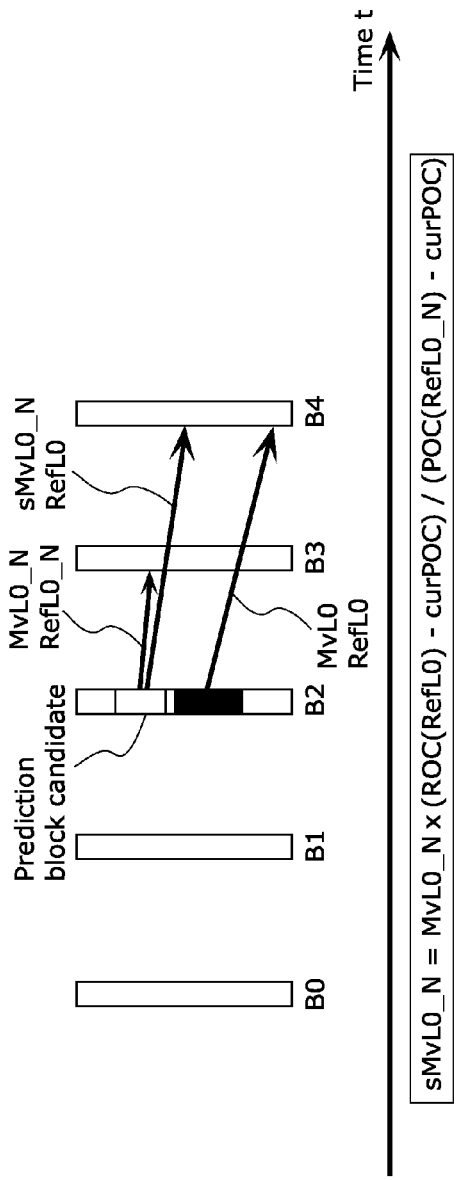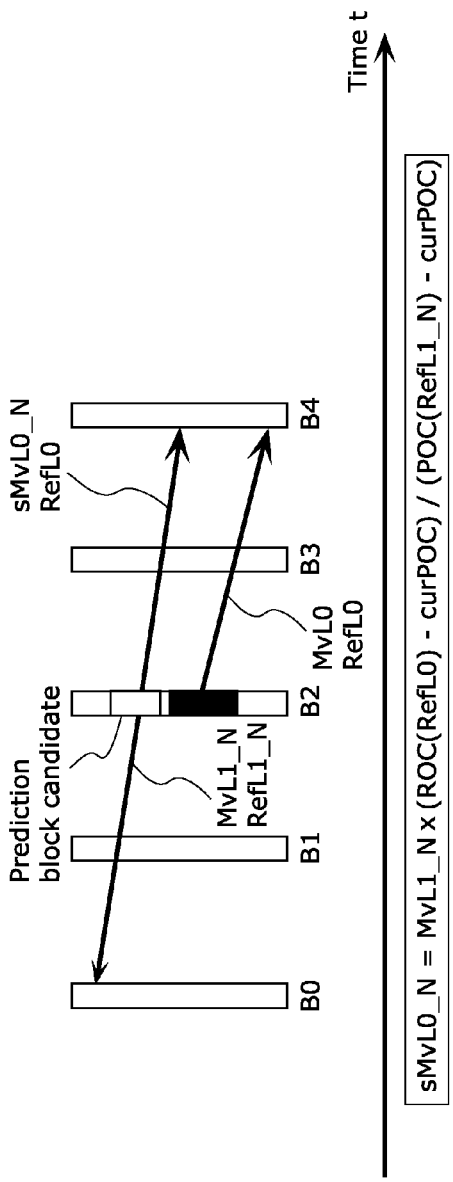

FIG. 12

| | prediction_unit(x0, y0, log2PUWidth, log2PUHeight, PartIdx, InferredMergeFlag){ | Descriptor |
|---|---|---|
| Prediction direction flag | if(skip_flag[x0][y0]){ | |
| | ... | |
| | } else if(PredMode == MODE_INTRA){ | |
| Motion vector predictor candidate list size = the number of motion vector predictor candidates | ... | |
| | } else {/* MODE_INTER */ | |
| | if(!InferredMergeFlag) | |
| | merge_flag[x0][y0] | u(I) \| ae(v) |
| | if(merge_flag[x0][y0] && NumMergeCand > 1){ | |
| | ... | |
| | } else { | |
| | if(slice_type == B) | |
| | inter_pred_flag[x0][y0] | ue(v) \| ae(v) |
| Motion vector predictor index | if(inter_pred_flag[x0][y0] == Pred_LC){ | |
| Motion vector predictor candidate list size = the number of motion vector predictor candidates | ... | |
| | if(NumMVPCand(LcToLx) > 1) | |
| | mvp_idx_lc[x0][y0] | ue(v) \| ae(v) |
| | } | |
| | else {/* Pred_L0 or Pred_BI */ | |
| | if(num_ref_idx_l0_active_minus1 > 0) | |
| | ... | |
| | if(NumMVPCand(L0) > 1) | |
| | mvp_idx_l0[x0][y0] | ue(v) \| ae(v) |
| | } | |
| Motion vector predictor index | if(inter_pred_flag[x0][y0] == Pred_BI){ | |
| Motion vector predictor candidate list size = the number of motion vector predictor candidates | ... | |
| | if(NumMVPCand(L1) > 1) | |
| | mvp_idx_l1[x0][y0] | ue(v) \| ae(v) |
| | } | |
| | } | |
| | } | |
| | } | |

Motion vector predictor index

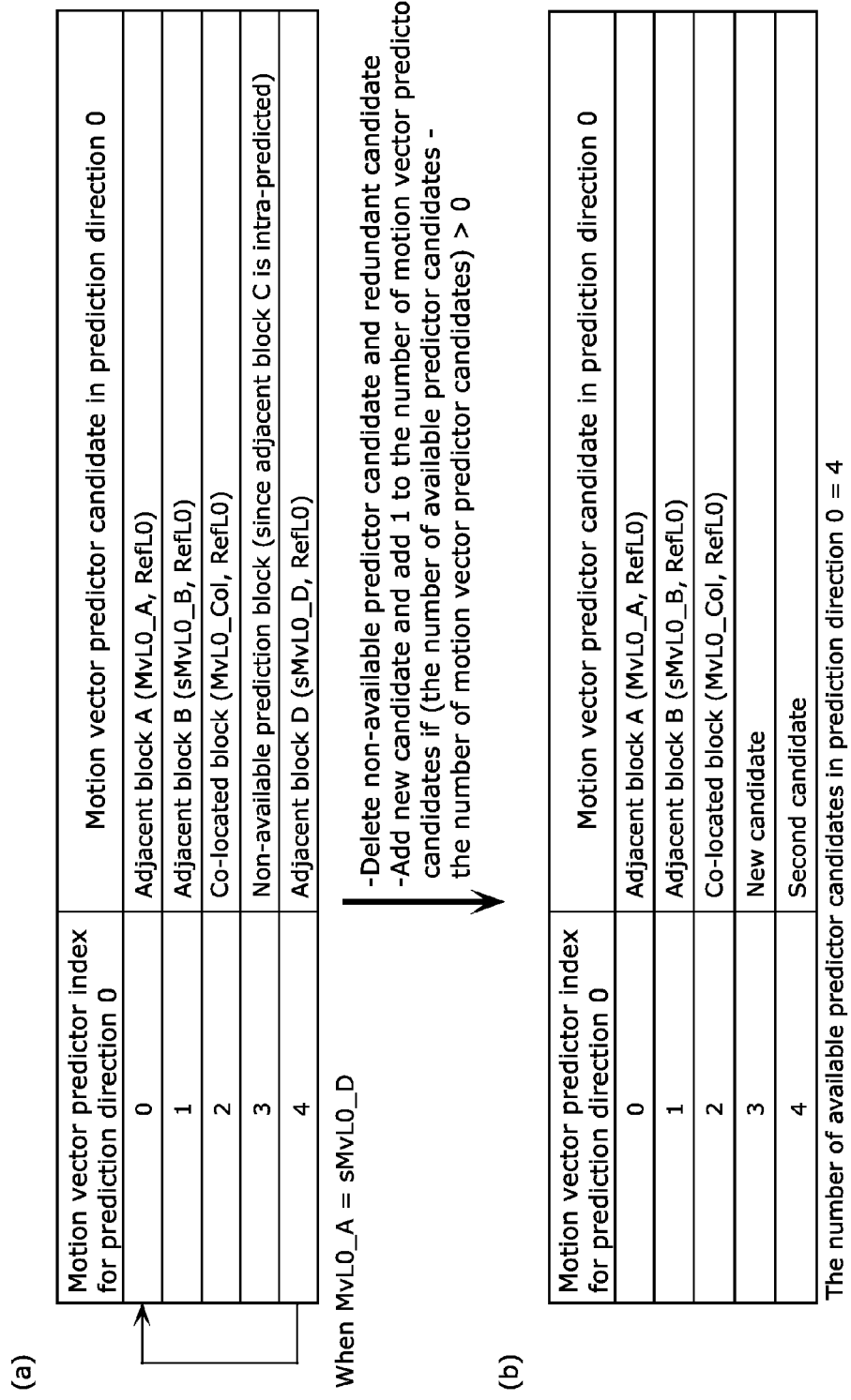

FIG. 15C (a)

| Motion vector predictor index for prediction direction 0 | Motion vector predictor candidate in prediction direction 0 |
|---|---|
| 0 | Second candidate |
| 1 | Second candidate |
| 2 | Second candidate |
| 3 | Second candidate |
| 4 | Second candidate |

When MvL0_A = sMvL0_D

→ -Add candidate other than non-available predictor candidate and redundant candidate to list (b)

| Motion vector predictor index for prediction direction 0 | Motion vector predictor candidate in prediction direction 0 |
|---|---|
| 0 | Adjacent block A (MvL0_A, RefL0) |
| 1 | Adjacent block B (sMvL0_B, RefL0) |
| 2 | Co-located block (MvL0_Col, RefL0) |
| 3 | Second candidate |
| 4 | Second candidate |

→ -Add new candidate and add 1 to the number of motion vector predictor candidates if (candidate list size - the number of motion vector predictor candidates) > 0

(c)

| Motion vector predictor index for prediction direction 0 | Motion vector predictor candidate in prediction direction 0 |
|---|---|
| 0 | Adjacent block A (MvL0_A, RefL0) |
| 1 | Adjacent block B (sMvL0_B, RefL0) |
| 2 | Co-located block (MvL0_Col, RefL0) |
| 3 | New candidate |
| 4 | Second candidate |

FIG. 16B (a)

| Motion vector predictor index for prediction direction 1 | Motion vector predictor candidate in prediction direction 1 |
|---|---|
| 0 | Adjacent block A (MvL1_A, RefL1) |
| 1 | Adjacent block B (sMvL1_B, RefL1) |
| 2 | Co-located block (MvL1_Col, RefL1) |
| 3 | Non-available prediction block (since adjacent block C is intra-predicted) |
| 4 | Adjacent block D (sMvL1_D, RefL1) |

When MvL1_B = MvL1_Col = sMvL1_D

- Delete non-available predictor candidate and redundant candidate
- Add new candidate and add 1 to the number of motion vector predictor candidates if (the number of available predictor candidates - the number of motion vector predictor candidates) > 0

(b)

| Motion vector predictor index for prediction direction 1 | Motion vector predictor candidate in prediction direction 1 |
|---|---|
| 0 | Adjacent block A (sMvL1_A, RefL1) |
| 1 | Adjacent block B (MvL1_B, RefL1) |
| 2 | New candidate 1 |
| 3 | New candidate 2 |
| 3 | Second candidate |

The number of available predictor candidates in prediction direction 1 = 4

FIG. 16C (a)

| Motion vector predictor index for prediction direction 1 | Motion vector predictor candidate in prediction direction 1 |
|---|---|
| 0 | Second candidate |
| 1 | Second candidate |
| 2 | Second candidate |
| 3 | Second candidate |
| 4 | Second candidate |

When MvL1_B = MvL1_Col = sMvL1_D → -Add candidate other than non-available predictor candidate and redundant candidate to list (b)

| Motion vector predictor index for prediction direction 1 | Motion vector predictor candidate in prediction direction 1 |
|---|---|
| 0 | Adjacent block A (sMvL1_A, RefL1) |
| 1 | Adjacent block B (MvL1_B, RefL1) |
| 2 | Second candidate |
| 3 | Second candidate |
| 4 | Second candidate |

-Add new candidate and add 1 to the number of motion vector predictor candidates if (candidate list size − the number of motion vector predictor candidates) > 0

(c)

| Motion vector predictor index for prediction direction 1 | Motion vector predictor candidate in prediction direction 1 |
|---|---|
| 0 | Adjacent block A (sMvL1_A, RefL1) |
| 1 | Adjacent block B (MvL1_B, RefL1) |
| 2 | New candidate 1 |
| 3 | New candidate 2 |
| 4 | Second candidate |

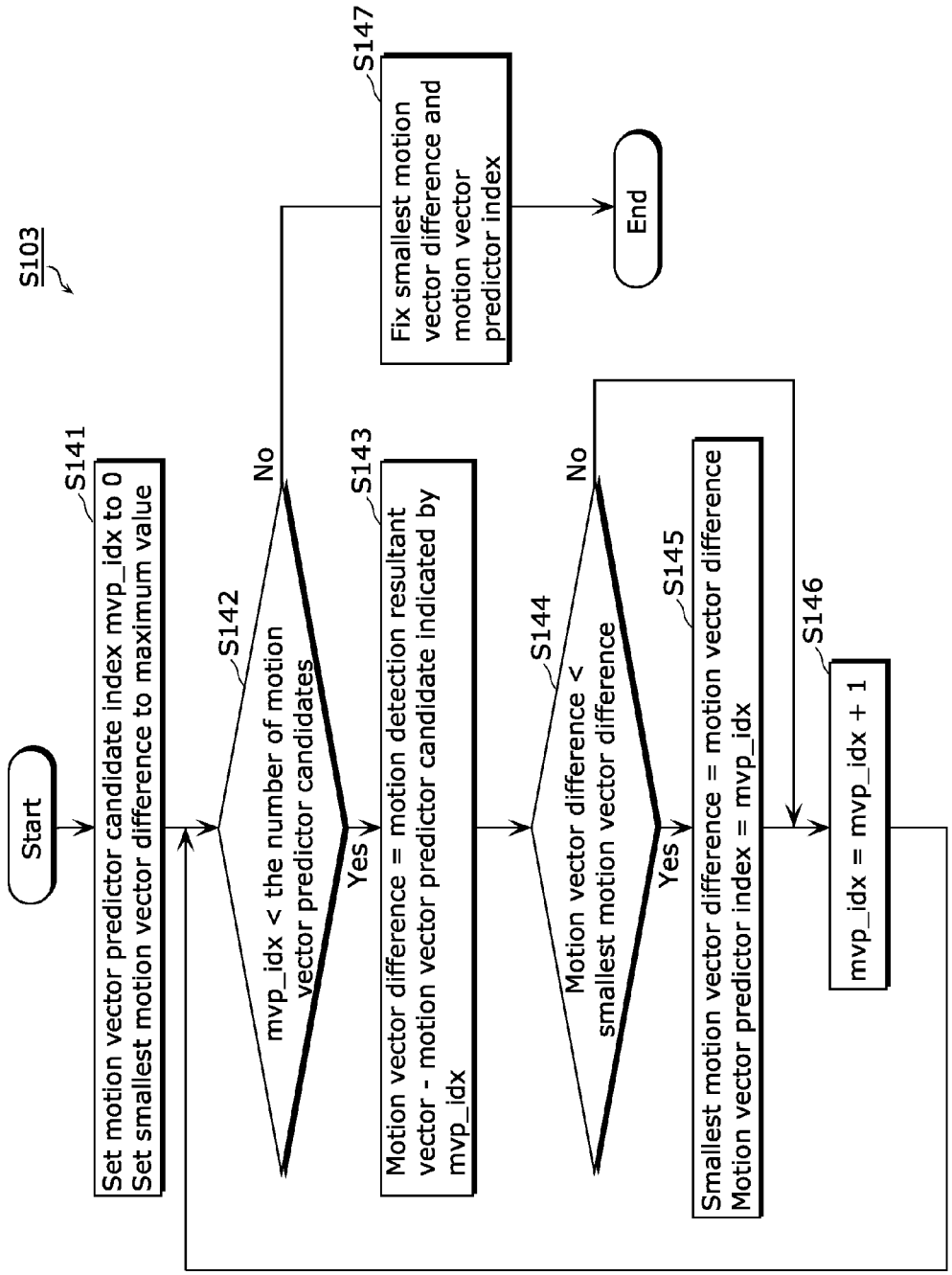

FIG. 25

| | prediction_unit(x0, y0, log2PUWidth, log2PUHeight, PartIdx, InferredMergeFlag){ | Descriptor |
|---|---|---|
| | if(skip_flag[x0][y0]){ | |
| | ... | |
| | } else if(PredMode == MODE_INTRA){ | |
| Prediction direction flag | ... | |
| | } else {/* MODE_INTER */ | |
| | if(!InferredMergeFlag) | |
| Motion vector predictor candidate list size = the number of available predictor candidates | merge_flag[x0][y0] | u(l) \| ae(v) |
| | if(merge_flag[x0][y0] && NumMergeCand > 1){ | |
| | ... | |
| | } else { | |
| | if(slice_type == B) | |
| | inter_pred_flag[x0][y0] | ue(v) \| ae(v) |
| | if(inter_pred_flag[x0][y0] == Pred_LC){ | |
| | ... | |
| Motion vector predictor index | if(NumMVPCand(LcToLx) > 1) | |
| | mvp_idx_lc[x0][y0] | ue(v) \| ae(v) |
| | } | |
| Motion vector predictor candidate list size = the number of available predictor candidates | else {/* Pred_L0 or Pred_BI */ | |
| | if(num_ref_idx_l0_active_minus1 > 0) | |
| | ... | |
| | if(NumMVPCand(L0) > 1) | |
| | mvp_idx_l0[x0][y0] | ue(v) \| ae(v) |
| | } | |
| | if(inter_pred_flag[x0][y0] == Pred_BI){ | |
| | ... | |
| Motion vector predictor index | if(NumMVPCand(L1) > 1) | |
| | mvp_idx_l1[x0][y0] | ue(v) \| ae(v) |
| | } | |
| | } | |
| Motion vector predictor candidate list size = the number of available predictor candidates | } | |
| | } | |

Motion vector predictor index

FIG. 26

| prediction_unit(x0, y0, log2PUWidth, log2PUHeight, PartIdx, InferredMergeFlag){ | Descriptor |
|---|---|
| if(skip_flag[x0][y0]){ | |
| ... | |
| } else if(PredMode == MODE_INTRA){ | |
| ... | |
| } else {/* MODE_INTER */ | |
| if(!InferredMergeFlag) | |
| merge_flag[x0][y0] | u(l) \| ae(v) |
| if(merge_flag[x0][y0] && NumMergeCand > 1){ | |
| ... | |
| } else { | |
| if(slice_type == B) | |
| inter_pred_flag[x0][y0] | ue(v) \| ae(v) |
| if(inter_pred_flag[x0][y0] == Pred_LC){ | |
| ... | |
| mvp_idx_lc[x0][y0] | ue(v) \| ae(v) |
| } | |
| else {/* Pred_L0 or Pred_BI */ | |
| if(num_ref_idx_l0_active_minus1 > 0) | |
| ... | |
| mvp_idx_l0[x0][y0] | ue(v) \| ae(v) |
| } | |
| if(inter_pred_flag[x0][y0] == Pred_BI){ | |
| ... | |
| mvp_idx_l1[x0][y0] | ue(v) \| ae(v) |
| } | |
| } | |
| } | |
| } | |

Prediction direction flag

Motion vector predictor index

Motion vector predictor index

Motion vector predictor index

FIG. 34

| Video stream (PID=0x1011, Primary video) |
| Audio stream (PID=0x1100) |
| Audio stream (PID=0x1101) |
| Presentation graphics stream (PID=0x1200) |
| Presentation graphics stream (PID=0x1201) |
| Interactive graphics stream (PID=0x1400) |
| Video stream (PID=0x1B00, Secondary video) |
| Video stream (PID=0x1B01, Secondary video) |

FIG. 37
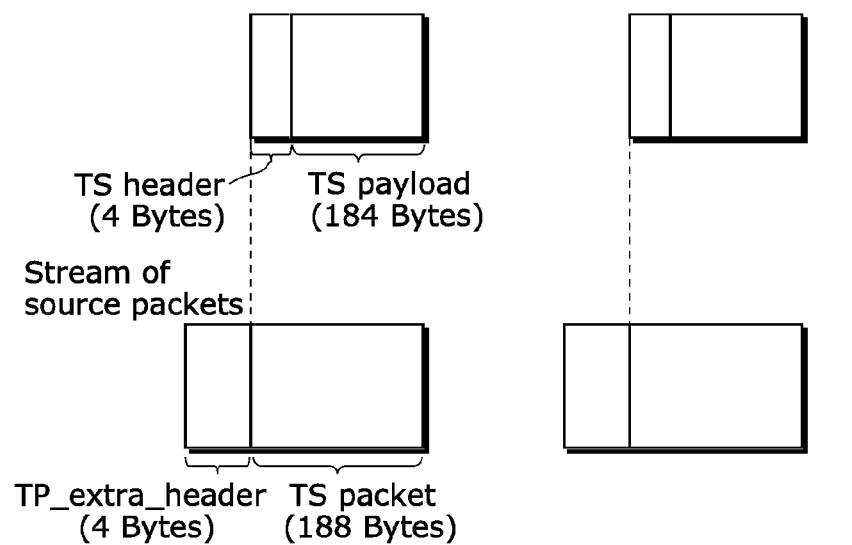
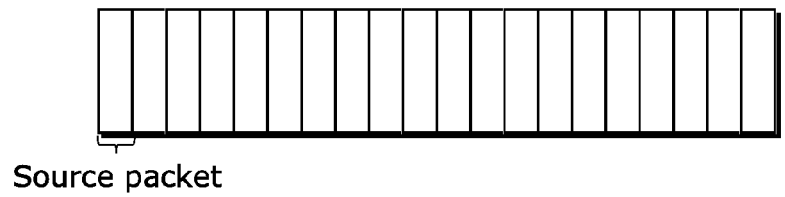

FIG. 45

| Corresponding standard | Driving frequency |
|---|---|
| MPEG-4 AVC | 500 MHz |
| MPEG-2 | 350 MHz |
| ⋮ | ⋮ | ex900 ex1000

VIDEO ENCODING METHOD, VIDEO ENCODING APPARATUS, VIDEO DECODING METHOD, VIDEO DECODING APPARATUS, AND VIDEO ENCODING/DECODING APPARATUS

CROSS REFERENCE TO RELATED APPLICATIONS

This is a continuation application of U.S. patent application Ser. No. 13/565,384, filed Aug. 2, 2012, which claims the benefit of U.S. Provisional Patent Application No. 61/514,643, filed on Aug. 3, 2011. The entire disclosures of each of the above-identified applications, including the specification, drawings and claims, is incorporated herein by reference in its entirety.

TECHNICAL FIELD

The present disclosure relates to moving picture coding methods, moving picture decoding methods, and the like.

BACKGROUND ART

In moving picture coding processing, in general, the amount of information is reduced by utilizing redundancy in the spatial direction and the temporal direction which moving pictures have. Here, in general, transform to a frequency domain is used as a method utilizing redundancy in the spatial direction. Further, inter-picture prediction (hereinafter, referred to as "inter prediction") coding processing is used as a method utilizing redundancy in the temporal direction. In inter prediction coding processing, when a picture is coded, a coded picture that appears before or after a current picture to be coded in the display time order is used as a reference picture. A motion vector is derived by performing motion detection on the current picture relative to the reference picture. Then, redundancy in the temporal direction is eliminated by calculating a difference between image data of the current picture and predicted image data obtained by performing motion compensation based on the derived motion vector (for example, see Non Patent Literature (NPL) 1). Here, in motion detection, a difference value between a current block in a current picture to be coded and a block in a reference picture is calculated, and a block in the reference picture with which the smallest difference value is obtained is determined as a reference block. Then, a motion vector is detected using the current block and the reference block.

CITATION LIST

Non Patent Literature

[NPL 1] ITU-T Recommendation H.264, "Advanced video coding for generic audiovisual services", March, 2010
[NPL 2] JCT-VC, "WD3: Working Draft 3 of High-Efficiency Video Coding", JCTVC-E603, March 2011

SUMMARY

Technical Problem

However, there is a demand for the above conventional technique to achieve an improvement in error resistance in coding and decoding a moving picture using inter prediction.

In view of this, an object of the present disclosure is to provide a moving picture coding method and a moving picture decoding method which improves error resistance in coding and decoding a moving picture using inter prediction.

Solution to Problem

A moving picture coding method according to an aspect of the present discloser is a moving picture coding method for calculating a motion vector predictor to be used when coding a motion vector of a current block, and coding the current block to generate a bitstream, the method including: obtaining motion vector predictor candidates a fixed number of which is two or more and each of which is a candidate for the motion vector predictor; selecting the motion vector predictor to be used for coding the motion vector of the current block, from among the motion vector predictor candidates the fixed number of which is two or more; and coding an index for identifying the selected motion vector predictor according to the fixed number of two or more, and adding the coded index to the bitstream, wherein the motion vector predictor candidates the fixed number of which is two or more include one or more candidates each having a predetermined fixed value.

Advantageous Effects

According to an aspect of the present discloser, it is possible to improve error resistance in coding and decoding a moving picture using inter prediction.

BRIEF DESCRIPTION OF DRAWINGS

These and other objects, advantages and features of the invention will become apparent from the following description thereof taken in conjunction with the accompanying drawings that illustrate a specific embodiment of the present invention.

FIG. 5 is a diagram in (a) and (b) for describing an example of a motion vector predictor candidate list for the prediction direction 1.
FIG. 6 shows examples of assignment of bit strings to motion vector predictor indices.
FIG. 8A shows an example of calculation of a motion vector predictor.
FIG. 8B shows an example of calculation of a motion vector predictor.

FIG. 12 shows syntax used when a motion vector predictor index is added to a bitstream.

FIG. 15B shows an example in (a) and (b) of a motion vector predictor candidate list for the prediction direction 0 in a modification of embodiments.

FIG. 15C shows an example in (a)-(c) of a motion vector predictor candidate list for the prediction direction 0 in the modification of the embodiments.

FIG. 16B shows an example in (a) and (b) of a motion vector predictor candidate list for the prediction direction 1 in the modification of the embodiments.

FIG. 16C shows an example in (a)-(c) of a motion vector predictor candidate list for the prediction direction 1 in the modification of the embodiments.

FIG. 20 is a flowchart showing processing regarding selection of a motion vector predictor candidate in Embodiment 1.

FIG. 25 shows an example of syntax used when a motion vector predictor index is added to a bitstream.

FIG. 26 shows an example of syntax used when a motion vector predictor candidate list size is fixed to the maximum value of the number of motion vector predictor candidates.

FIG. 34 illustrates a structure of multiplexed data.

FIG. 37 shows a structure of TS packets and source packets in the multiplexed data.

FIG. 45 shows an example of a look-up table in which video data standards are associated with driving frequencies.

DESCRIPTION OF EMBODIMENTS (Underlying Knowledge Forming Basis of the Present Disclosure)

In the moving picture coding scheme referred to as H.264 which has already been standardized, three picture types, namely, I-picture, P-picture, and B-picture are used to compress the amount of information.

An I-picture is not coded by inter prediction coding processing. Specifically, an I-picture is coded by intra-picture prediction (hereinafter, referred to as intra prediction) coding processing. A P-picture is coded by inter prediction coding by referring to one already coded picture that appears before or after a current picture to be coded in the display time order. A B-picture is coded by inter prediction coding by referring to two already coded pictures that appear before or after the current picture in the display time order.

In inter prediction coding, a reference picture list for identifying a reference picture is generated. A reference list is a list in which reference picture indices are assigned to coded reference pictures to be referred to in inter prediction. For example, since B-pictures can be coded by referring to two pictures, two reference lists (L0, L1) are generated.

Figure 1:
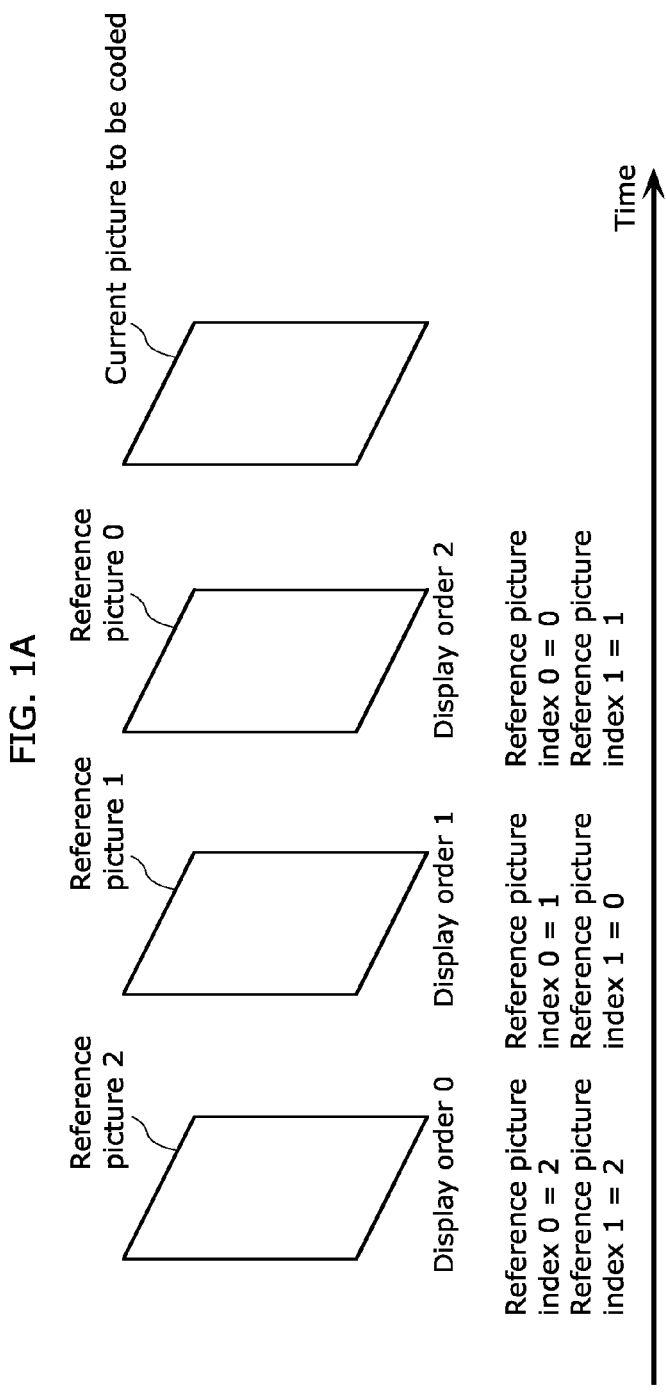
FIG. 1A is a diagram for describing an example of a reference picture list for a B-picture.
FIG. 1B shows an example of a reference picture list for a prediction direction 0 for a B-picture.
FIG. 1C shows an example of a reference picture list for a prediction direction 1 for a B-picture.

FIG. 1A is a diagram for describing an example of a reference picture list for a B-picture. FIG. 1B shows an example of a reference picture list 0 (L0) for the prediction direction 0 in bidirectional prediction. Here, in the reference picture list 0, value 0 of the reference picture index 0 is assigned to reference picture 0 at display order 2. Further, value 1 of the reference picture index 0 is assigned to reference picture 1 at display order 1. Further, value 2 of the reference picture index 0 is assigned to reference picture 2 at display order 0. Specifically, reference picture indices having smaller values are assigned to reference pictures in order of temporal proximity to a current picture to be coded in display order.

FIG. 1C shows an example of the reference picture list 1 (L1) for the prediction direction 1 in bidirectional prediction. Here, in the reference picture list 1, value 0 of the reference picture index 1 is assigned to reference picture 1 at display order 1. Further, value 1 of the reference picture index 1 is assigned to reference picture 0 at display order 2. Further, value 2 of the reference picture index 2 is assigned to reference picture 2 at display order 0.

In this manner, it is possible to assign reference picture indices having different values for the prediction directions to a reference picture (reference pictures 0 and 1 in FIG. 1A), and reference picture indices having the same value for the prediction directions to a reference picture (reference picture 2 in FIG. 1A).

Further, in the moving picture coding scheme referred to as H.264 (NPL 1), a motion vector detection mode is used as an inter prediction coding mode for blocks to be coded in a B-picture. In the motion vector detection mode, a difference value between predicted image data and image data of a current block to be coded, and a motion vector used for generating the predicted image data are coded. Further, in the motion vector detection mode, it is possible to select bidirectional prediction or unidirectional prediction, as the prediction direction. In bidirectional prediction, a predicted image is generated by referring to two already coded pictures which appear before or after a current picture to be coded. In unidirectional prediction, a predicted image is generated by referring to one already coded picture which appears before or after a current picture to be coded.

Further, in the moving picture coding scheme referred to as H.264, a coding mode referred to as a temporal motion vector prediction mode can be selected when a motion vector is derived in coding a B-picture. An inter prediction coding method in the temporal motion vector prediction mode is described using FIG. 2.

Figure 2:
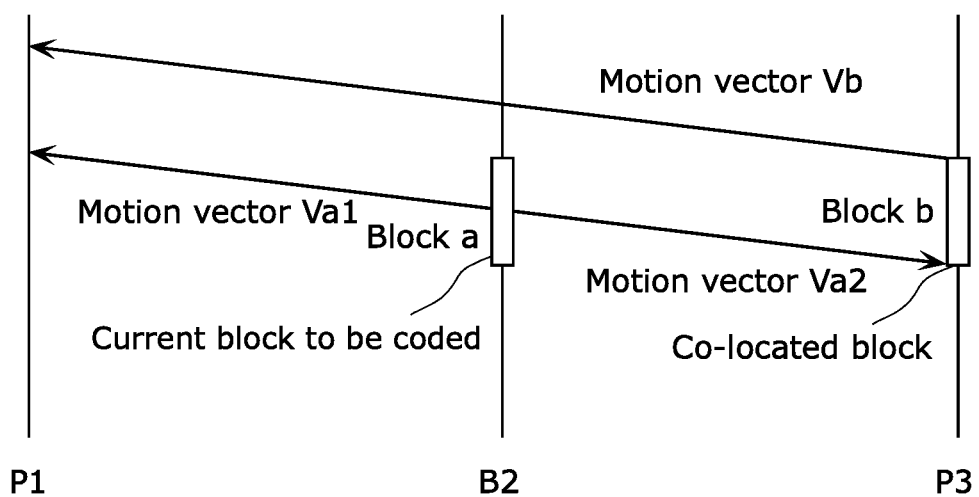
FIG. 2 is a diagram for describing motion vectors in a temporal motion vector prediction mode.

FIG. 2 is a diagram for describing motion vectors in the temporal motion vector prediction mode. Specifically, FIG. 2 shows the case where block a in picture B2 is to be coded in the temporal motion vector prediction mode.

Here, motion vector vb is utilized which is used when block b (hereinafter, referred to as "co-located block") at the same position in picture P3 as that of block a is coded, picture P3 being a reference picture which appears after picture B2. Motion vector vb is a motion vector used when block b is coded by referring to picture P1.

Two reference blocks for block a are obtained from picture P1 which is a forward reference picture and picture P3 which is a backward reference picture, using motion vectors parallel to motion vector vb. Then, block a is coded by performing bidirectional prediction based on the two obtained reference blocks. Specifically, motion vectors used when block a is coded are motion vector va1 with respect to picture P1 and motion vector va2 with respect to picture P3.

In addition, a motion vector predictor designating mode is considered to be used (NPL 2) as a method for coding motion vectors of blocks to be coded in a B-picture or a P-picture. In the motion vector predictor designating mode, motion vector predictor candidates are generated based on motion vectors used when coding blocks adjacent to a current block to be coded. Then, a motion vector predictor is selected from among the motion vector predictor candidates, and a motion vector of the current block is coded. At this time, an index of the selected motion vector predictor and the like are added to a bitstream. Consequently, the same motion vector predictor as the motion vector predictor used for coding can be selected also when decoding is performed. A specific example is described with reference to FIG. 3.

Figure 3:
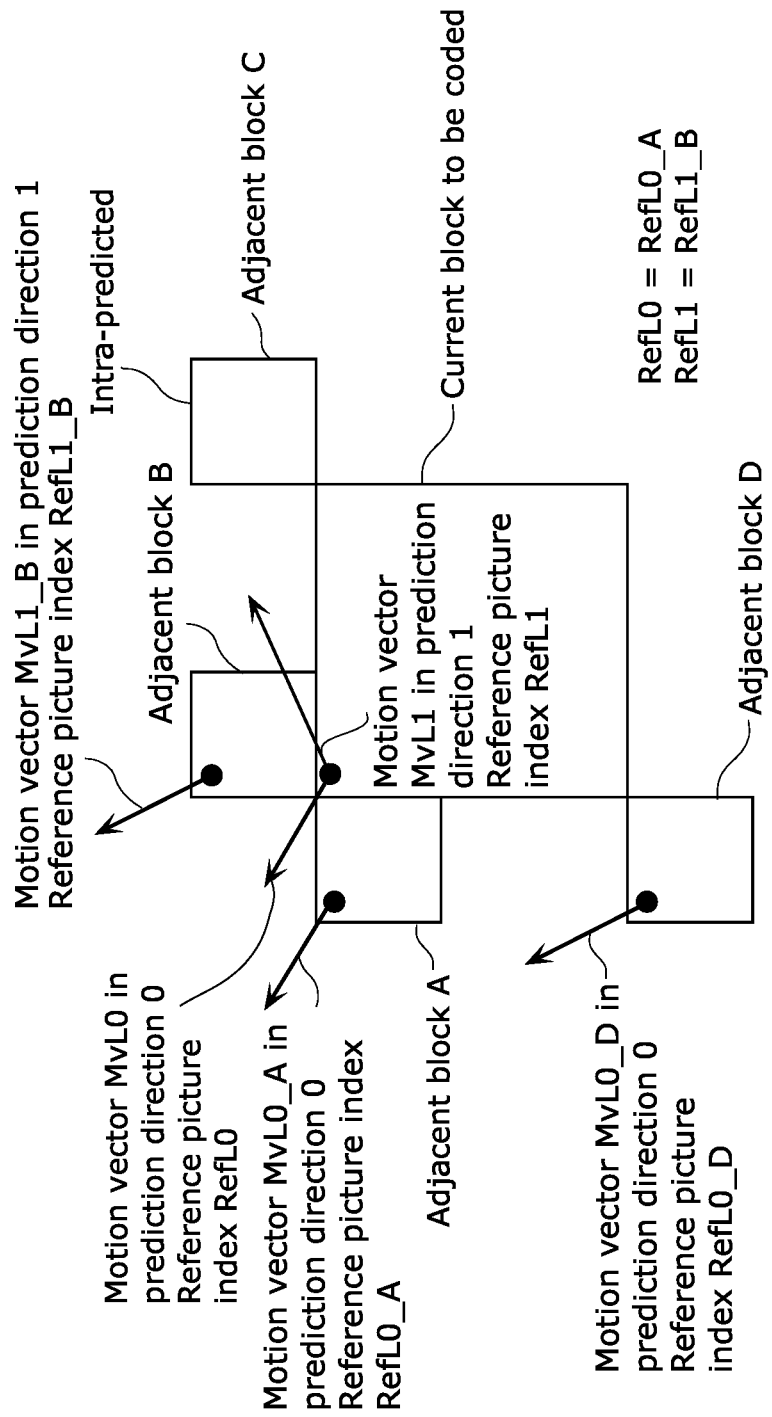
FIG. 3 shows examples of motion vectors of adjacent blocks used in a motion vector predictor designating mode.

FIG. 3 shows examples of motion vectors of adjacent blocks which are used in the motion vector predictor designating mode. In FIG. 3, adjacent block A is a coded block adjacent to and located at the left of a current block to be coded. Adjacent block B is a coded block adjacent to and located on the current block. Adjacent block C is a coded block adjacent to and located at the upper right of the current block. Adjacent block D is a coded block adjacent to and located at the bottom left of the current block.

In FIG. 3, the current block is a block which is coded by bidirectional prediction, and has, as a result of motion detection or the like, motion vector MvL0 in the prediction direction 0 as a motion vector relative to a reference picture indicated by reference picture index RefL0 for the prediction direction 0, and motion vector MvL1 in the prediction direction 1 as a motion vector relative to a reference picture indicated by reference picture index RefL1 for the prediction direction 1. Here, MvL0 is a motion vector for which a reference picture identified using the reference picture list 0 (L0) is referred to. Further, MvL1 is a motion vector for which a reference picture identified using the reference picture list 1 (L1) is referred to.

Adjacent block A is a block coded by unidirectional prediction in the prediction direction 0. Adjacent block A has motion vector MvL0_A in the prediction direction 0 as a motion vector relative to a reference picture indicated by reference picture index RefL0_A for the prediction direction 0. Further, adjacent block B is a block coded by unidirectional prediction in the prediction direction 1. Adjacent block B has motion vector MvL1_B in the prediction direction 1 as a motion vector relative to a reference picture indicated by reference picture index RefL1_B for the prediction direction 1. Adjacent block C is a block coded by intra prediction. Further, adjacent block D is a block coded by unidirectional prediction in the prediction direction 0. Adjacent block D has motion vector MvL0_D in the prediction direction 0 as a motion vector relative to a reference picture indicated by reference picture-index RefL0_D in the prediction direction 0.

Figure 4:
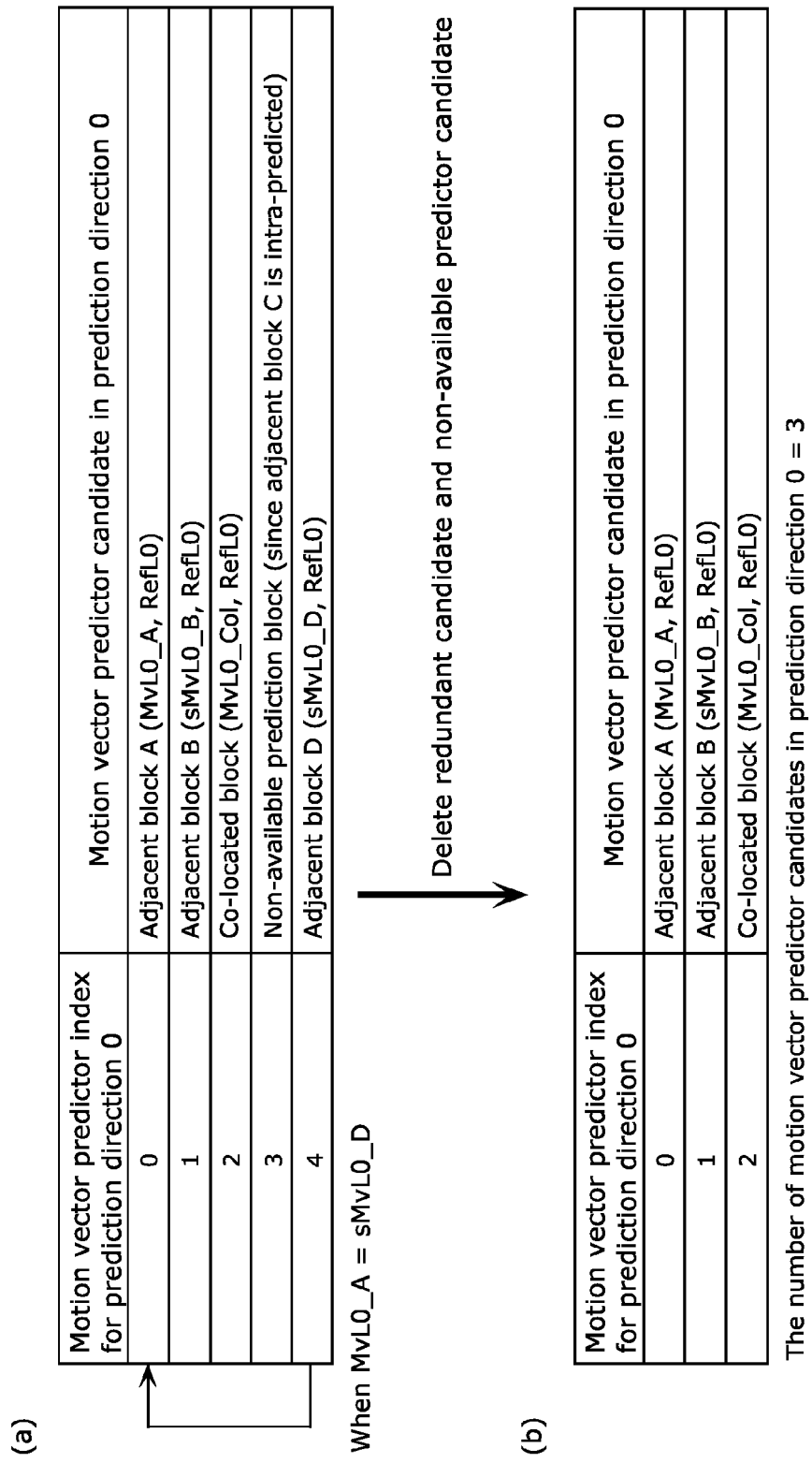
FIG. 4 is a diagram in (a) and (b) for describing an example of a motion vector predictor candidate list for the prediction direction 0.

In such a case, as a motion vector predictor of a current block to be coded, for example, a motion vector predictor with which a motion vector of the current block can be most efficiently coded is selected from among motion vector predictor candidates generated from motion vectors of adjacent blocks A, B, C and D and a motion vector in the temporal motion vector prediction mode obtained using a co-located block. Then, a motion vector predictor index indicating the selected motion vector predictor is added to a bitstream. For example, if motion vector MvL0_A in the prediction direction 0 of adjacent block A is selected as a motion vector predictor when motion vector MvL0 in the prediction direction 0 of a current block is to be coded, only value "0" of the motion vector predictor index which indicates that the motion vector predictor candidate generated from adjacent block A is used as shown in FIG. 4 is added to a bitstream. Accordingly, the amount of information on motion vector MvL0 in the prediction direction 0 of the current block can be reduced.

Here, FIG. 4 shows an example of a motion vector predictor candidate list for the prediction direction 0. Further, as shown in FIG. 4, in the motion vector predictor designating mode, a candidate with which a motion vector predictor cannot be generated (hereinafter, referred to as "non-available predictor candidate"), and a candidate whose value is the same as the value of another motion vector predictor candidate (hereinafter, "redundant candidate") are deleted from motion vector predictor candidates. Consequently, the code amount assigned to motion vector predictor indices is reduced by decreasing the number of motion vector predictor candidates. Here, generation of a motion vector predictor being impossible means that an adjacent block is (1) a block coded by intra prediction, (2) a block outside a boundary of a slice or a picture which includes a current block to be coded, or (3) a block which is not coded yet, for instance.

In the example in FIG. 4, adjacent block C is coded by intra prediction. Accordingly, a predictor candidate indicated by value "3" of the motion vector predictor index is a non-available predictor candidate, and thus is deleted from the motion vector predictor candidate list. Further, a motion vector predictor in the prediction direction 0 generated from adjacent block D has the same value as the value of a motion vector predictor in the prediction direction 0 generated from adjacent block A, and thus a predictor candidate indicated by value "4" of the motion vector predictor index is deleted from the motion vector predictor candidate list. As a result, the number of motion vector predictor candidates in the prediction direction 0 is eventually reduced to 3, and the motion vector predictor candidate list size for the prediction direction 0 is set to 3.

FIG. 5 shows an example of a motion vector predictor candidate list for the prediction direction 1. In the example shown in FIG. 5, the number of motion vector predictor candidates in the prediction direction 1 is eventually reduced to 2 by deleting a non-available predictor candidate and redundant candidates, and the motion vector predictor candidate list size for the prediction direction 1 is set to 2.

As shown in FIG. 6, bit strings are assigned to motion vector predictor indices according to the motion vector predictor candidate list size, and are variable-length coded. Further, if the motion vector predictor candidate list size is 1, a motion vector predictor index is not added to a bitstream, and a decoding apparatus is caused to estimate that the index is value 0. In this way, in the motion vector predictor designating mode, bit strings assigned to motion vector predictor indices are changed according to the motion vector predictor candidate list size, thereby reducing the code amount.

Figure 7:
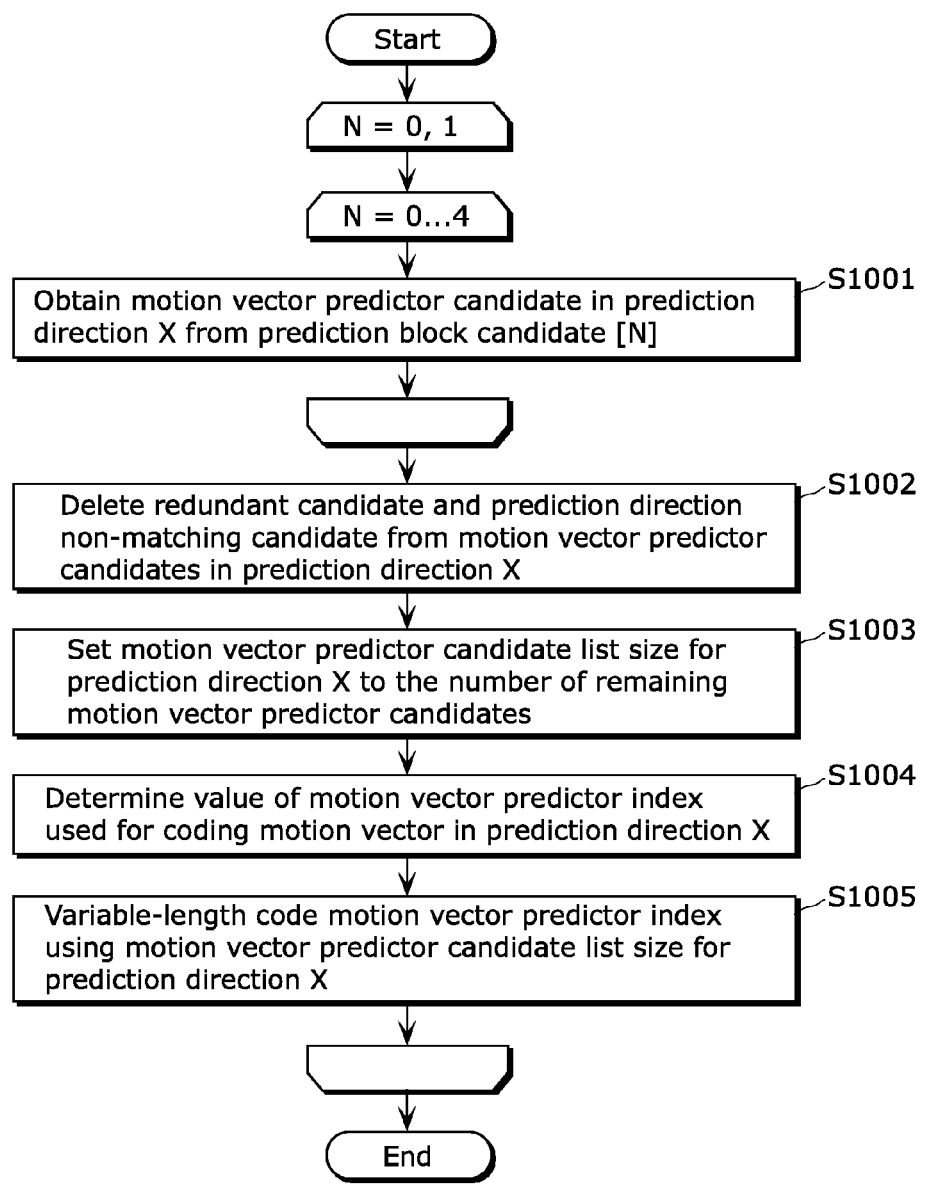
FIG. 7 is a flowchart showing an example of coding processing performed when the motion vector predictor designating mode is used.

FIG. 7 is a flowchart showing an example of coding processing in the case of using the motion vector predictor designating mode.

In step S1001, motion vector predictor candidates in a prediction direction X are calculated from adjacent blocks and a co-located block (hereafter, referred to as "prediction block candidates"). Here, X is one of the values "0" and "1", where 0 represents the prediction direction 0 and 1 represents the prediction direction 1. Motion vector predictor candidate sMvLX in the prediction direction X is calculated in accordance with the following expression, using motion vector MvLX_N and reference picture index RefLX_N of a prediction block candidate and reference picture index RefLX of a current block to be coded.

$$sMvLX = MvLX\_N \times (POC(RefLX) - curPOC)/(POC(RefLX\_N) - curPOC) \quad \text{(Expression 1)}$$

Here, POC(RefLX) indicates when in the order a reference picture indicated by reference picture index RefLX is displayed, POC(RefLX_N) indicates when in the order a reference picture indicated by reference picture index RefLX_N is displayed, and curPOC indicates when in the order a current picture to be coded is displayed. It should be noted that if a prediction block candidate does not have motion vector MvLX_N in the prediction direction X, motion vector predictor sMvLX is calculated in accordance with Expression 2, using motion vector MvL(1−X)_N in the prediction direction (1−X) and reference picture index RefL(1−X)_N.

$$sMvLX = MvL(1-X)\_N \times (POC(RefLX) - curPOC)/(POC(RefL(1-X)\_N) - curPOC) \quad \text{(Expression 2)}$$

FIGS. 8A and 8B show examples of calculating motion vector predictors using Expressions 1 and 2. It should be noted that as shown by Expressions 1 and 2, if the values of POC(RefLX) and POC(RefLX_N) are the same, namely, the same picture is referred to, scaling can be skipped.

In step S1002, a redundant candidate and a non-available predictor candidate are deleted from motion vector predictor candidates in the prediction direction X.

In step S1003, the motion vector predictor candidate list size is set to the number of motion vector predictor candidates after the deleting processing.

In step S1004, a motion vector predictor index to be used for coding a motion vector in the prediction direction X of a current block is determined.

In step S1005, the determined motion vector predictor index is variable-length coded using a bit string determined according to the motion vector predictor candidate list size.

Figure 9:
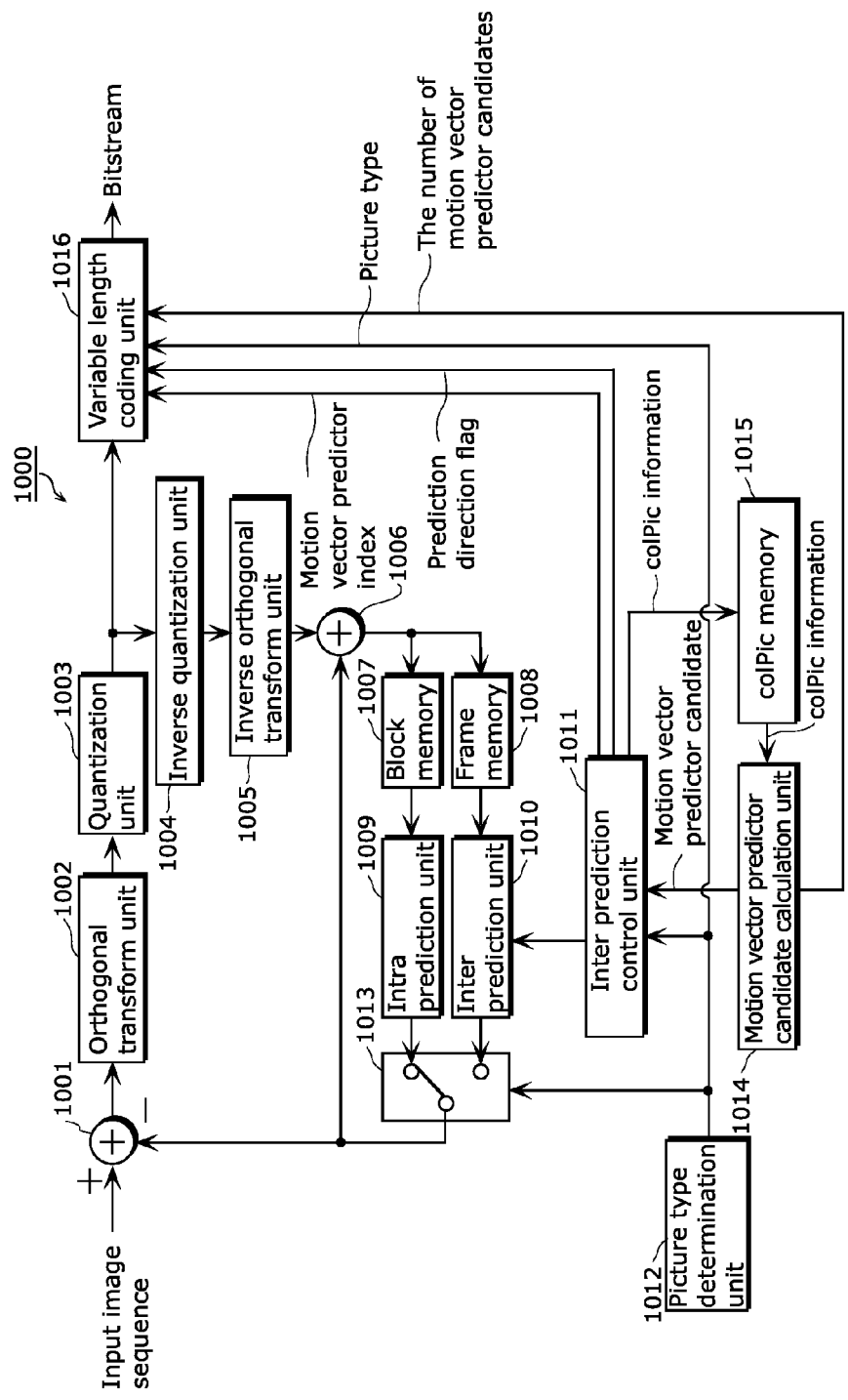
FIG. 9 is a block diagram showing an example of a configuration of a moving picture coding apparatus which codes a moving picture using the motion vector predictor designating mode.

FIG. 9 is a block diagram showing an example of a configuration of a moving picture coding apparatus 1000 which codes a moving picture using the motion vector predictor designating mode.

As shown in FIG. 9, the moving picture coding apparatus 1000 includes a subtraction unit 1001, an orthogonal transform unit 1002, a quantization unit 1003, an inverse quantization unit 1004, an inverse orthogonal transform unit 1005, an addition unit 1006, a block memory 1007, a frame memory 1008, an intra prediction unit 1009, an inter prediction unit 1010, an inter prediction control unit 1011, a picture type determination unit 1012, a switch 1013, a motion vector predictor candidate calculation unit 1014, a colPic memory 1015, and a variable length coding unit 1016.

In FIG. 9, the motion vector predictor candidate calculation unit 1014 calculates motion vector predictor candidates. Then, the motion vector predictor candidate calculation unit 1014 transmits the number of calculated motion vector predictor candidates to the variable length coding unit 1016. The variable length coding unit 1016 sets the motion vector predictor candidate list size which is a coding parameter to the number of motion vector predictor candidates. Then, the variable length coding unit 1016 variable-length codes motion vector predictor indices used for coding by assigning thereto bit strings according to the motion vector predictor candidate list size.

Figure 10:
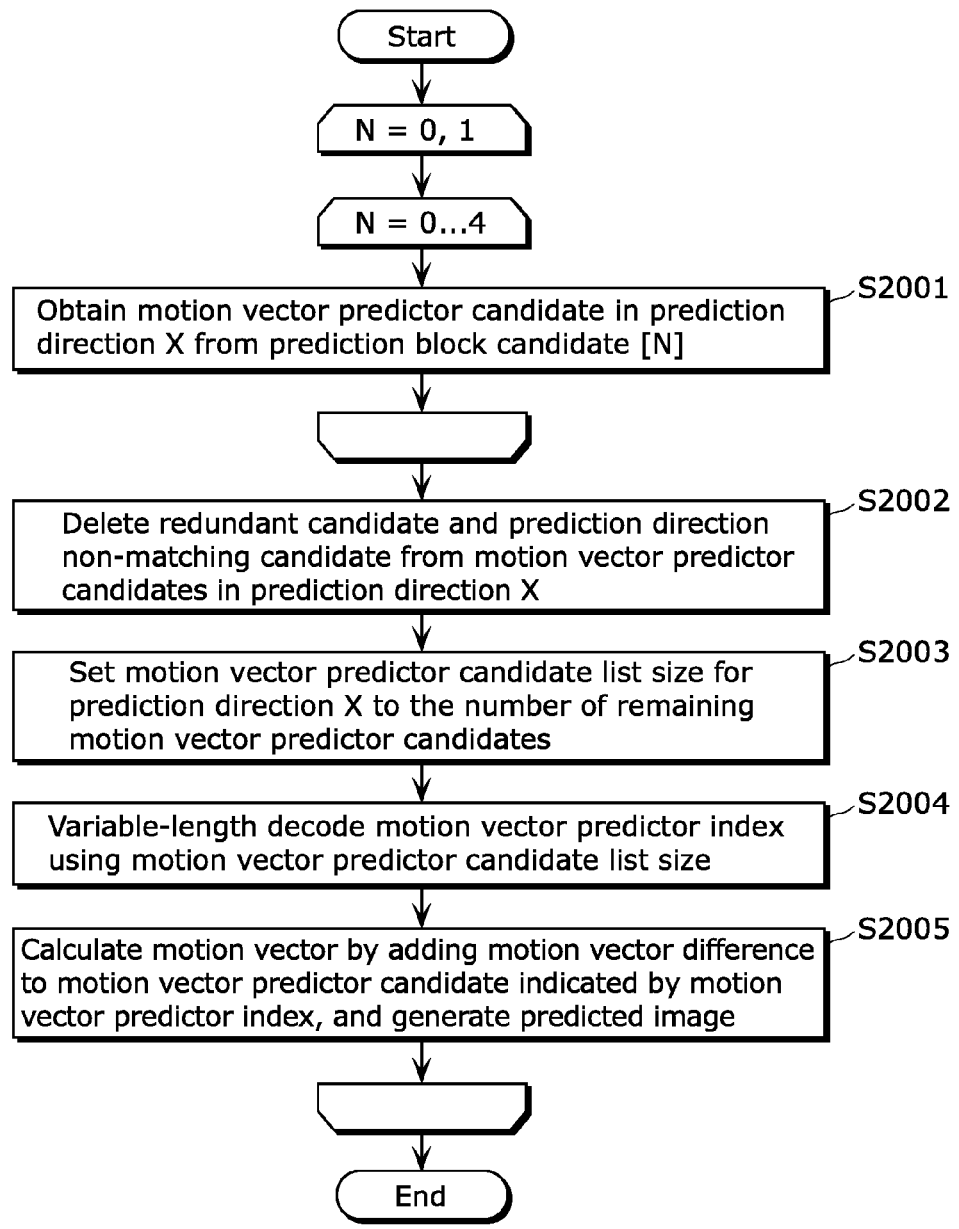
FIG. 10 is a flowchart showing an example of decoding processing performed when the motion vector predictor designating mode is used.

FIG. 10 is a flowchart showing an example of decoding processing in the case of using the motion vector predictor designating mode.

In step S2001, motion vector predictor candidates in the prediction direction X are calculated from adjacent blocks and a co-located block (prediction block candidates). In step S2002, a redundant candidate and a non-available predictor candidate are deleted from the motion vector predictor candidates. In step S2003, the motion vector predictor candidate list size is set to the number of motion vector predictor candidates after the deleting processing. In step S2004, a motion vector predictor index to be used for decoding a current block is decoded from a bitstream using the motion vector predictor candidate list size. In step S2005, a motion vector is calculated by adding a motion vector difference to a motion vector predictor candidate indicated by the decoded motion vector predictor index, and a predicted image is generated using the calculated motion vector, thereby performing decoding processing.

Figure 11:
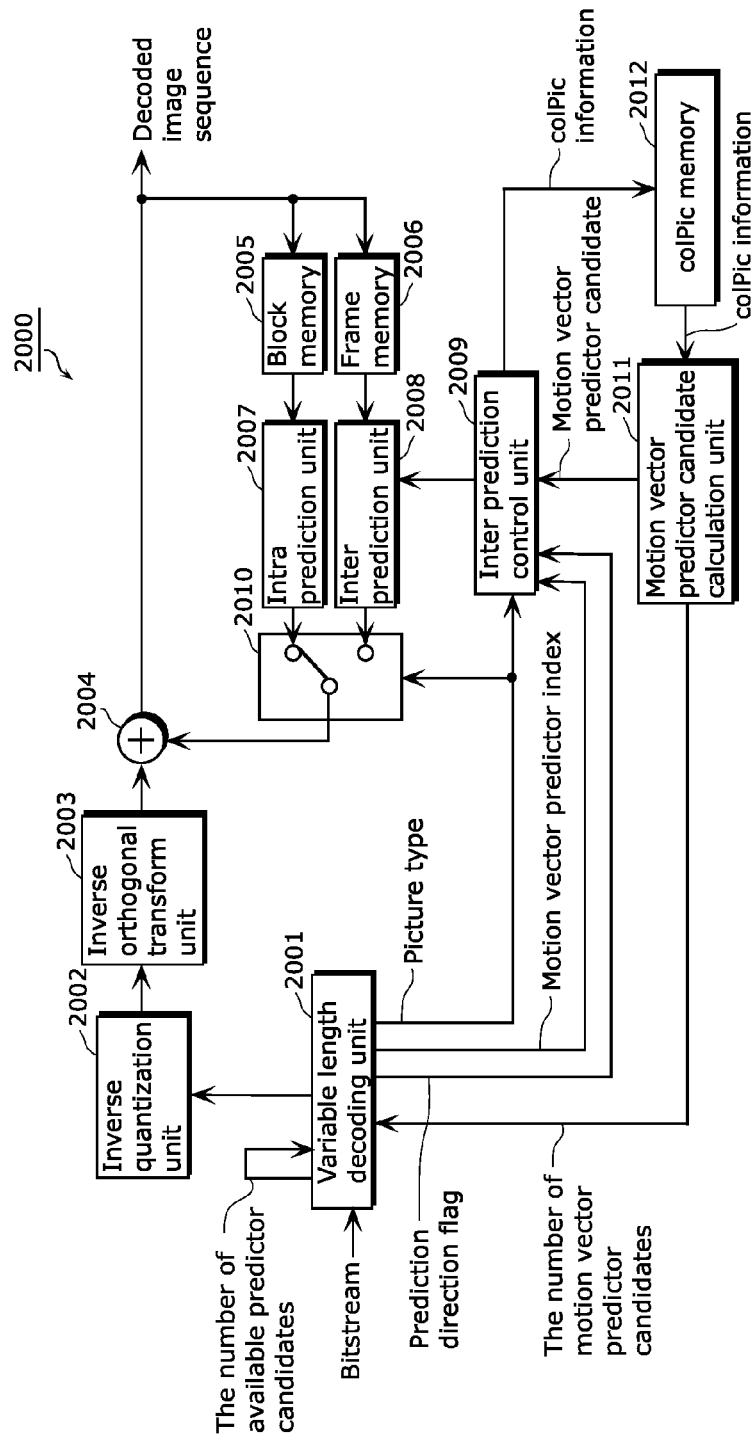
FIG. 11 is a block diagram showing an example of a configuration of a moving picture decoding apparatus which decodes a moving picture coded using the motion vector predictor designating mode.

FIG. 11 is a block diagram showing an example of a configuration of a moving picture decoding apparatus which decodes a moving picture coded using the motion vector predictor designating mode.

As shown in FIG. 11, a moving picture decoding apparatus 2000 includes a variable length decoding unit 2001, an inverse quantization unit 2002, an inverse orthogonal transform unit 2003, an addition unit 2004, a block memory 2005, a frame memory 2006, an intra prediction unit 2007, an inter prediction unit 2008, an inter prediction control unit 2009, a switch 2010, a motion vector predictor candidate calculation unit 2011, and a colPic memory 2012.

In FIG. 11, the motion vector predictor candidate calculation unit 2011 calculates motion vector predictor candidates. Then, the motion vector predictor candidate calculation unit 2011 transmits the number of calculated motion vector predictor candidates to the variable length decoding unit 2001. The variable length decoding unit 2001 sets the motion vector predictor candidate list size which is a decoding parameter to the number of motion vector predictor candidates. Then, the variable length decoding unit 2001 decodes a motion vector predictor index included in a bitstream using the motion vector predictor candidate list size.

FIG. 12 shows syntax used when a motion vector predictor index is added to a bitstream. In FIG. 12, inter_pred_flag indicates a prediction direction flag for inter prediction, mvp_idx indicates a motion vector predictor index, and NumMVPCand indicates the motion vector predictor candidate list size. NumMVPCand is set to the number of motion vector predictor candidates after deleting a non-available predictor candidate and a redundant candidate from the motion vector predictor candidates.

As described above, a moving picture is coded or decoded using the motion vector predictor designating mode. However, in the above motion vector predictor designating mode, the motion vector predictor candidate list size to be used when a motion vector predictor index is coded or decoded is set to the number of motion vector predictor candidates. This number of motion vector predictor candidates is obtained after deleting a non-available predictor candidate or a redundant candidate using reference picture information including information of a co-located block and the like. Thus, if, for instance, there is a difference in the number of motion vector predictor candidates between a moving picture coding apparatus and a moving picture decoding apparatus, different bit strings are assigned to motion vector predictor indices in the moving picture coding apparatus and the moving picture decoding apparatus. As a result, the moving picture decoding apparatus may not be able to decode a bitstream appropriately.

For example, if information of a reference picture which has been referenced as a co-located block is lost due to a packet loss or the like which has occurred on a transmission channel or the like, a motion vector or a reference picture index of the co-located block will be lost. Thus, information on a motion vector predictor candidate to be generated from the co-located block cannot be obtained. In such a case, a non-available predictor candidate and a redundant candidate cannot be appropriately deleted from motion vector predictor candidates at the time of decoding. As a result, the moving picture decoding apparatus will not be able to appropriately obtain the motion vector predictor candidate list size, and will not be able to successfully decode a motion vector predictor index.

It should be noted that it is possible to fix the motion vector predictor candidate list size to address the above problem. If the motion vector predictor candidate list size is fixed, it is not necessary to obtain the motion vector predictor candidate list size.

However, if the motion vector predictor candidate list size is fixed, when the sum total of one or more candidates each derived from a block spatially adjacent (each of which is a motion vector predictor candidate other than a redundant candidate and a non-available predictor candidate) and one or more candidates (first candidates) each derived from a block temporally adjacent (co-located block) is smaller than the motion vector predictor candidate list size, the motion vector predictor candidate lists will include a null element. In this case, if an image decoding apparatus refers to the null element due to the error occurrence or the like, unexpected operation may be executed, which is a problem.

In view of this, an image coding method according to an aspect of the present disclosure is a moving picture coding method for calculating a motion vector predictor to be used when coding a motion vector of a current block, and coding the current block to generate a bitstream, the method including: obtaining motion vector predictor candidates a fixed number of which is two or more and each of which is a candidate for the motion vector predictor; selecting the motion vector predictor to be used for coding the motion vector of the current block, from among the motion vector predictor candidates the fixed number of which is two or more; and coding an index for identifying the selected motion vector predictor according to the fixed number of two or more, and adding the coded index to the bitstream, wherein the motion vector predictor candidates the fixed number of which is two or more include one or more candidates each having a predetermined fixed value.

For example, the motion vector predictor candidates the fixed number of which is two or more may further include at least one of one or more first candidates and one or more new candidates, the one or more first candidates may be candidates each derived based on a motion vector used for coding an adjacent block spatially or temporally adjacent to the current block, and the one or more new candidates may be candidates each derived based on a motion vector used for coding a block different from the adjacent block, or each having a predetermined fixed vector as a motion vector.

For example, the obtaining of the motion vector predictor candidates may include: performing first derivation processing of deriving the one or more first candidates, and setting, if the one or more first candidates are derived, each of the derived one or more first candidates as one of the motion vector predictor candidates the fixed number of which is two or more; performing second derivation processing of deriving the one or more new candidates if a total number of the one or more first candidates is smaller than the fixed number of two or more, and setting, if the one or more new candidates are derived, each of the derived one or more new candidates as one of the motion vector predictor candidates the fixed number of which is two or more; and setting, if a sum of the total number of one or more first candidates and a total number of the one or more new candidates is smaller than the fixed number of two or more, at least one of the one or more candidates each having the predetermined fixed value as one of the motion vector predictor candidates the fixed number of which is two or more, to make a sum of the total number of one or more first candidates, a total number of the one or more candidates each having the predetermined fixed value, and the total number of new candidates equal to the fixed number of two or more.

For example, in the second derivation processing, one or more candidates may be selected in accordance with a predetermined priority order from among a plurality of different candidates previously prepared, to derive the one or more new candidates.

For example, the obtaining of the motion vector predictor candidates may include: setting the candidate having the predetermined fixed value as each of all the motion vector predictor candidates the fixed number of which is two or more, to initialize the motion vector predictor candidates the fixed number of which is two or more; performing first derivation processing of deriving the one or more first candidates, and updating the motion vector predictor candidates the fixed number of which is two or more if the one or more first candidates are derived, to cause the motion vector predictor candidates to include the derived one or more first candidates; and performing second derivation processing of deriving the one or more new candidates if a total number of the one or more first candidates is smaller than the fixed number of two or more, and updating the motion vector predictor candidates the fixed number of which is two or more if the one or more new candidates are derived, to cause the motion vector predictor candidates to include the derived one or more new candidates.

In view of this, an image decoding method according to an aspect of the present disclosure is a moving picture decoding method for calculating a motion vector predictor to be used when decoding a motion vector of a current block included in a bitstream, and decoding the current block, the method including: obtaining motion vector predictor candidates a fixed number of which is two or more and each of which is a candidate for the motion vector predictor; decoding, according to the fixed number of two or more, an index for identifying the motion vector predictor candidate from among the motion vector predictor candidates the fixed number of which is two or more, the index being coded and added to the bitstream; and selecting, based on the decoded index, the motion vector predictor to be used for decoding the current block from among the motion vector predictor candidates the fixed number of which is two or more, wherein the motion vector predictor candidates the fixed number of which is two or more include one or more candidates each having a predetermined fixed value.

For example, the motion vector predictor candidates the fixed number of which is two or more may further include at least one of one or more first candidates and one or more new candidates, the one or more first candidates may be candidates each derived based on a motion vector used for coding an adjacent block spatially or temporally adjacent to the current block, and the one or more new candidates may be candidates each derived based on a motion vector used for coding a block different from the adjacent block, or each having a predetermined fixed vector as a motion vector.

For example, the obtaining of the motion vector predictor candidates may include: performing first derivation processing of deriving the one or more first candidates, and setting, if the one or more first candidates are derived, each of the derived one or more first candidates as one of the motion vector predictor candidates the fixed number of which is two or more; performing second derivation processing of deriving the one or more new candidates if a total number of the one or more first candidates is smaller than the fixed number of two or more, and setting, if the one or more new candidates are derived, each of the derived one or more new candidates as one of the motion vector predictor candidates the fixed number of which is two or more; and setting, if a sum of the total number of one or more first candidates and a total number of the one or more new candidates is smaller than the fixed number of two or more, at least one of the one or more candidates each having the predetermined fixed value as one of the motion vector predictor candidates the fixed number of which is two or more, to make a sum of the total number of one or more first candidates, a total number of the one or more candidates each having the predetermined fixed value, and the total number of one or more new candidates equal to the fixed number of two or more.

For example, in the second derivation processing, one or more candidates may be selected in accordance with a predetermined priority order from among a plurality of different candidates previously prepared, to derive the one or more new candidates.

For example, the obtaining of the motion vector predictor candidates may include: setting the candidate having the predetermined fixed value as each of all the motion vector predictor candidates the fixed number of which is two or more, to initialize the motion vector predictor candidates the fixed number of which is two or more; performing first derivation processing of deriving the one or more first candidates, and updating the motion vector predictor candidates the fixed number of which is two or more if the one or more first candidates are derived, to cause the motion vector predictor candidates to include the derived one or more first candidates; and performing second derivation processing of deriving the one or more new candidates if a total number of the one or more first candidates is smaller than the fixed number of two or more, and updating the motion vector predictor candidates the fixed number of which is two or more if the one or more new candidates are derived, to cause the motion vector predictor candidates to include the derived one or more new candidates.

In view of this, an image coding apparatus according to an aspect of the present disclosure is a moving picture coding apparatus for calculating a motion vector predictor to be used when coding a motion vector of a current block, and coding the current block to generate a bitstream, the apparatus including: a motion vector predictor candidate obtaining unit configured to obtain motion vector predictor candidates a fixed number of which is two or more and each of which is a candidate for the motion vector predictor; a selection unit configured to select the motion vector predictor to be used for coding the motion vector of the current block, from among the motion vector predictor candidates the fixed number of which is two or more; and a coding unit configured to code an index for identifying the selected motion vector predictor according to the fixed number of two or more, and adding the coded index to the bitstream, wherein the motion vector predictor candidates the fixed number of which is two or more include one or more candidates each having a predetermined fixed value.

In view of this, an image decoding apparatus according to an aspect of the present disclosure is a moving picture decoding apparatus for calculating a motion vector predictor to be used when decoding a motion vector of a current block included in a bitstream, and decoding the current block, the apparatus including: a motion vector predictor candidate obtaining unit configured to obtain motion vector predictor candidates a fixed number of which is two or more and each of which is a candidate for the motion vector predictor; a decoding unit configured to decode, according to the fixed number of two or more, an index for identifying the motion vector predictor candidate from among the motion vector predictor candidates the fixed number of which is two or more, the index being coded and added to the bitstream; and a selection unit configured to select, based on the decoded index, the motion vector predictor to be used for decoding the current block from among the motion vector predictor candidates the fixed number of which is two or more, wherein the motion vector predictor candidates the fixed number of which is two or more include one or more candidates each having a predetermined fixed value.

In view of this, an image coding and decoding apparatus according to an aspect of the present disclosure includes the above-described moving picture coding apparatus and the above-described moving picture decoding apparatus.

It should be noted that these general and specific aspects may be implemented using a system, a method, an integrated circuit, a computer program, a computer-readable recording medium such as a CD-ROM, or any combination of systems, methods, integrated circuits, computer programs or recording media.

The following is a specific description of a moving picture coding apparatus and a moving picture decoding apparatus according to an aspect of the present disclosure, with reference to the drawings.

Each of the embodiments described below shows a specific example of the present disclosure. The numerical values, shapes, materials, structural elements, the arrangement and connection of the structural elements, steps, the processing order of the steps etc. shown in the following exemplary embodiments are mere examples, and various modifications and revisions may be made to the present disclosure. Among the structural elements in the following exemplary embodiments, structural elements not recited in any one of the independent claims which show the broadest concept are described as arbitrary structural elements.

Embodiment 1

A moving picture coding apparatus which uses a moving picture coding method according to the present embodiment will be described based on FIGS. 13 to 22.

[1-1. Configuration of Moving Picture Coding Apparatus]

Figure 13:
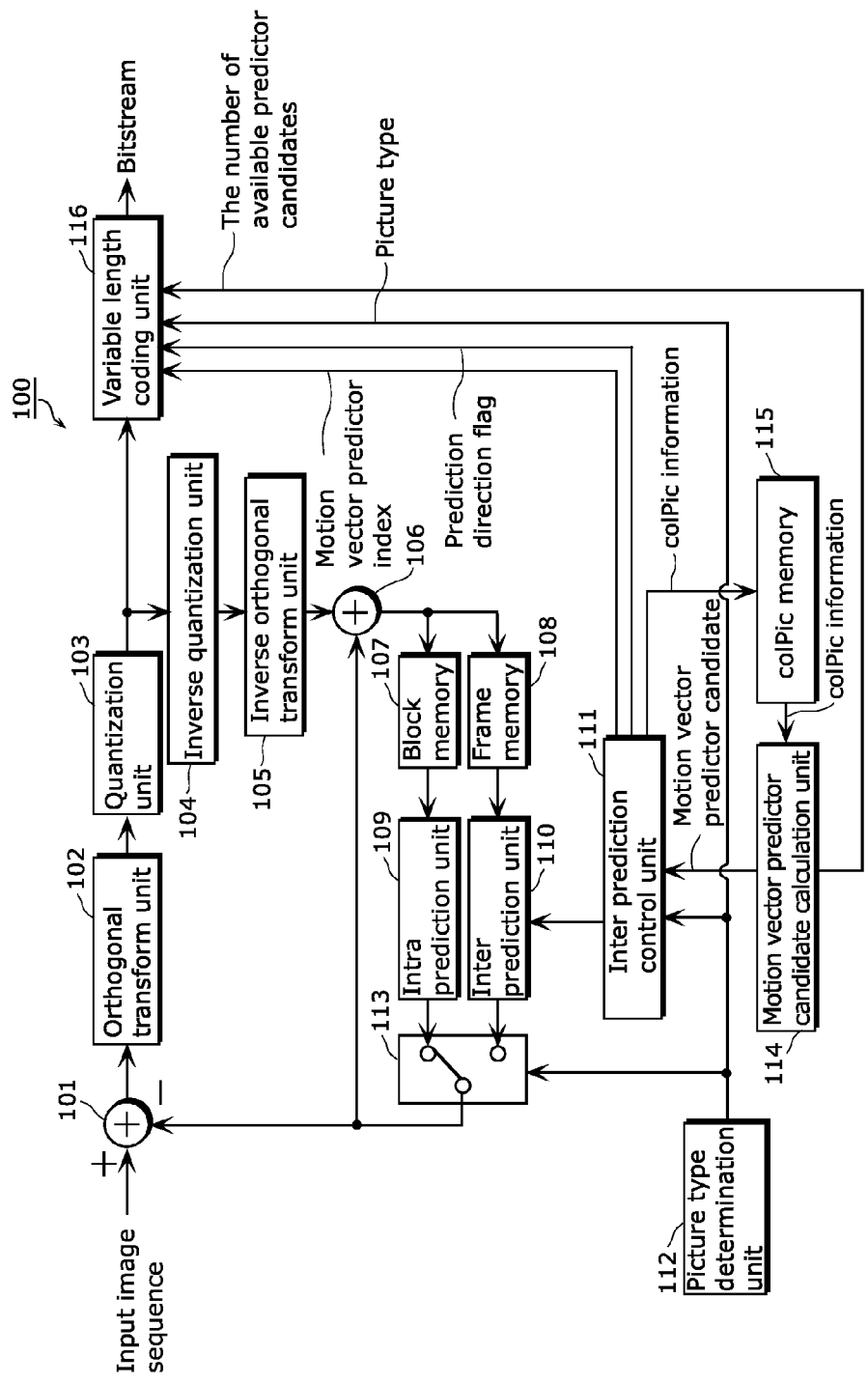
FIG. 13 is a block diagram showing a configuration of a moving picture coding apparatus according to Embodiment 1.

First is a description of the configuration of the moving picture coding apparatus based on FIG. 13. FIG. 13 is a block diagram showing a configuration of a moving picture coding apparatus 100 according to at Embodiment 1.

As shown in FIG. 13, the moving picture coding apparatus 100 includes a subtraction unit 101, an orthogonal transform unit 102, a quantization unit 103, an inverse quantization unit 104, an inverse orthogonal transform unit 105, an addition unit 106, a block memory 107, a frame memory 108, an intra prediction unit 109, an inter prediction unit 110, an inter prediction control unit 111, a picture type determination unit 112, a switch 113, a motion vector predictor candidate calculation unit 114, a colPic memory 115, and a variable length coding unit 116.

The subtraction unit 101 generates prediction error data by subtracting, for each block, predicted image data from input image data included in an input image sequence. The orthogonal transform unit 102 transforms the generated prediction error data from an image domain into a frequency domain. The quantization unit 103 performs quantization processing on the prediction error data which has been transformed into the frequency domain.

The inverse quantization unit 104 performs inverse quantization processing on the prediction error data on which quantization processing has been performed by the quantization unit 103. The inverse orthogonal transform unit 105 transforms the prediction error data on which inverse quantization processing has been performed, from the frequency domain into the image domain.

The addition unit 106 generates reconstructed image data by adding, for each block to be coded, predicted image data and the prediction error data on which inverse quantization processing has been performed by the inverse orthogonal transform unit 105. The block memory 107 stores reconstructed image data on a block-by-block basis. The frame memory 108 stores reconstructed image data on a frame-by-frame basis.

The picture type determination unit 112 determines which of picture types, namely, I-picture, B-picture, and P-picture, an input image data is to be coded as. Then, the picture type determination unit 112 generates picture type information. The intra prediction unit 109 generates intra-predicted image data of a current block to be coded by performing intra prediction using the reconstructed image data in block units stored in the block memory 107. The inter prediction unit 110 generates inter-predicted image data of a current block to be coded by performing inter prediction using the reconstructed image data in frame units stored in the frame memory 108, and a motion vector derived by motion detection and the like.

The switch 113 outputs the intra-predicted image data generated by the intra prediction unit 109 to the subtraction unit 101 and the addition unit 106 as predicted image data of the current block, if intra prediction coding is performed on the current block. On the other hand, the switch 113 outputs the inter-predicted image data generated by the inter prediction unit 110 to the subtraction unit 101 and the addition unit 106 as predicted image data of the current block if the inter prediction coding is performed on the current block.

The motion vector predictor candidate calculation unit 114 derives motion vector predictor candidates in the motion vector predictor designating mode, using motion vectors of blocks adjacent to the current block and the like and colPic information such as information of a motion vector of a co-located block stored in the colPic memory 115. Then, the motion vector predictor candidate calculation unit 114 calculates the number of available predictor candidates using the method described below. Further, the motion vector predictor candidate calculation unit 114 assigns the values of the motion vector predictor index to the derived motion vector predictor candidates. Then, the motion vector predictor candidate calculation unit 114 sends the motion vector predictor candidates and the motion vector predictor indices to the inter prediction control unit 111. The motion vector predictor candidate calculation unit 114 transmits the number of calculated available predictor candidates to the variable length coding unit 116.

The inter prediction control unit 111 controls the inter prediction unit 110 so as to cause the inter prediction unit 110 to perform inter prediction coding, using the inter-predicted image generated using a motion vector derived by motion detection. Further, the inter prediction control unit 111 selects, using the method described below, a motion vector predictor candidate most suitable for coding a motion vector used for inter prediction coding. Then, the inter prediction control unit 111 sends a motion vector predictor index corresponding to the selected motion vector predictor candidate, and prediction error information (motion vector difference) to the variable length coding unit 116. Furthermore, the inter prediction control unit 111 transfers colPic information including information of a motion vector of the current block and the like to the colPic memory 115.

The variable length coding unit 116 performs variable length coding processing on prediction error data on which quantization processing has been performed, a prediction direction flag, picture type information, and a motion vector difference, thereby generating a bitstream. Further, the variable length coding unit 116 sets the motion vector predictor candidate list size to the number of available predictor candidates. Then, the variable length coding unit 116 variable-length codes the motion vector predictor index used for coding a motion vector by assigning, thereto, a bit string according to the motion vector predictor candidate list size.

[1-2. Processing Procedure of Moving Picture Coding Method]

Figure 14:
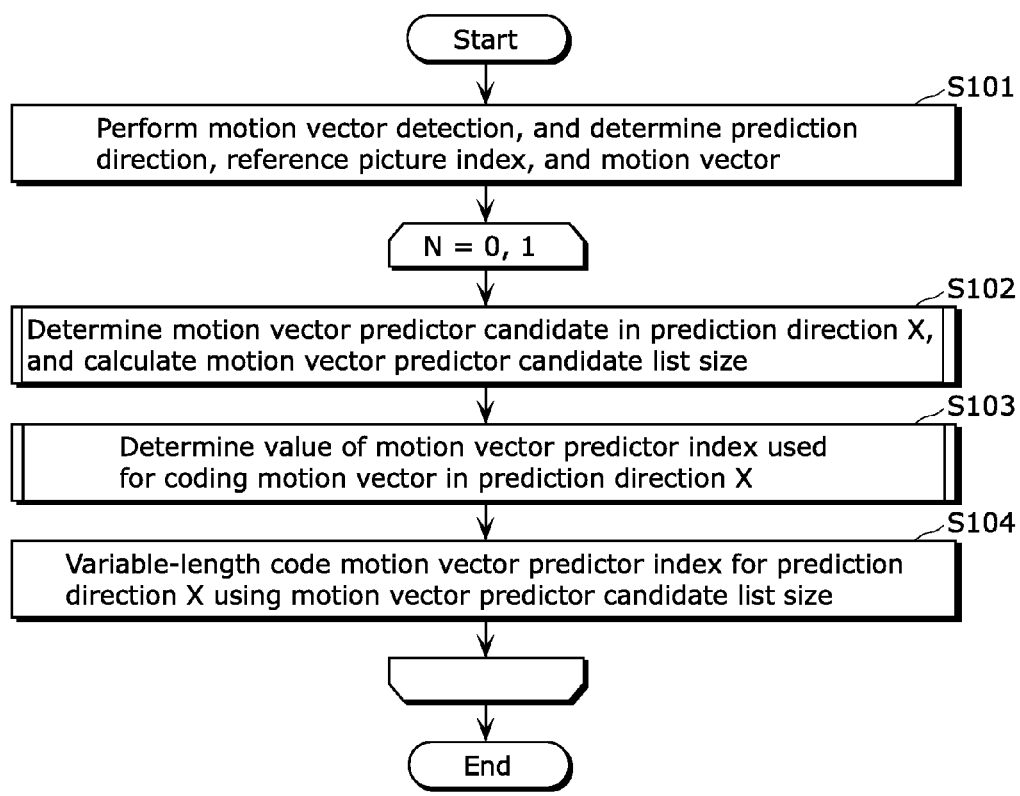
FIG. 14 is a flowchart showing processing operation of the moving picture coding apparatus according to Embodiment 1.

Next is a description of processing procedure of the moving picture coding method executed by the moving picture coding apparatus, based on FIG. 14. FIG. 14 is a flowchart showing processing operation of the moving picture coding apparatus 100 according to Embodiment 1.

In step S101, the inter prediction control unit 111 determines a prediction direction, a reference picture index, and a motion vector of a current block to be coded by motion detection. Here, in motion detection, a difference value indicating a difference between a current block to be coded in a picture to be coded and a block in a reference picture is calculated, and a block in the reference picture with which the difference value is smallest is determined as a reference block. Then, a motion vector is obtained based on the position of a current block to be coded and the position of a reference block position using the method for obtaining a motion vector, for instance. Further, the inter prediction control unit 111 performs motion detection on each of reference pictures in the prediction directions 0 and 1, and determines whether to select the prediction direction 0, the prediction direction 1 or bidirectional prediction using, for example, the following expression for an R-D optimization model, or the like.

$$\text{Cost} = D + \lambda \times R \quad \text{(Expression 3)}$$

In Expression 3, D denotes coding distortion. For instance, a sum of absolute differences are used for the coding distortion D each of which is an absolute difference between a pixel value obtained by coding and decoding a current block using a predicted image generated using a certain motion vector and an original pixel value of the current block. R denotes a generated code amount. For instance, a code amount necessary to code a motion vector used for generating a predicted image is used for the generated code amount R. Further, $\lambda$ denotes a Lagrange undetermined multiplier.

In step S102, the motion vector predictor candidate calculation unit 114 derives motion vector predictor candidates from blocks adjacent to the current block and a co-located block thereof. Further, the motion vector predictor candidate calculation unit 114 calculates the motion vector predictor candidate list size according to the method described below.

For example, in the case as shown in FIG. 3, the motion vector predictor candidate calculation unit 114 selects motion vectors which adjacent blocks A, B, C, and D have, as motion vector predictor candidates of the current block. Furthermore, the motion vector predictor candidate calculation unit 114 calculates a motion vector, for instance, which is calculated using a temporal prediction mode from a motion vector of the co-located block, as a motion vector predictor candidate.

Figure 15A:
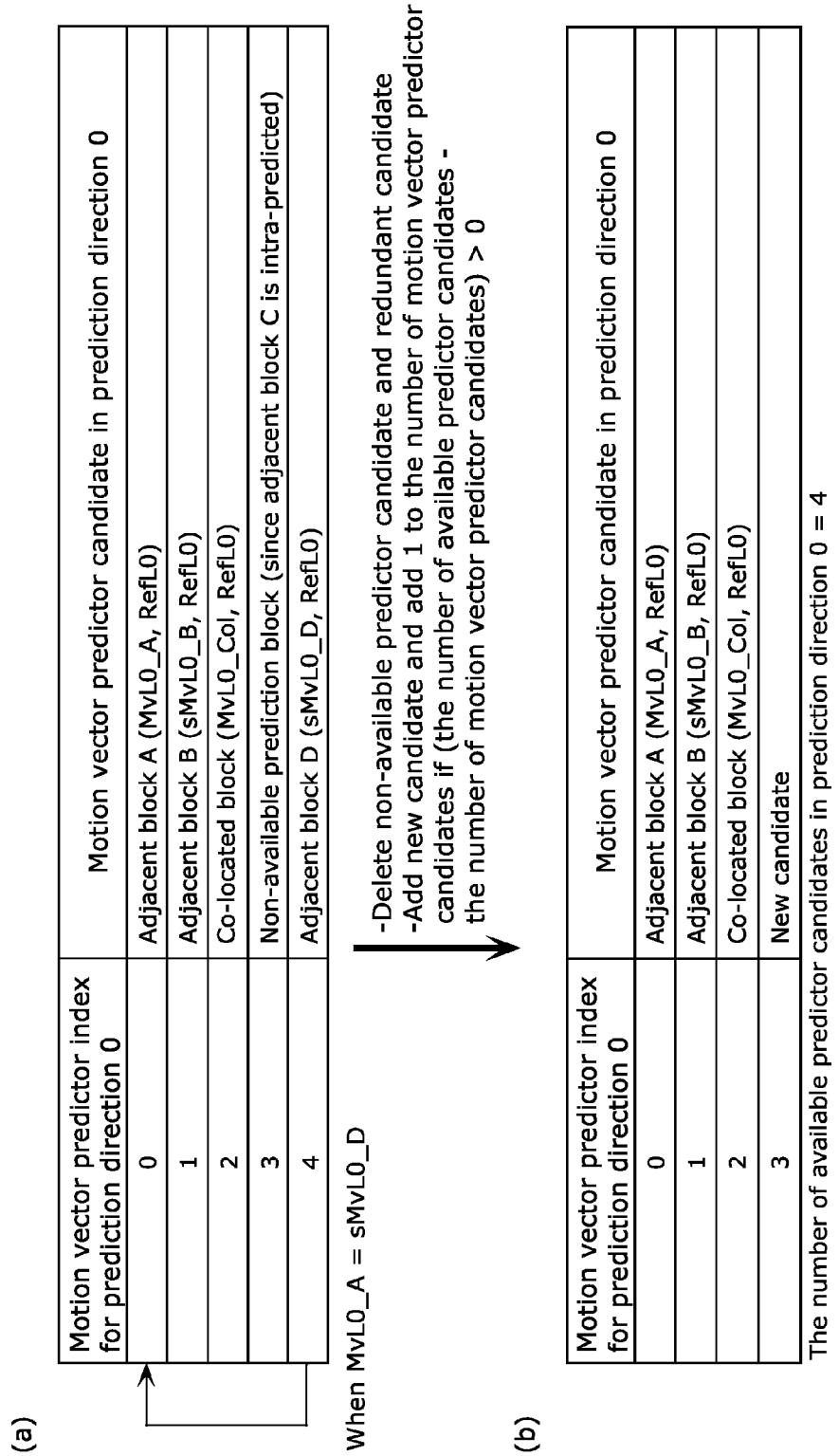
FIG. 15A shows an example in (a) and (b) of a motion vector predictor candidate list for the prediction direction 0 in Embodiment 1.
Figure 16A:
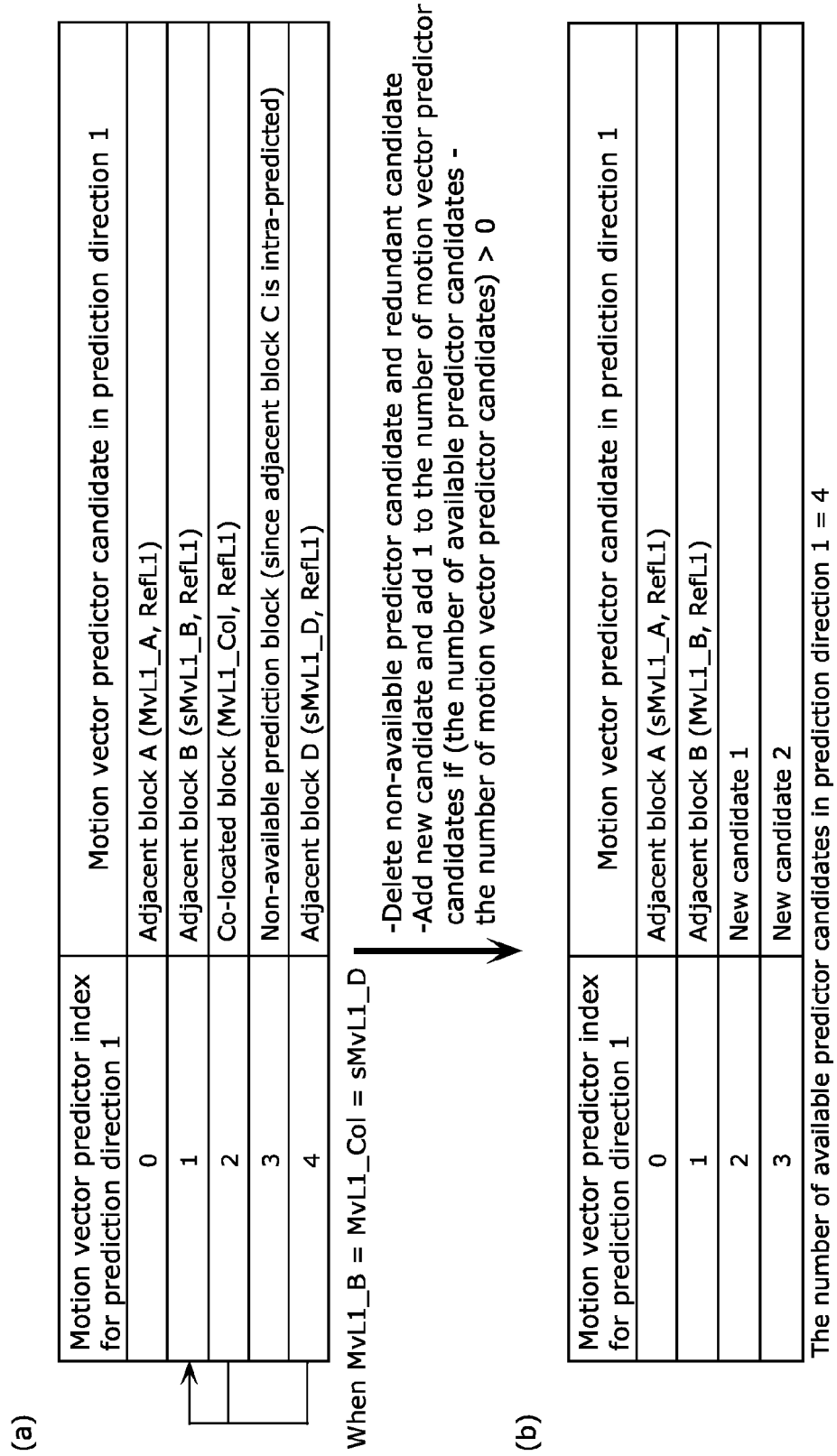
FIG. 16A shows an example in (a) and (b) of a motion vector predictor candidate list for the prediction direction 1 in Embodiment 1.

The motion vector predictor candidate calculation unit 114 assigns motion vector predictor indices to the motion vector predictor candidates in the prediction directions 0 and 1, as shown in (a) in FIG. 15A and (a) in FIG. 16A. Then, the motion vector predictor candidate calculation unit 114 calculates motion vector predictor candidate lists as shown in (b) in FIG. 15A and (b) in FIG. 16A, and the sizes of the motion vector predictor candidate lists by deleting a non-available predictor candidate and a redundant candidate and adding a new candidate, using the method described below.

The smaller a value of a motion vector predictor index is, the shorter code is assigned to the motion vector predictor index. Specifically, if the value of a motion vector predictor index is small, the amount of information necessary for the motion vector predictor index is small. On the other hand, if the value of a motion vector predictor index is large, the amount of information necessary for the motion vector predictor index is large. Thus, coding efficiency is increased by assigning a motion vector predictor index having a small value to a motion vector predictor candidate having a high possibility of becoming a motion vector predictor with high precision.

In view of this, the motion vector predictor candidate calculation unit 114 may measure, for each motion vector predictor candidate, the number of times at which the motion vector predictor candidate has been selected as a motion vector predictor, and assign a motion vector predictor index having a small value to a motion vector predictor candidate whose number of times at which the candidate has been selected is large, for example. Specifically, it is possible to consider identifying a motion vector predictor selected in an adjacent block, and in coding a current block, assigning a motion vector predictor index having a small value to the identified motion vector predictor candidate.

It should be noted that if an adjacent block does not have information of a motion vector and the like (if the adjacent block is coded by intra prediction, if the adjacent block is located, for instance, outside a boundary of a picture or a slice, if the adjacent block is not coded yet, or the like), the adjacent block cannot be utilized as a motion vector predictor candidate.

In the present embodiment, a candidate that cannot be utilized as a motion vector predictor candidate is referred to as a non-available predictor candidate. A candidate that can be utilized as a motion vector predictor candidate is referred to as an available predictor candidate. Further, among a plurality of motion vector predictor candidates, a candidate whose value is the same as any one of the other motion vector predictors is referred to as a redundant candidate.

In the case of FIG. 3, adjacent block C is a block coded by intra prediction, and thus is assumed to be a non-available predictor candidate. Further, motion vector predictor sMvL0_D in the prediction direction 0 generated from adjacent block D has the same value as the value of motion vector predictor MvL0_A in the prediction direction 0 generated from adjacent block A, and thus is assumed to be a redundant candidate.

In step S103, the inter prediction control unit 111 determines a value of a motion vector predictor index to be used for coding a motion vector in the prediction direction X by using the method described below.

In step S104, the variable length coding unit 116 variable length-codes motion vector predictor indices of motion vector predictor candidates to be used for coding motion vectors in the prediction direction X by assigning thereto bit strings according to the motion vector predictor candidate list size as shown in FIG. 6.

In the present embodiment, as shown in (a) in FIG. 15A and (a) in FIG. 16A, "0" is assigned as a value of a motion vector predictor index corresponding to adjacent block A. "1" is assigned as a value of a motion vector predictor index corresponding to adjacent block B. "2" is assigned as a value of a motion vector predictor index corresponding to a co-located block. "3" is assigned as a value of a motion vector predictor index corresponding to adjacent block C. "4" is assigned as a value of a motion vector predictor index corresponding to adjacent block D.

It should be noted that the way to assign motion vector predictor indices is not necessarily limited to this example. For example, if a new candidate is added using the method described below, the variable length coding unit 116 may assign a small value to a motion vector predictor candidate which is not newly added (and corresponds to a first candidate), and a large value to the new candidate. Specifically, the variable length coding unit 116 may preferentially assign a motion vector predictor index having a small value to a motion vector predictor candidate which is not newly added. It should be noted that if a second candidate is used using a method described below, a value smaller than that of the second candidate is assigned to each of the values of motion vector predictor indices of a first candidate and a new candidate. This is because the second candidate is a candidate to be assigned to a null element of the motion vector predictor candidate lists when the motion vector predictor candidate list size is fixed and when the number of first candidates and new candidates is smaller than the motion vector predictor candidate list size.

Further, motion vector predictor candidates are not necessarily limited to be at the positions of adjacent blocks A, B, C, and D. For example, an adjacent block located on bottom-left adjacent block D, for instance, may be used to obtain a motion vector predictor candidate. Further, all the adjacent blocks do not necessarily need to be used to obtain motion vector predictor candidates. For example, only adjacent blocks A and B may be used to obtain motion vector predictor candidates. Alternatively, adjacent blocks may be sequentially scanned by using, for instance, adjacent block A if adjacent block D is a non-available predictor candidate.

Further, in the present embodiment, although the variable length coding unit 116 adds a motion vector predictor index to a bitstream in step S104 in FIG. 14, a motion vector predictor index does not necessarily need to be added to a bitstream. For example, if the motion vector predictor candidate list size is 1, the variable length coding unit 116 may not add a motion vector predictor index to a bitstream. Accordingly, the amount of information can be reduced by that of the motion vector predictor index.

Figure 17A:
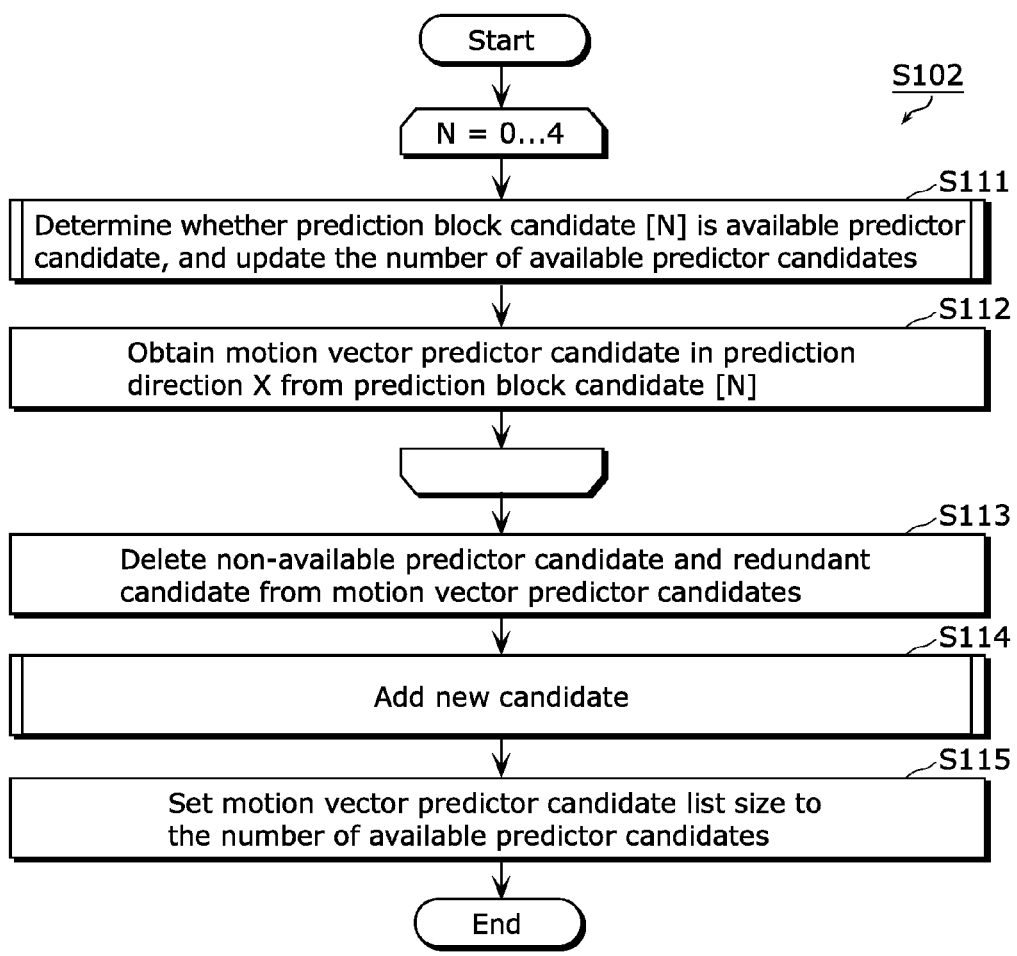
FIG. 17A is a flowchart showing processing for calculating a motion vector predictor candidate and a motion vector predictor candidate list size in Embodiment 1.

FIG. 17A is a flowchart showing detailed processing of step S102 in FIG. 14. Specifically, FIG. 17A shows a method for calculating motion vector predictor candidates and the motion vector predictor candidate list size. The following is a description of FIG. 17A.

In step S111, the motion vector predictor candidate calculation unit 114 determines, using the method described below, whether a prediction block candidate [N] is an available predictor candidate. Then, the motion vector predictor candidate calculation unit 114 updates the number of available predictor candidates in accordance with the determination result.

Here, N is an index value for denoting each prediction block candidate. In the present embodiment, N is one of the values from 0 to 4. Specifically, adjacent block A in FIG. 3 is assigned to a prediction block candidate [0]. Adjacent block B in FIG. 3 is assigned to a prediction block candidate [1]. A co-located block is assigned to a prediction block candidate [2]. Adjacent block C in FIG. 3 is assigned to a prediction block candidate [3]. Adjacent block D in FIG. 3 is assigned to a prediction block candidate [4].

In step S112, the motion vector predictor candidate calculation unit 114 derives a motion vector predictor candidate in the prediction direction X from the prediction block candidate [N] using Expressions 1 and 2 above, and adds the derived candidate to a corresponding one of the motion vector predictor candidate lists.

In step S113, the motion vector predictor candidate calculation unit 114 searches for and deletes a non-available predictor candidate and a redundant candidate from the motion vector predictor candidate lists, as shown in FIGS. 15A and 16A.

In step S114, the motion vector predictor candidate calculation unit 114 adds a new candidate to a corresponding one of the motion vector predictor candidate lists by using the method described below. Here, when a new candidate is added, the motion vector predictor candidate calculation unit 114 may reassign values of motion vector predictor indices so as to preferentially assign a small motion vector predictor index to a motion vector predictor candidate which is not newly added. Specifically, the motion vector predictor candidate calculation unit 114 may reassign values of motion vector predictor indices so as to assign a motion vector predictor index having a large value to the new candidate. In this manner, the amount of coding motion vector predictor indices can be reduced.

In step S115, the motion vector predictor candidate calculation unit 114 sets the motion vector predictor candidate list size to the number of available predictor candidates calculated in step S111. In the examples of FIGS. 15A and 16A, by using the method described below, "4" is calculated as the number of available predictor candidates in the prediction direction 0, and the motion vector predictor candidate list size for the prediction direction 0 is set to "4". Further, "4" is calculated as the number of available predictor candidates in the prediction direction 1, and the motion vector predictor candidate list size for the prediction direction 1 is set to "4".

It should be noted that a new candidate in step S114 is a candidate newly added to motion vector predictor candidates using the method described below, if the number of motion vector predictor candidates has not reached the number of available predictor candidates. For example, a new candidate may be a motion vector predictor generated from an adjacent block located on bottom-left adjacent block D in FIG. 3. A new candidate may be a motion vector predictor generated from blocks corresponding to blocks A, B, C, and D adjacent a co-located block, for example. Further, a new candidate may be a motion vector predictor calculated from a total of motion vectors in the entire picture plane or a certain area of a reference picture, for example. In this way, coding efficiency can be improved by the motion vector predictor candidate calculation unit 114 adding a new motion vector predictor as a new candidate if the number of motion vector predictor candidates has not reached the number of available predictor candidates.

Figure 18:
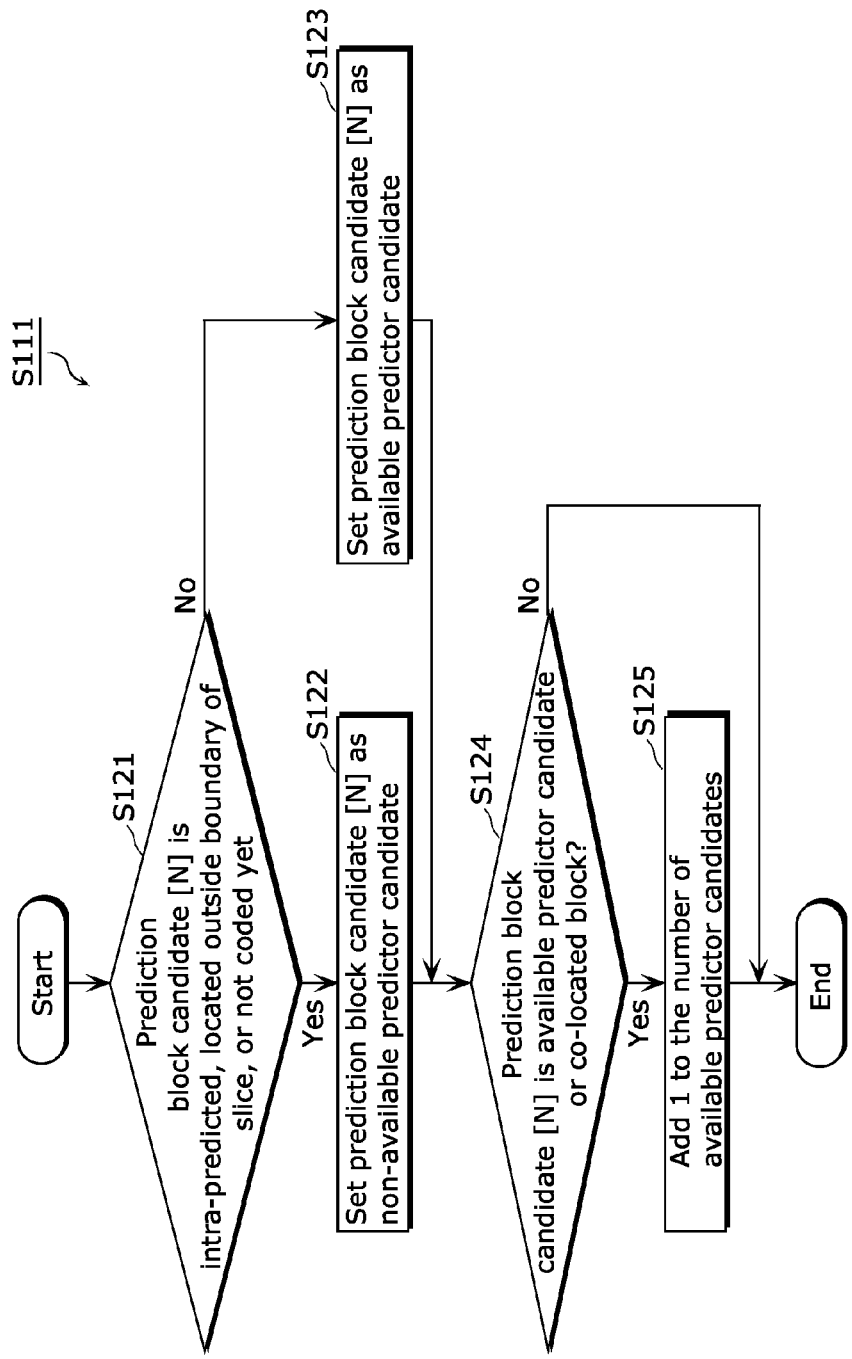
FIG. 18 is a flowchart showing processing for updating the number of available predictor candidates in Embodiment 1.

FIG. 18 is a flowchart showing detailed processing of step S111 in FIG. 17A. Specifically, FIG. 18 shows a method for determining whether the prediction block candidate [N] is an available predictor candidate, and updating the number of available predictor candidates. The following is a description of FIG. 18.

In step S121, the motion vector predictor candidate calculation unit 114 determines whether a prediction block candidate [N] is (1) intra-predicted, (2) located outside a boundary of a slice or a picture which includes a current block to be coded, or (3) is not coded yet.

If the determination result in step S121 is true here (Yes in step S121), the motion vector predictor candidate calculation unit 114 sets the prediction block candidate [N] as a non-available predictor candidate in step S122. On the other hand, if the determination result in step S121 is false (No in step S121), the motion vector predictor candidate calculation unit 114 sets the prediction block candidate [N] as an available predictor candidate in step S123.

In step S124, the motion vector predictor candidate calculation unit 114 determines whether the prediction block candidate [N] is an available predictor candidate or a co-located block candidate. Here, if the determination result in step S124 is true (Yes in step S124), the motion vector predictor candidate calculation unit 114 adds 1 to the number of available predictor candidates, and updates the number of motion vector predictor candidates in step 55. On the other hand, if the determination result in step S124 is false (No in step S124), the motion vector predictor candidate calculation unit 114 does not update the number of available predictor candidates.

As described above, if a prediction block candidate is a co-located block, the motion vector predictor candidate calculation unit 114 adds 1 to the number of available predictor candidates, irrespective of whether the co-located block is an available predictor candidate or a non-available predictor candidate. Accordingly, even if information of a co-located block is lost due to packet loss or the like, there is no difference in the number of available predictor candidates between the moving picture coding apparatus and the moving picture decoding apparatus.

The motion vector predictor candidate list size is set to the number of available predictor candidates in step S115 in FIG. 17A. Furthermore, in step S104 in FIG. 14, the motion vector predictor candidate list size is used for variable-length coding motion vector predictor indices. Accordingly, even if reference picture information including information of a co-located block and the like is lost, the moving picture coding apparatus 100 can generate a bitstream from which a motion vector predictor index can be successfully decoded.

Figure 19A:
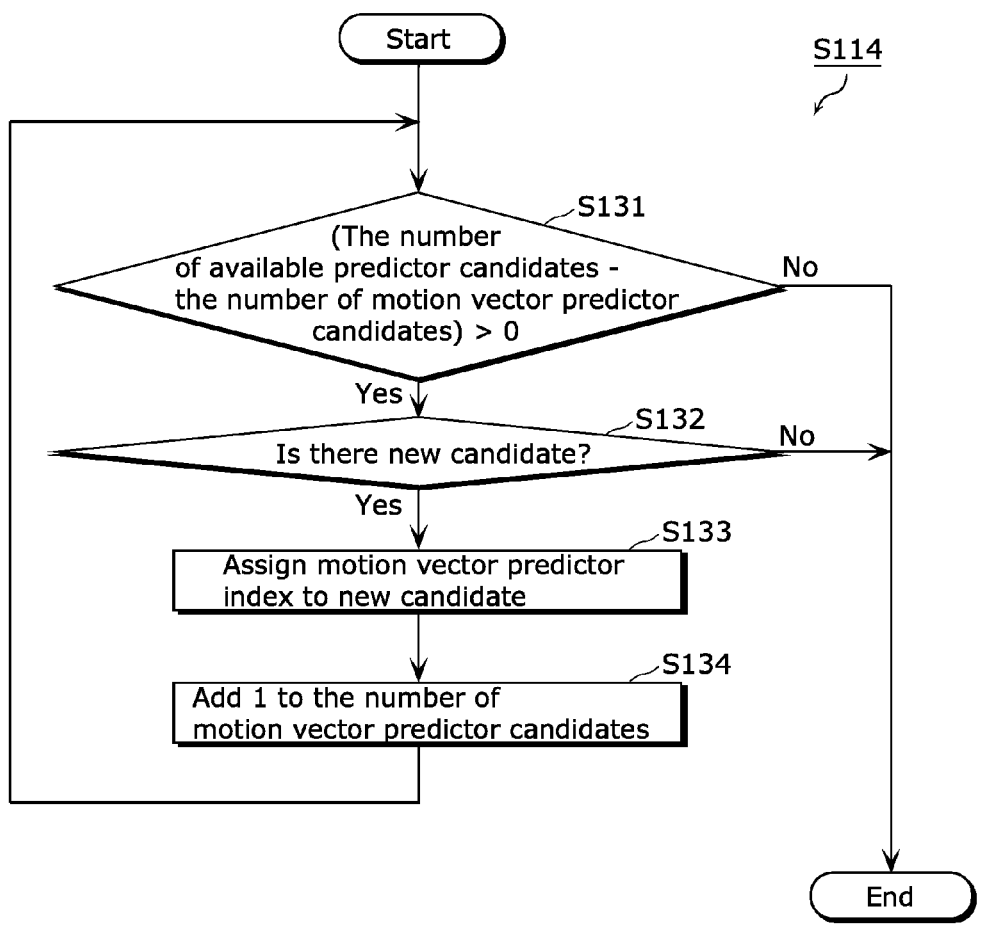
FIG. 19A is a flowchart showing processing for adding a new candidate in Embodiment 1.

FIG. 19A is a flowchart showing detailed processing of step S114 in FIG. 17A. Specifically, FIG. 19A shows a method for adding a new candidate. The following is a description of FIG. 19A.

In step S131, the motion vector predictor candidate calculation unit 114 determines whether the number of motion vector predictor candidates is smaller than the number of available predictor candidates. Specifically, the motion vector predictor candidate calculation unit 114 determines whether the number of motion vector predictor candidates has not reached the number of available predictor candidates.

Here, if the determination result in step S131 is true (Yes in step S131), the motion vector predictor candidate calculation unit 114 determines in step S132 whether there is a new candidate which can be added to a corresponding one of the motion vector predictor candidate lists as a motion vector predictor candidate. Here, if the determination result in step S132 is true (Yes in step S132), the motion vector predictor candidate calculation unit 114 assigns a value of a motion vector predictor index to the new candidate, and adds the new candidate to a corresponding one of the motion vector predictor candidate lists in step S133. Furthermore, in step S134, the motion vector predictor candidate calculation unit 114 adds 1 to the number of motion vector predictor candidates.

On the other hand, if the determination result in step S131 or step S132 is false (No in step S131 or S132), new candidate adding processing ends. Specifically, if the number of motion vector predictor candidates has reached the number of available predictor candidates, or if there is no new candidate, new candidate adding processing ends.

FIG. 20 is a flowchart showing detailed processing of step S103 in FIG. 14. Specifically, FIG. 20 shows processing regarding selection of a motion vector predictor candidate. The following is a description of FIG. 20.

In step S141, as initialization, the inter prediction control unit 111 sets motion vector predictor candidate index mvp_idx to 0, and sets the smallest motion vector difference to the maximum value.

In step S142, the inter prediction control unit 111 determines whether the value of motion vector predictor candidate index mvp_idx is smaller than the number of motion vector predictor candidates. Specifically, the inter prediction control unit 111 determines whether motion vector differences of all the motion vector predictor candidates have been calculated.

Here, if there still remains a motion vector predictor candidate for which calculation has not been performed (Yes in step S142), the inter prediction control unit 111 calculates a motion vector difference by subtracting a motion vector predictor candidate from a motion vector obtained as a result of motion detection (motion detection resultant vector) in step S143.

In step S144, the inter prediction control unit 111 determines whether the motion vector difference obtained in step S143 has a value smaller than the smallest motion vector difference.

Here, if the determination result in step S144 is true (Yes in step S144), the inter prediction control unit 111 updates the smallest motion vector difference and the value of a motion vector predictor index in step S145. On the other hand, if the determination result in step S144 is false (No in step S144), the inter prediction control unit 111 does not update the smallest motion vector difference and the value of a motion vector predictor index.

In step S146, the inter prediction control unit 111 updates a motion vector predictor candidate index by incrementing by +1, and returning back to step S142, the inter prediction control unit 111 determines whether a next motion vector predictor candidate is present.

On the other hand, if it is determined in step S142 that a motion vector difference has been calculated for all the motion vector predictor candidates (No in step S142), the inter prediction control unit 111 fixes, in step S147, the smallest motion vector difference and the motion vector predictor index which are set at last.

In this way, according to the moving picture coding apparatus 100 according to the present embodiment, the motion vector predictor candidate list size to be used when a motion vector predictor index is coded or decoded can be calculated using a method independent of reference picture information including information of a co-located block and the like. Accordingly, the moving picture coding apparatus 100 can improve error resistance.

More specifically, the moving picture coding apparatus 100 according to the present embodiment adds 1 to the number of available predictor candidates if a prediction block candidate is a co-located block, irrespective of whether the co-located block is an available predictor candidate. Then, the moving picture coding apparatus 100 determines a bit string to be assigned to a motion vector predictor index using the number of available predictor candidates calculated in this way. Accordingly, the moving picture coding apparatus 100 can generate a bitstream from which a motion vector predictor index can be successfully decoded even if reference picture information including information of a co-located block is lost.

Further, the moving picture coding apparatus 100 according to the present embodiment can improve coding efficiency by adding a new candidate having a new motion vector predictor as a motion vector predictor candidate if the number of motion vector predictor candidates has not reached the number of available predictor candidates.

It should be noted that although in the present embodiment, the moving picture coding apparatus 100 adds a new candidate having a new motion vector predictor as a motion vector predictor candidate if the number of motion vector predictor candidates has not reached the number of available predictor candidates, the present embodiment is not limited to this. For example, the moving picture coding apparatus 100 may set a new candidate having a new motion vector predictor as an initial value of all the motion vector predictor candidates on the motion vector predictor candidate lists when the motion vector predictor candidate lists are created. In this case, the moving picture coding apparatus 100 will calculate a motion vector predictor candidate, and overwrite the new candidate which is an initial value when the calculated motion vector predictor candidate is added to a corresponding one of the motion vector predictor candidate lists. Then, the moving picture coding apparatus 100 determines whether the calculated motion vector predictor candidate is a non-available predictor candidate or a redundant candidate, before the calculated motion vector predictor candidate is added to the corresponding motion vector predictor candidate list. Accordingly, if there is a non-available predictor candidate or a redundant candidate, the new candidate which is an initial value remains in the corresponding motion vector predictor candidate list. It is also possible to add a new candidate as a motion vector predictor candidate by using such a method.

In the present embodiment, the moving picture coding apparatus 100 determines a bit string to be assigned to a motion vector predictor index using the number of available predictor candidates calculated by always adding 1 if a prediction block candidate is a co-located block irrespective of whether the co-located block is an available predictor candidate, the present disclosure is not limited to this.

For example, the moving picture coding apparatus 100 may determine a bit string to be assigned to a motion vector predictor index, using the number of available predictor candidates calculated by always adding 1 also in the case of a prediction block candidate other than the co-located block in step S124 in FIG. 18. Specifically, the moving picture coding apparatus 100 may assign a bit string to a motion vector predictor index using the motion vector predictor candidate list size fixed to the maximum value M of the number of motion vector predictor candidates. In other words, assuming that all prediction block candidates are available predictor candidates, the moving picture coding apparatus 100 may fix the motion vector predictor candidate list size to the maximum value M of the number of motion vector predictor candidates, and code motion vector predictor indices.

For example, in the present embodiment, the maximum value M of the number of motion vector predictor candidates is 5 (adjacent block A, adjacent block B, co-located block, adjacent block C, adjacent block D), and thus the moving picture coding apparatus 100 may always set the motion vector predictor candidate list size to 5, and code motion vector predictor indices. Further, for example, if the maximum value M of the number of motion vector predictor candidates is 4 (adjacent block A, adjacent block B, adjacent block C, adjacent block D), the moving picture coding apparatus 100 may always set the motion vector predictor candidate list size to 4, and code motion vector predictor indices.

In this way, the moving picture coding apparatus 100 may determine the motion vector predictor candidate list size according to the maximum value M of the number of motion vector predictor candidates. Accordingly, it is possible to generate a bitstream from which the variable length decoding unit of the moving picture decoding apparatus can decode a motion vector predictor index in the bitstream without referring to information of adjacent blocks or a co-located block, which results in a reduction of the amount of processing to be performed by the variable length decoding unit.

Furthermore, the maximum value M of the number of motion vector predictor candidates may be embedded in a sequence parameter set (SPS), a picture parameter set (PPS), or a slice header, for instance. Accordingly, the maximum value M of the number of motion vector predictor candidates can be changed according to a current picture to be coded, thereby reducing the amount of processing and improving coding efficiency.

For example, it can be considered that the maximum value of the number of motion vector predictor candidates is set to 4 (adjacent block A, adjacent block B, adjacent block C, adjacent block D) in the case of a picture for which a co-located block is not referred to (a B-picture or a P-picture for which an I-picture is referred to), whereas the maximum value of the number of motion vector predictor candidates is set to 5 (adjacent block A, adjacent block B, co-located block, adjacent block C, adjacent block D) in the case of a picture for which a co-located block is referred to, and that maximum value is embedded into a sequence parameter set (SPS), a picture parameter set (PPS), or a slice header, for instance.

Embodiment 2

A moving picture decoding apparatus which uses a moving picture decoding method according to the present embodiment is described based on FIGS. 21 to 24.

[2-1. Configuration of Moving Picture Decoding Apparatus]

Figure 21:
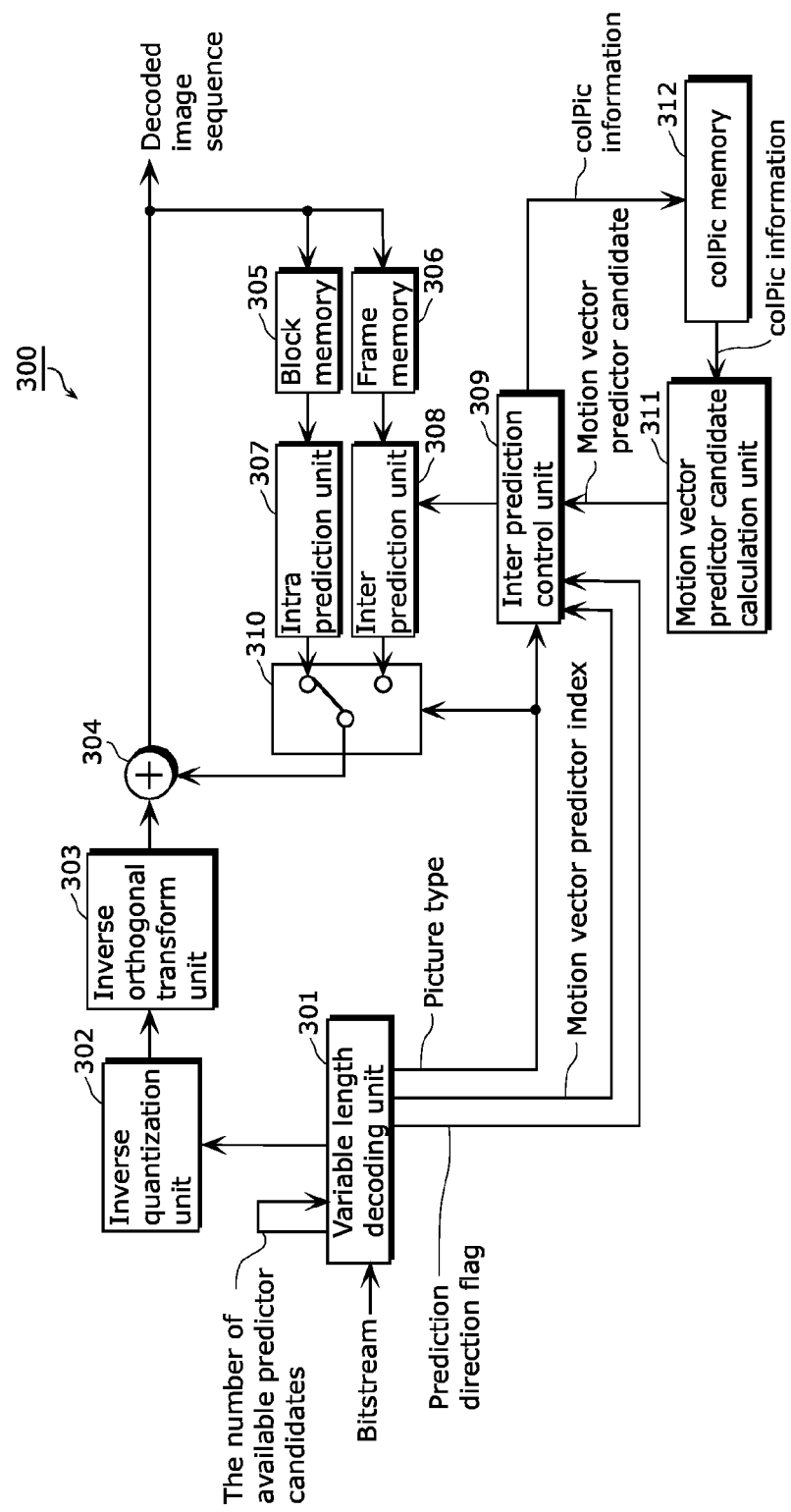
FIG. 21 is a block diagram showing a configuration of a moving picture decoding apparatus according to Embodiment 2.

First is a description of the configuration of a moving picture decoding apparatus based on FIG. 21. FIG. 21 is a block diagram showing a configuration of a moving picture decoding apparatus 300 according to Embodiment 3.

As shown in FIG. 21, the moving picture decoding apparatus 300 includes a variable length decoding unit 301, an inverse quantization unit 302, an inverse orthogonal transform unit 303, an addition unit 304, a block memory 305, a frame memory 306, an intra prediction unit 307, an inter prediction unit 308, an inter prediction control unit 309, a switch 310, a motion vector predictor candidate calculation unit 311, and a colPic memory 312.

The variable length decoding unit 301 performs variable length decoding processing on an input bitstream, and generates picture type information, a prediction direction flag, a quantization coefficient, and a motion vector difference. Further, the variable length decoding unit 301 performs variable length decoding processing on motion vector predictor indices using the number of available predictor candidates described below.

The inverse quantization unit 302 performs inverse quantization processing on the quantization coefficient obtained by variable length decoding processing. The inverse orthogonal transform unit 303 transforms an orthogonal transform coefficient obtained by inverse quantization processing from a frequency domain into an image domain, to generate prediction error data. The block memory 305 stores decoded image data generated by adding prediction error data and predicted image data, on a block-by-block basis. The frame memory 306 stores decoded image data on a frame-by-frame basis.

The intra prediction unit 307 generates predicted image data of a current block to be decoded by performing intra prediction using decoded image data in block units stored in the block memory 305. The inter prediction unit 308 generates predicted image data of a current block to be decoded by performing inter prediction using decoded image data in frame units stored in the frame memory 306.

If intra prediction decoding is performed on the current block, the switch 310 outputs the intra-predicted image data generated by the intra prediction unit 307 to the addition unit 304 as predicted image data of the current block. In contrast, if inter prediction decoding is performed on the current block, the switch 310 outputs the inter-predicted image data generated by the inter prediction unit 308 to the addition unit 304 as predicted image data of the current block.

Using, for instance, motion vectors of blocks adjacent to a current block to be decoded and colPic information such as information of a motion vector of a co-located block stored in the colPic memory 312, the motion vector predictor candidate calculation unit 311 derives motion vector predictor candidates in the motion vector predictor designating mode by using the method described below. Further, the motion vector predictor candidate calculation unit 311 assigns a value of a motion vector predictor index to each derived motion vector predictor candidate. Then, the motion vector predictor candidate calculation unit 311 sends the motion vector predictor candidates and the motion vector predictor indices to the inter prediction control unit 309.

The inter prediction control unit 309 selects, from among the motion vector predictor candidates, a motion vector predictor to be used for inter prediction, based on the decoded motion vector predictor index. Then, the inter prediction control unit 309 calculates a motion vector of the current block, based on the motion vector predictor and a motion vector difference. Then, the inter prediction control unit 309 causes the inter prediction unit 308 to generate an inter-predicted image using the calculated motion vector. Further, the inter prediction control unit 309 transfers colPic information including information of the motion vector of the current block and the like to the colPic memory 312.

Finally, the addition unit 304 generates decoded image data by adding predicted image data and prediction error data.

[1-2. Processing Procedure of Moving Picture Coding Method]

Figure 22:
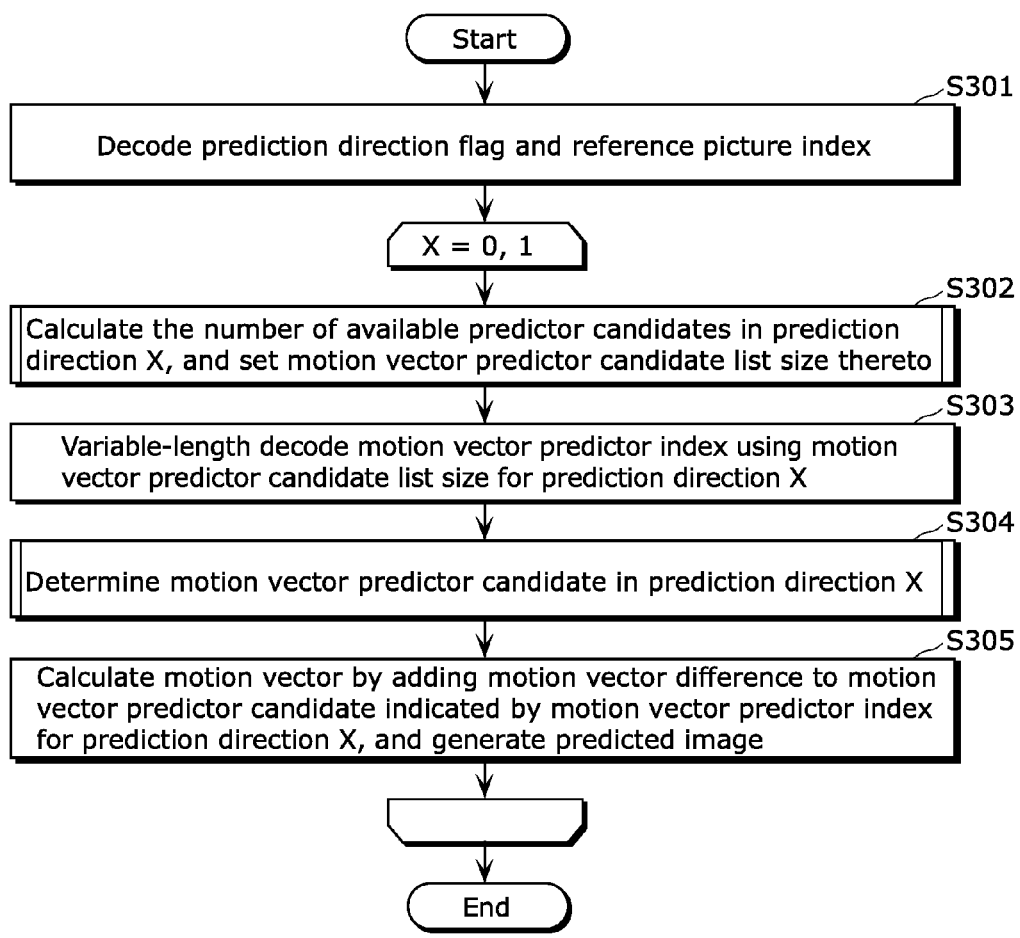
FIG. 22 is a flowchart showing processing operation of the moving picture decoding apparatus according to Embodiment 2.

Next is a description of the processing procedure of the moving picture coding method executed by the moving picture coding apparatus, based on FIG. 22. FIG. 22 is a flowchart showing processing operation of the moving picture decoding apparatus 300 according to Embodiment 3.

In step S301, the variable length decoding unit 301 decodes a prediction direction flag and a reference picture index. Then, the value of the prediction direction X is determined according to the decoded prediction direction flag, and processing of the following steps S302 to S305 is performed.

In step S302, the motion vector predictor candidate calculation unit 311 calculates the number of available predictor candidates using the method described below. Then, the motion vector predictor candidate calculation unit 311 sets the motion vector predictor candidate list size to the calculated number of available predictor candidates.

In step S303, the variable length decoding unit 301 variable-length decodes the motion vector predictor index in a bitstream using the calculated motion vector predictor candidate list size.

In step S304, the motion vector predictor candidate calculation unit 311 generates motion vector predictor candidates from blocks adjacent to the current block and a co-located block using the method described below.

In step S305, the inter prediction control unit 309 adds the decoded motion vector difference to the motion vector predictor candidate indicated by the decoded motion vector predictor index, to calculate a motion vector. Then, the inter prediction control unit 309 causes the inter prediction unit 308 to generate an inter-predicted image using the calculated motion vector.

It should be noted that if the motion vector predictor candidate list size calculated in step S302 is "1", it may be estimated that a motion vector predictor index is 0, without being decoded.

Figure 23:
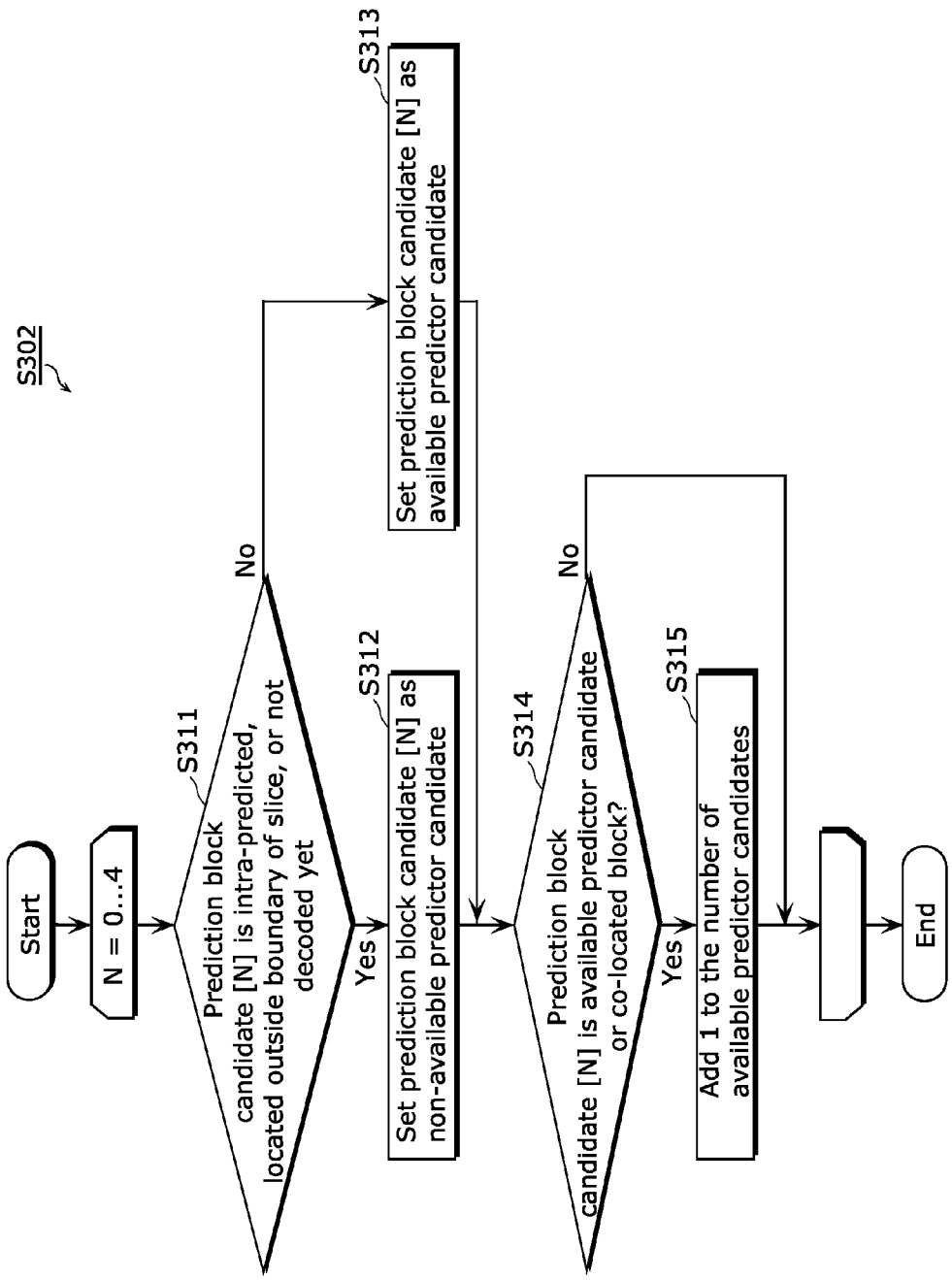
FIG. 23 is a flowchart showing processing for calculating the number of available predictor candidates in Embodiment 2.

FIG. 23 is a flowchart showing detailed processing of step S302 in FIG. 22. Specifically, FIG. 23 shows a method for determining whether a prediction block candidate [N] is an available predictor candidate, and calculating the number of available predictor candidates. The following is a description of FIG. 23.

In step S311, the motion vector predictor candidate calculation unit 311 determines whether a prediction block candidate [N] is (1) decoded by intra prediction, (2) located outside a boundary of a slice or a picture which includes a current block to be decoded, or (3) not decoded yet.

Here, if the determination result in step S311 is true (Yes in step S311), the motion vector predictor candidate calculation unit 311 sets the prediction block candidate [N] as a non-available predictor candidate in step S312. On the other hand, if the determination result in step S311 is false (No in S311), the motion vector predictor candidate calculation unit 311 sets the prediction block candidate [N] as an available predictor candidate in step S313.

In step S314, the motion vector predictor candidate calculation unit 311 determines whether the prediction block candidate [N] is an available predictor candidate or a co-located block candidate. Here, if the determination result in step S314 is true (Yes in step S314), the motion vector predictor candidate calculation unit 311 adds 1 to the number of available predictor candidates, and updates the value in step S5. On the other hand, if the determination result in step S314 is false (No in step S314), the motion vector predictor candidate calculation unit 311 does not update the number of available predictor candidates.

As described above, if a prediction block candidate is a co-located block, the motion vector predictor candidate calculation unit 311 adds 1 to the number of available predictor candidates, irrespective of whether the co-located block is an available predictor candidate or a non-available predictor candidate. Accordingly, even if information of a co-located block is lost due to packet loss or the like, there is no difference in the number of available predictor candidates between the moving picture coding apparatus and the moving picture decoding apparatus.

The motion vector predictor candidate list size is set to the number of available predictor candidates in step S302 in FIG. 22. Furthermore, in S303 in FIG. 22, the motion vector predictor candidate list size is used for variable-length decoding motion vector predictor indices. Accordingly, even if reference picture information including information of a co-located block or the like is lost, the moving picture decoding apparatus 300 can successfully decode motion vector predictor indices.

Figure 24:
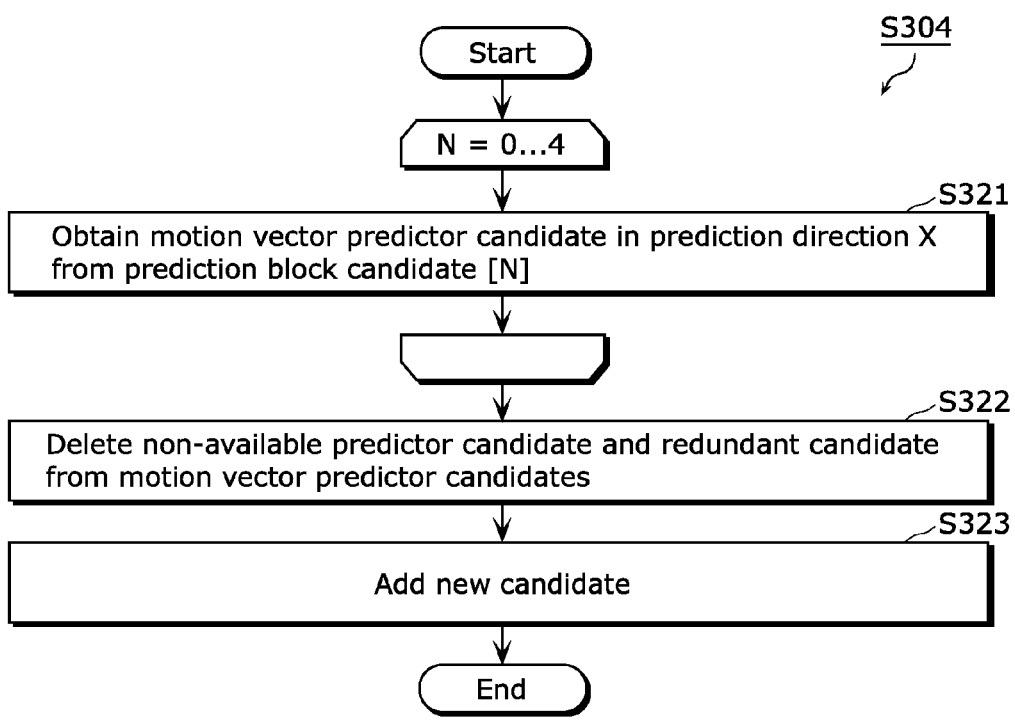
FIG. 24 is a flowchart showing processing for calculating a motion vector predictor candidate in Embodiment 2.

FIG. 24 is a flowchart showing detailed processing of step S304 in FIG. 22. Specifically, FIG. 24 shows a method for calculating motion vector predictor candidates. The following is a description of FIG. 24.

In step S321, the motion vector predictor candidate calculation unit 311 calculates, from the prediction block candidate [N], a motion vector predictor candidate in the prediction direction X using Expressions 1 and 2 above, and adds the calculated candidate to a corresponding one of the motion vector predictor candidate lists.

In step S322, the motion vector predictor candidate calculation unit 311 searches for and deletes a non-available predictor candidate and a redundant candidate from the motion vector predictor candidate lists, as shown in FIGS. 15A and 16A.

In step S323, the motion vector predictor candidate calculation unit 311 adds a new candidate to a corresponding one of the motion vector predictor candidate lists using the same method as in FIG. 19A.

FIG. 25 shows an example of syntax used when a motion vector predictor index is added to a bitstream. In FIG. 25, inter_pred_flag indicates a prediction direction flag, and mvp_idx indicates a motion vector predictor index. Num-MVPCand indicates the motion vector predictor candidate list size, and the size is set to the number of available predictor candidates calculated in the processing flow in FIG. 23 in the present embodiment.

As described above, according to the moving picture decoding apparatus 300 according to the present embodiment, the motion vector predictor candidate list size to be used when a motion vector predictor index is coded or decoded can be calculated by using a method independent of reference picture information including information of a co-located block and the like. Accordingly, the moving picture decoding apparatus 300 can appropriately decode a bitstream having improved error resistance.

More specifically, the moving picture decoding apparatus 300 according to the present embodiment always adds 1 to the number of available predictor candidates if a prediction block candidate is a co-located block, irrespective of whether the co-located block is an available predictor candidate. Then, the moving picture decoding apparatus 300 determines bit strings to be assigned to motion vector predictor indices using the number of available predictor candidates calculated in this way. Accordingly, even if reference picture information including information of a co-located block is lost, the moving picture decoding apparatus 300 can successfully decode a motion vector predictor index.

Further, if the number of motion vector predictor candidates has not reached the number of available predictor candidates, the moving picture decoding apparatus 300 according to the present embodiment can appropriately decode a bitstream for which coding efficiency has been improved by adding a new candidate having a new motion vector predictor as a motion vector predictor candidate.

It should be noted that in the present embodiment, although the moving picture decoding apparatus 300 adds a new candidate having a new motion vector predictor as a motion vector predictor candidate if the number of motion vector predictor candidates has not reached the number of available predictor candidates, the present disclosure is not limited to this. For example, as in Embodiment 1 described above, when creating the motion vector predictor candidate lists, the moving picture decoding apparatus 300 may set a new candidate having a new motion vector predictor as an initial value of all the motion vector predictor candidates on the motion vector predictor candidate lists.

It should be noted that although the moving picture decoding apparatus 300 according to the present embodiment determines bit strings to be assigned to motion vector predictor indices using the number of available predictor candidates calculated by always adding 1 when a prediction block candidate is a co-located block, irrespective of whether the co-located block is an available predictor candidate, the present disclosure is not limited to this.

For example, the moving picture decoding apparatus 300 may determine bit strings to be assigned to motion vector predictor indices, using the number of available predictor candidates calculated by always adding 1 also in the case of a prediction block candidate other than a co-located block in step S314 in FIG. 23. Specifically, the moving picture decoding apparatus 300 may assign a bit string to a motion vector predictor index, using the motion vector predictor candidate list size fixed to the maximum value M of the number of motion vector predictor candidates. In other words, assuming that all prediction block candidates are available predictor candidates, the moving picture decoding apparatus 300 may fix the motion vector predictor candidate list size to the maximum value M of the number of motion vector predictor candidates, and decode motion vector predictor indices.

For example, in the present embodiment, since the maximum value M of the number of motion vector predictor candidates is 5 (adjacent block A, adjacent block B, co-located block, adjacent block C, adjacent block D), the moving picture decoding apparatus 300 may always set the motion vector predictor candidate list size to 5, and decode motion vector predictor indices. Furthermore, when the maximum value M of the number of motion vector predictor candidates is 4 (adjacent block A, adjacent block B, adjacent block C, adjacent block D) in the case of a picture for which a co-located block is not referred to (a B-picture or a P-picture for which an I-picture is referred to), the moving picture decoding apparatus 300 may always set the motion vector predictor candidate list size to 4, and code motion vector predictor indices.

Accordingly, the variable length decoding unit 301 of the moving picture decoding apparatus 300 can decode a motion vector predictor index in a bitstream, without referring to information of an adjacent block or a co-located block. For example, the amount of processing to be performed by the variable length decoding unit 301 can be reduced by, for instance, skipping processing of steps S314 and S315 in FIG. 23.

FIG. 26 shows an example of syntax used when the motion vector predictor candidate list size is fixed to the maximum value M of the number of motion vector predictor candidates. If the motion vector predictor candidate list size is fixed to the maximum value of the number of motion vector predictor candidates, NumMVPCand can be deleted from the syntax as shown in FIG. 26, compared to the case of FIG. 25.

The maximum value M of the number of motion vector predictor candidates may be obtained from SPS, PPS, or a slice header. This enables the maximum value M of the number of motion vector predictor candidates to be changed according to a current picture to be decoded, thereby reducing the amount of processing, and improving coding efficiency. Thus, a bitstream can be decoded properly.

[Modification of Embodiments 1 and 2]

In Embodiments 1 and 2 described above, when the motion vector predictor candidate list size is fixed to the maximum value of the number of motion vector predictor candidates (corresponding to an example of a fixed number of two or more), if the motion vector predictor candidate lists have null elements, a predetermined motion vector predictor candidate for the improvement in error resistance (second candidate) may be inserted into each null portion of the motion vector predictor candidate lists, to improve error resistance.

As the second candidate, a motion vector predictor candidate having a motion vector whose magnitude is (0, 0), for example, may be assigned. The second candidate is a candidate for improving error resistance, and thus even if a plurality of second candidates are to be added, all the second candidates may be set to the same value. On the contrary, a new candidate is a candidate for improving coding efficiency, and thus different candidates are added if a plurality of new candidates are to be added. It should be noted that the new candidates may include a candidate which is the same as any of the one or more first candidates and the one or more second candidates, as a result.

It should be noted that a possible method of assigning the second candidate is (1) to assign the second candidate to a null candidate after adding a new candidate or (2) to insert the second candidate into all the elements of the motion vector predictor candidate lists, thereby initializing the lists.

First is a description of the case (1) in which the second candidate is assigned to a null candidate after adding a new candidate, in the moving picture coding apparatus 100 and the moving picture decoding apparatus 300.

Here, FIG. 15B shows tables illustrating examples of a motion vector predictor candidate list for the prediction direction 0. FIG. 16B shows tables illustrating examples of a motion vector predictor candidate list for the prediction direction 1.

FIGS. 15B and 16B show the motion vector predictor candidate lists in the case where the second candidate is assigned to a null candidate after adding a new candidate, and illustrate the case where the maximum value M of the number of motion vector predictor candidates is 5 (N=0 to 4).

Figure 17B:
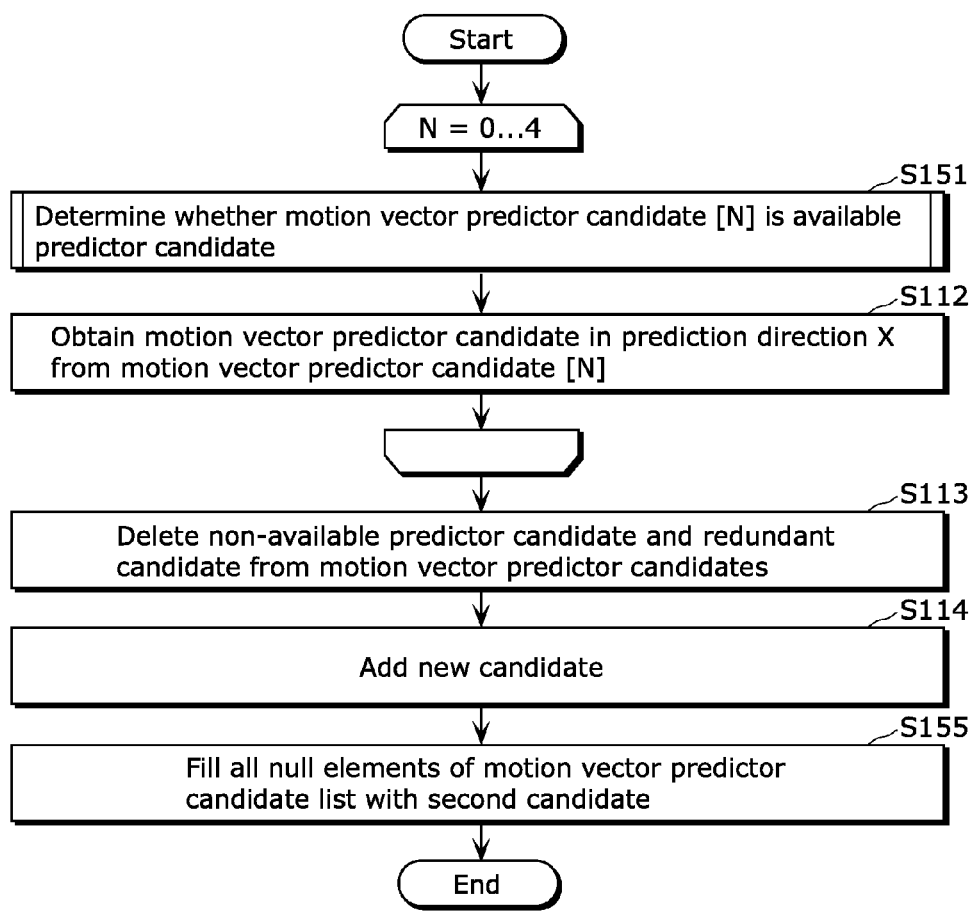
FIG. 17B is a flowchart showing processing for calculating a motion vector predictor candidate in the modification of the embodiments.

FIG. 17B is a flowchart showing a procedure of calculating a motion vector predictor candidate in the case where the second candidate is assigned to a null candidate after adding a new candidate. It should be noted that the same signs are used for the same processing as those in FIG. 17A. The calculation procedure corresponds to step S102 in FIG. 14 executed by the moving picture coding apparatus 100, and also corresponds to processing of step S304 in FIG. 22 executed by the moving picture decoding apparatus 300. The motion vector predictor candidate list size is fixed to the maximum value M, and thus does not need to be calculated.

In step S151, the motion vector predictor candidate calculation unit 114 of the moving picture coding apparatus 100 determines, using the method described above, whether a prediction block candidate [N] is an available predictor candidate.

In step S112, the motion vector predictor candidate calculation unit 114 derives a motion vector predictor candidate in the prediction direction X from the prediction block candidate [N] using Expressions 1 and 2 above, and adds the derived candidate to a corresponding one of the motion vector predictor candidate lists.

In step S113, the motion vector predictor candidate calculation unit 114 searches for and deletes a non-available predictor candidate and a redundant candidate from the motion vector predictor candidate lists.

Figure 19B:
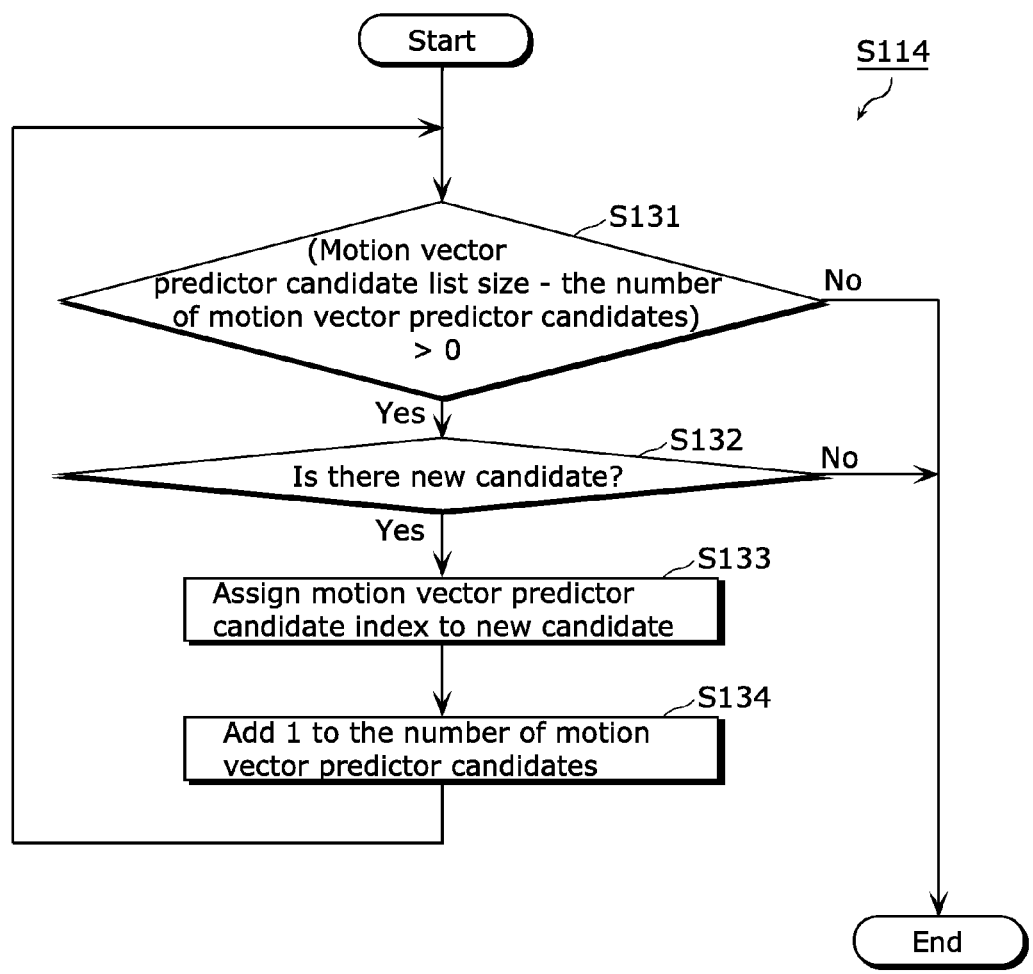
FIG. 19B is a flowchart showing processing for adding a new candidate in the modification of the embodiments.

In step S114, the motion vector predictor candidate calculation unit 114 adds a new candidate to a corresponding one of the motion vector predictor candidate lists. Here, FIG. 19B is a flowchart showing a procedure of adding a new candidate in the case where the motion vector predictor candidate list size is fixed. FIG. 19B is different from FIG. 19A only in the determination method in step S131, and new candidates can be added until the number of candidates reaches the motion vector predictor candidate list size, rather than the number of available predictor candidates.

In step S155, the motion vector predictor candidate calculation unit 114 adds the second candidate to the end of the motion vector predictor candidate lists, as shown in (b) in FIG. 15B and (b) in FIG. 16B. An example of the second candidate is a motion vector predictor candidate having a motion vector whose magnitude is (0, 0).

Figure 27:
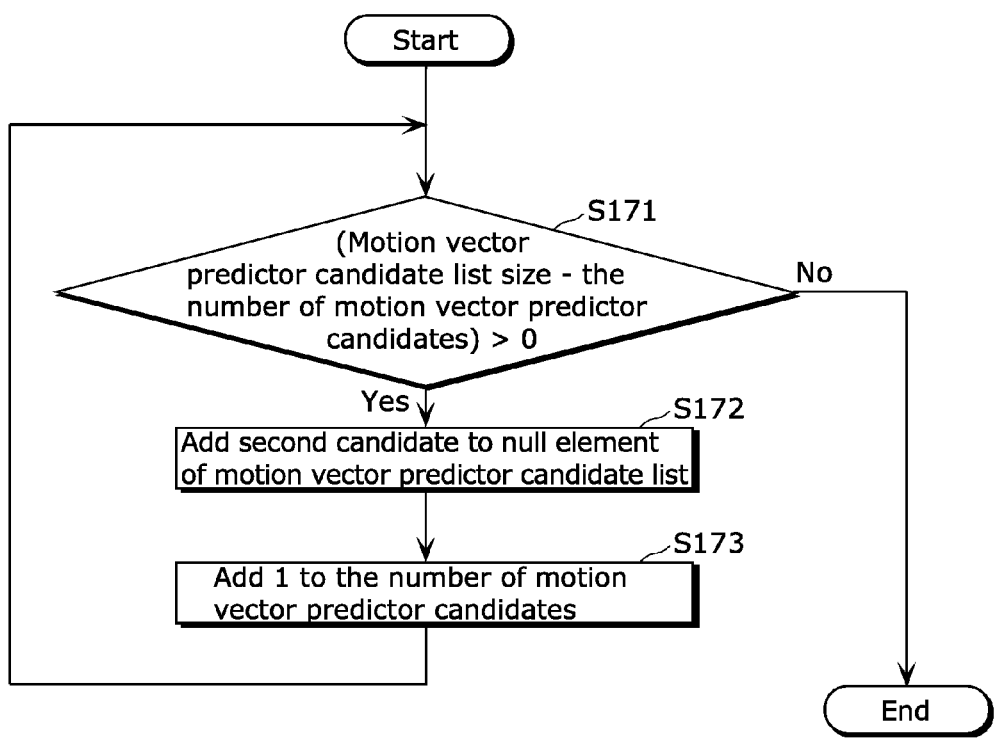
FIG. 27 is a flowchart showing processing for adding a second candidate in the modification of the embodiments.

Here, FIG. 27 is a flowchart showing a procedure of assigning the second candidate to a null candidate.

In step S171, the motion vector predictor candidate calculation unit 114 determines whether the motion vector predictor candidate list size (for example, maximum value M—the number of motion vector predictor candidates) is zero or more. Specifically, it is determined whether the motion vector predictor candidate lists include a null element.

If the determination result of step S171 is true (Yes in step S171), the motion vector predictor candidate calculation unit 114 adds, in step S172, the second candidate to the null element of a corresponding one of the motion vector predictor candidate lists. Furthermore, in step S173, the motion vector predictor candidate calculation unit 114 adds 1 to the number of motion vector predictor candidates.

If the determination result of step S171 is false (No in step S171), the motion vector predictor candidate calculation unit 114 ends the addition of the second candidate. At this time, the motion vector predictor candidate lists will be in the state shown by (b) in FIG. 15B and (b) in FIG. 16B.

It should be noted that here, a description is given assuming that the processing is performed by the motion vector predictor candidate calculation unit 114 of the moving picture coding apparatus 100, it is possible to successfully decode motion vector predictor indices by performing the same processing also in the case where the motion vector predictor candidate calculation unit 311 of the moving picture decoding apparatus 300 performs calculation to obtain the motion vector predictor candidate lists.

Next is a description of the case where the moving picture coding apparatus 100 and the moving picture decoding apparatus 300 (2) initialize the motion vector predictor candidate lists by inserting the second candidate into all the elements.

Here, FIG. 15C shows tables illustrating examples of a motion vector predictor candidate list for the prediction direction 0. FIG. 16C shows tables illustrating examples of a motion vector predictor candidate list for the prediction direction 1.

FIGS. 15C and 16C show the motion vector predictor candidate lists in each process when the motion vector predictor candidate lists are initialized by using the second candidate. FIGS. 15C and 16C each illustrate the case where the maximum value M of the number of motion vector predictor candidates is 5 (N=0 to 4).

Figure 17C:
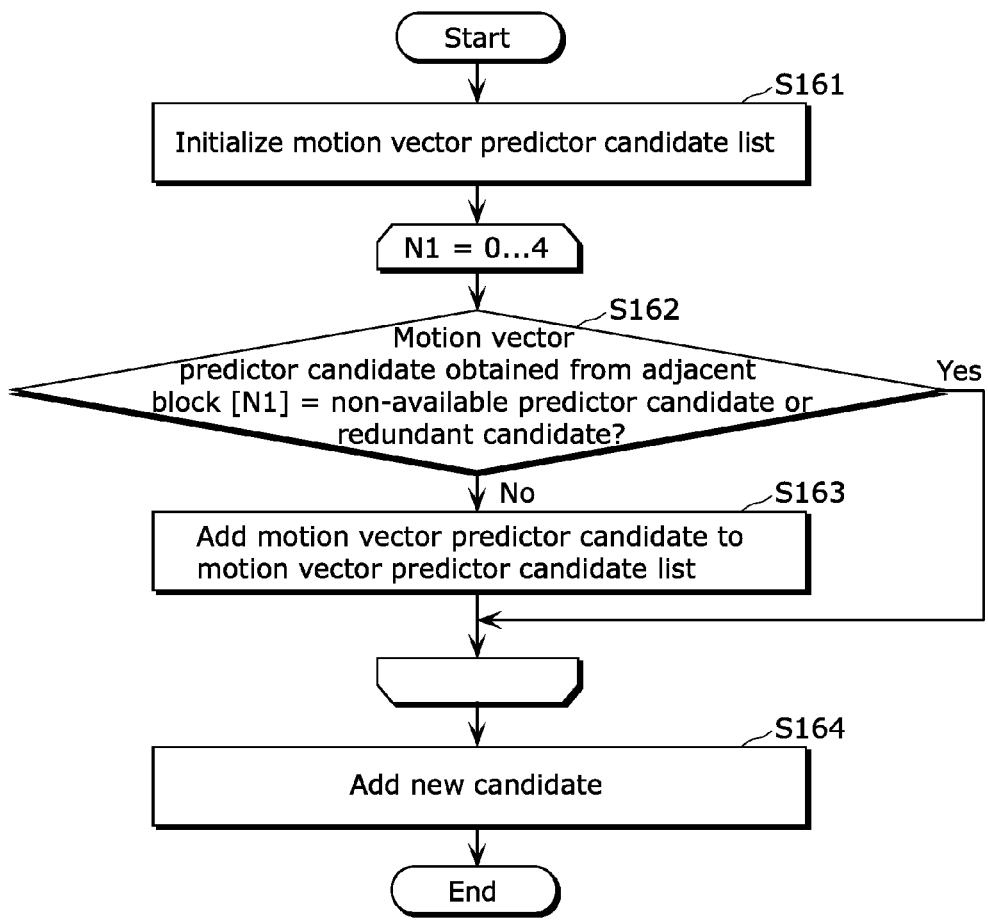
FIG. 17C is a flowchart showing processing for calculating a motion vector predictor candidate in the modification of the embodiments.

FIG. 17C is a flowchart showing the procedure of calculating a motion vector predictor candidate in the case of initializing the motion vector predictor candidate lists by using the second candidate. The calculation procedure is the processing corresponding to that of step S102 in FIG. 14 executed by the moving picture coding apparatus 100, and also corresponds to processing of step S304 in FIG. 22 executed by the moving picture decoding apparatus 300. The motion vector predictor candidate list size is fixed to the maximum value M, and thus it is not necessary to calculate the size. It should be noted that Ni in FIG. 17C denotes a value showing an adjacent block.

In step S161, the motion vector predictor candidate calculation unit 114 of the moving picture coding apparatus 100 sets the second candidate as all the motion vector predictor candidates [Ni] (Ni=0 to 4). An example of the second candidate is a motion vector predictor candidate having a motion vector whose magnitude is (0, 0).

In step S162, the motion vector predictor candidate calculation unit 114 determines whether the motion vector predictor candidate obtained from adjacent block Ni is a non-available predictor candidate or a redundant candidate.

If the determination result of step S162 is true (Yes in step S162), the determination in step S162 is made for the next adjacent block Ni. If the determination result of step S162 is false (No in step S162), in step S163, the motion vector predictor candidate calculation unit 114 obtains the motion vector predictor candidate from the adjacent block Ni, and updates a corresponding one of the motion vector predictor candidate lists. At this time, the motion vector predictor candidate calculation unit 114 assigns, to the adjacent block Ni, a motion vector predictor index having the smallest value among the motion vector predictor indices assigned to the second candidate. Then, the motion vector predictor candidate calculation unit 114 overwrites the motion vector predictor candidate having the assigned motion vector predictor index with the motion vector predictor candidate from the adjacent block Ni.

In step S164, the motion vector predictor candidate calculation unit 114 adds a new candidate to a corresponding one of the motion vector predictor candidate lists. Here, the motion vector predictor candidate calculation unit 114 adds a new candidate using the method shown in FIG. 19B.

At this time, the motion vector predictor candidate lists will be in the state shown by (c) in FIG. 15C and (c) in FIG. 16C.

It should be noted that here, a description is given assuming that processing is performed by the motion vector predictor candidate calculation unit 114 of the moving picture coding apparatus 100, it is possible to successfully decode motion vector predictor indices by performing the same processing also in the case where the motion vector predictor candidate calculation unit 311 of the moving picture decoding apparatus 300 performs calculation to obtain the motion vector predictor candidate lists.

Here, the motion vector predictor candidate list shown by (c) in FIG. 15B and the motion vector predictor candidate list shown by (b) in FIG. 15C are the same, and the motion vector predictor candidate list shown by (b) in FIG. 16B and the motion vector predictor candidate list shown by (c) in FIG. 16C are the same. Thus, it can be seen that the same motion vector predictor candidate lists can be obtained by using either one of (1) the method of assigning the second candidate to a null candidate after adding a new candidate and (2) the method of inserting the second candidate into all the elements of the motion vector predictor candidate lists to initialize the lists.

It should be noted that although the present modification shows an example in which the motion vector predictor candidate having a motion vector (0, 0) is assigned as the second candidate, the present disclosure is not limited to this. For example, a motion vector predictor candidate assigned to another motion vector predictor index may be copied. Furthermore, a candidate may be generated from motion vector predictor candidates assigned to other motion vector predictor indexes, by averaging the magnitude of motion vectors of motion vector predictor candidates assigned to other motion vector predictor indices, for instance.

It should be noted that the above modification describes, as a method of assigning the second candidate, (1) the method of assigning the second candidate to a null candidate after adding a new candidate (third candidate) and (2) a method of inserting the second candidate into all the elements of the motion vector predictor candidate lists to initialize the lists, the present disclosure is not limited to this.

For example, in step S305 in FIG. 22, the motion vector predictor candidate calculation unit 311 of the moving picture decoding apparatus 300 may add, only in the case where an element indicated by the decoded motion vector predictor index is a null element, the second candidate only to that null element, rather than creating motion vector predictor candidate lists having no null elements. In this case, it is possible to reduce the amount of processing.

In addition, for example, in step S305 in FIG. 22, the motion vector predictor candidate calculation unit 311 determines whether the decoded motion vector predictor index is greater than or equal to the largest value of motion vector predictor indices, and if the determination result is true, the second candidate may be assigned. Alternatively, for example, in step S305 in FIG. 22, the motion vector predictor candidate calculation unit 311 determines whether the decoded motion vector predictor index is greater than or equal to the largest value of motion vector predictor indices, and if the determination result is true, clipping processing may be performed on the value of the decoded motion vector predictor index, using the largest value of the motion vector predictor indices such that the decoded motion vector predictor index has a value smaller than the largest value of the motion vector predictor indices.

For example, in the moving picture decoding apparatus 300, if an error occurs in deleting a redundant candidate from motion vector predictor candidates, a state in which a motion vector predictor candidate is not assigned to a decoded motion vector predictor index may occur even if a motion vector predictor index can be decoded successfully by handling a packet loss which results in a loss of information of a co-located block. Furthermore, for example, the moving picture coding apparatus 100 adds, by mistake, a motion vector predictor index having a value greater than or equal to the number of motion vector predictor candidates to a bitstream, a state may occur in which a motion vector predictor candidate is not assigned to the decoded motion vector predictor index.

In the above modification, the second candidate is assigned to a null element of the motion vector predictor candidate lists, and thus a state can be avoided in which a motion vector predictor candidate is not assigned to a motion vector predictor index.

Embodiment 3

The processing described in each of embodiments can be simply implemented in an independent computer system, by recording, in a recording medium, a program for implementing the configurations of the moving picture coding method (image coding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture coding method (image coding method) and the moving picture decoding method (image decoding method) described in each of embodiments and systems using thereof will be described. The system has a feature of having an image coding and decoding apparatus that includes an image coding apparatus using the image coding method and an image decoding apparatus using the image decoding method. Other configurations in the system can be changed as appropriate depending on the cases.

Figure 28:
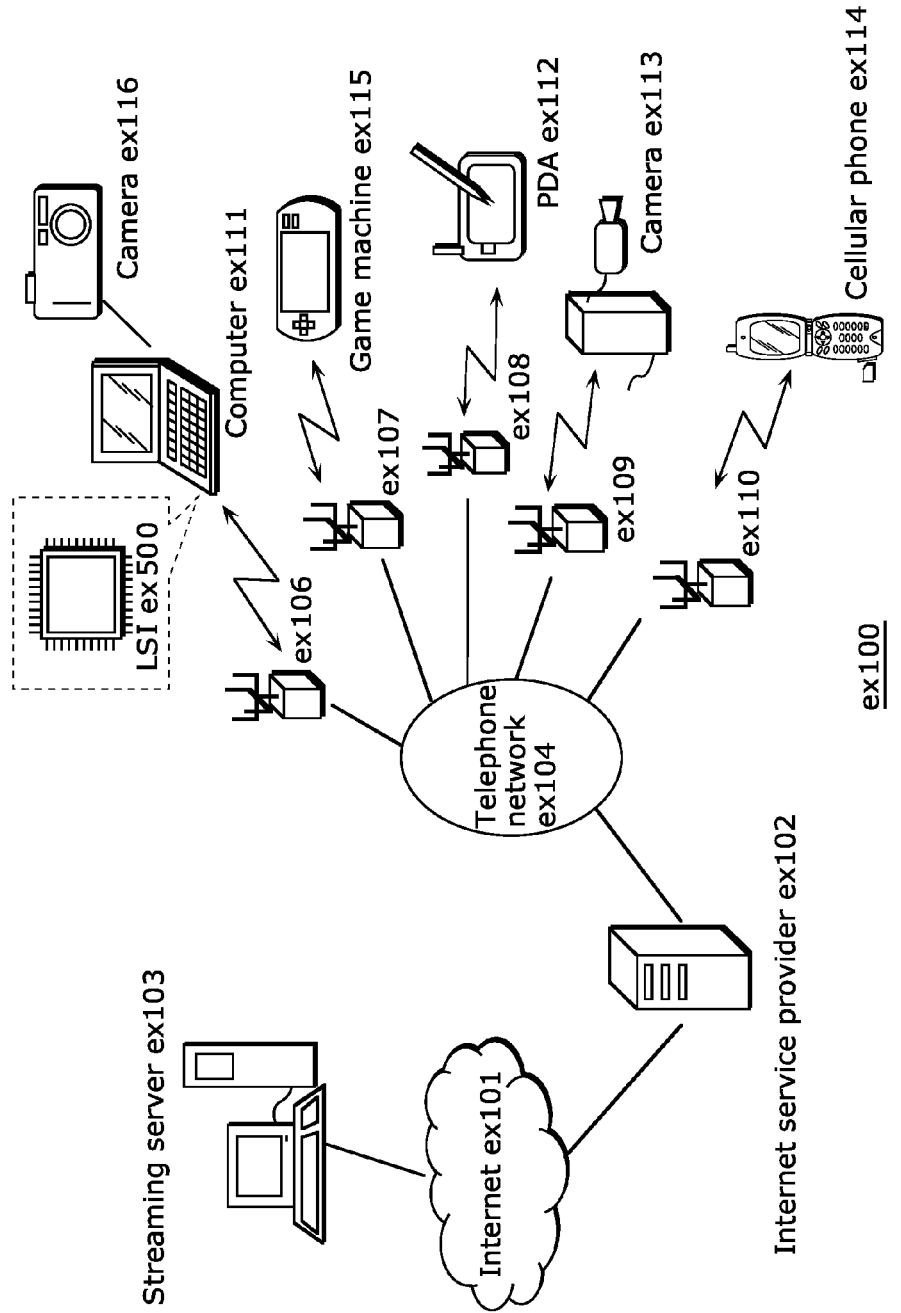
FIG. 28 shows an overall configuration of a content providing system for implementing content distribution services.

FIG. 28 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 28, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of embodiments (i.e., the camera functions as the image coding apparatus according to an aspect of the present disclosure), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (i.e., functions as the image decoding apparatus according to an aspect of the present disclosure).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 29:
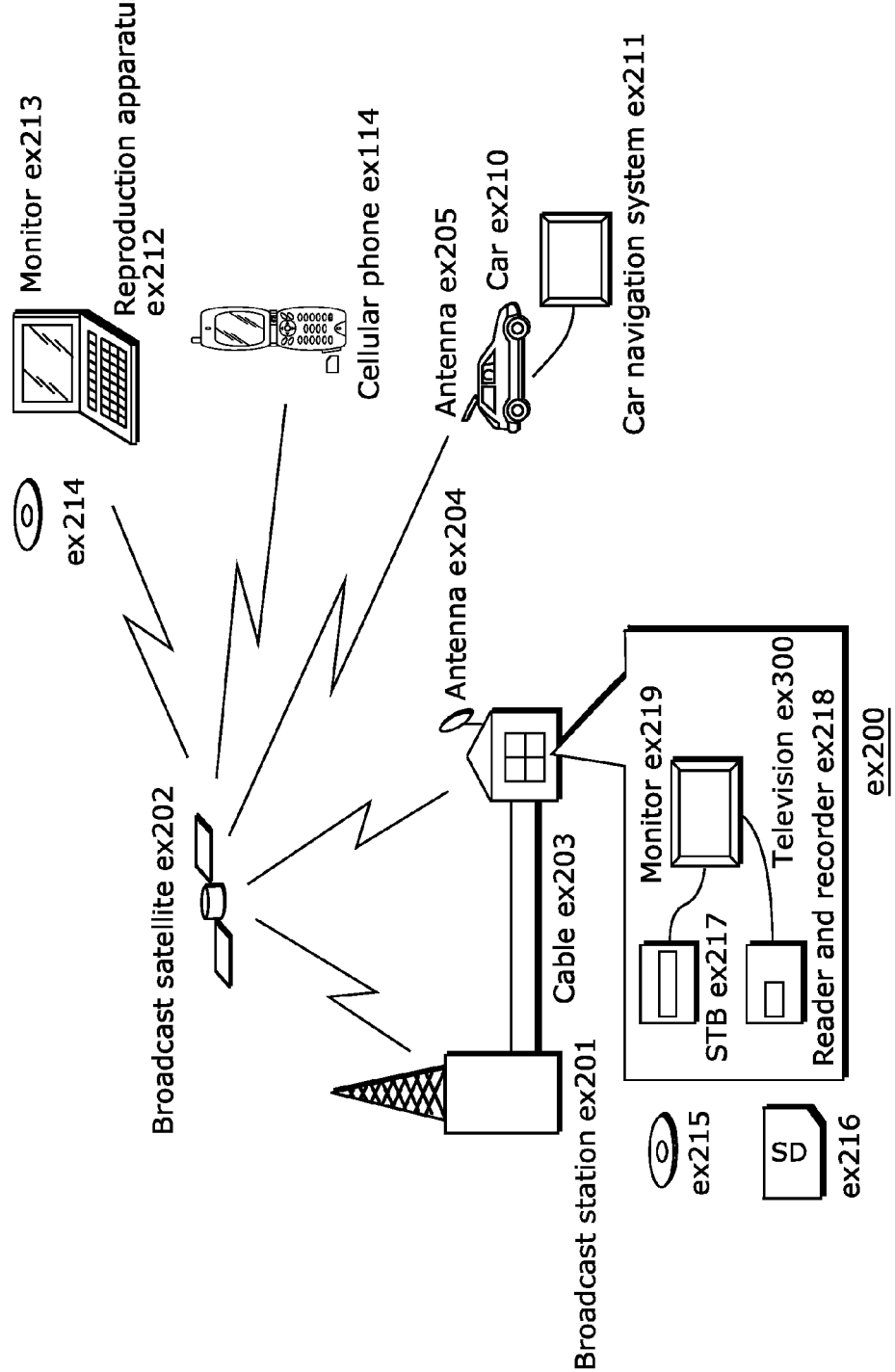
FIG. 29 shows an overall configuration of a digital broadcasting system.

Aside from the example of the content providing system ex100, at least one of the moving picture coding apparatus (image coding apparatus) and the moving picture decoding apparatus (image decoding apparatus) described in each of embodiments may be implemented in a digital broadcasting system ex200 illustrated in FIG. 29. More specifically, a broadcast station ex201 communicates or transmits, via radio waves to a broadcast satellite ex202, multiplexed data obtained by multiplexing audio data and others onto video data. The video data is data coded by the moving picture coding method described in each of embodiments (i.e., data coded by the image coding apparatus according to an aspect of the present disclosure). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present disclosure).

Furthermore, a reader/recorder ex218 (i) reads and decodes the multiplexed data recorded on a recording medium ex215, such as a DVD and a BD, or (i) codes video signals in the recording medium ex215, and in some cases, writes data obtained by multiplexing an audio signal on the coded data. The reader/recorder ex218 can include the moving picture decoding apparatus or the moving picture coding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 30:
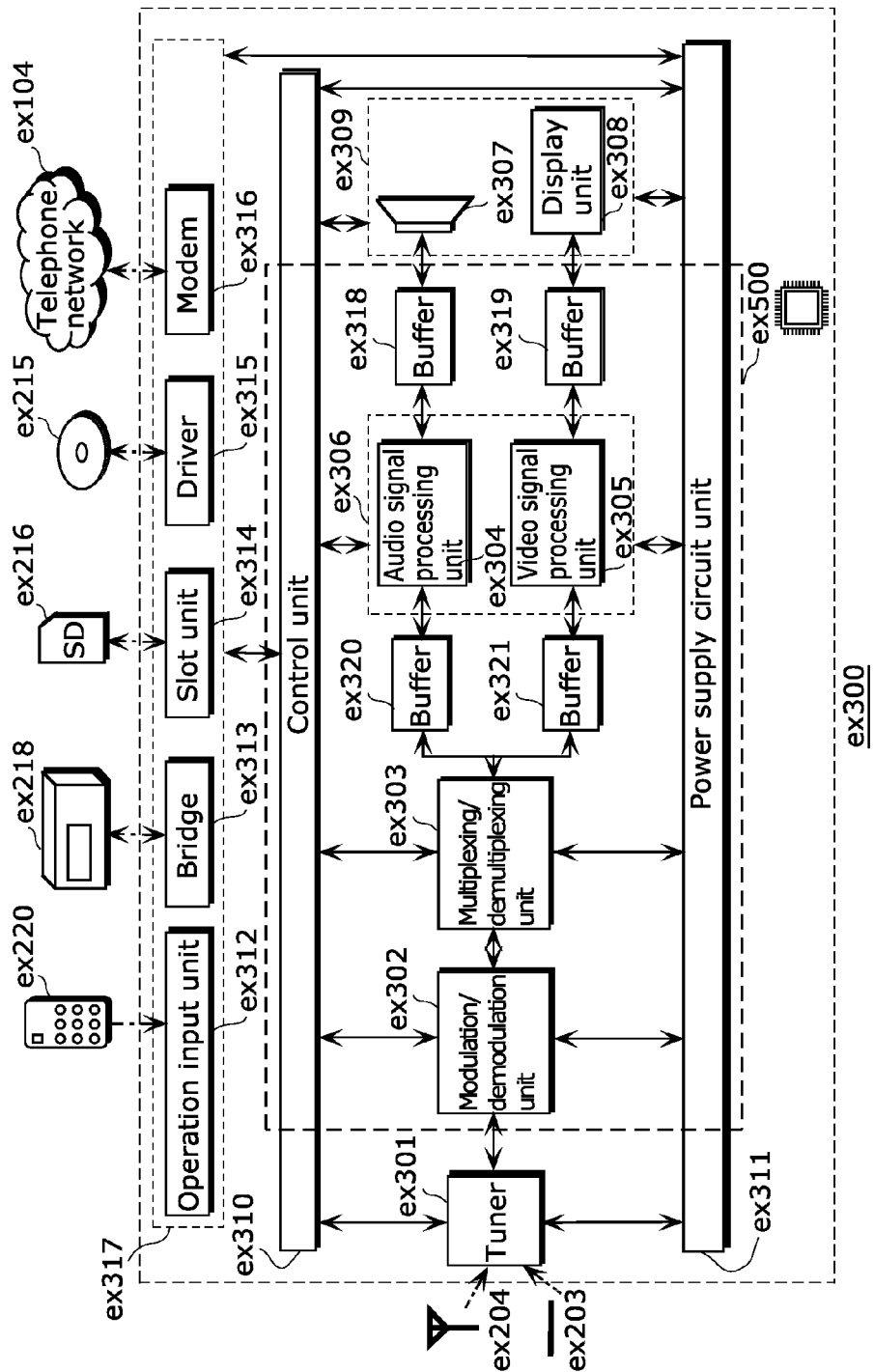
FIG. 30 shows a block diagram illustrating an example of a configuration of a television.

FIG. 30 illustrates the television (receiver) ex300 that uses the moving picture coding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively (which function as the image coding apparatus and the image decoding apparatus according to the aspects of the present disclosure); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 31:
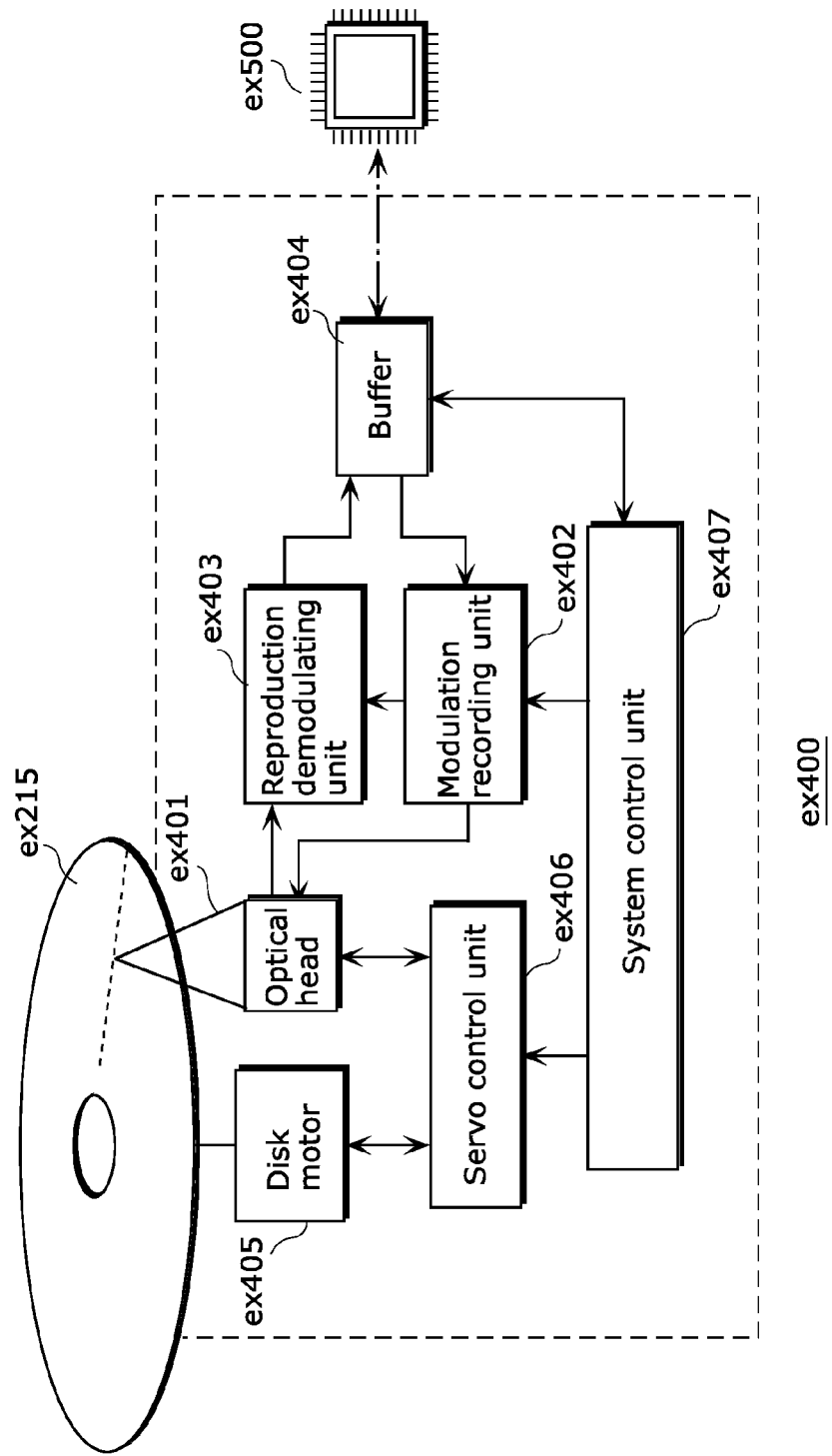
FIG. 31 shows a block diagram illustrating an example of a configuration of an information reproducing/recording unit that reads and writes information from and on a recording medium that is an optical disk.

As an example, FIG. 31 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 32:
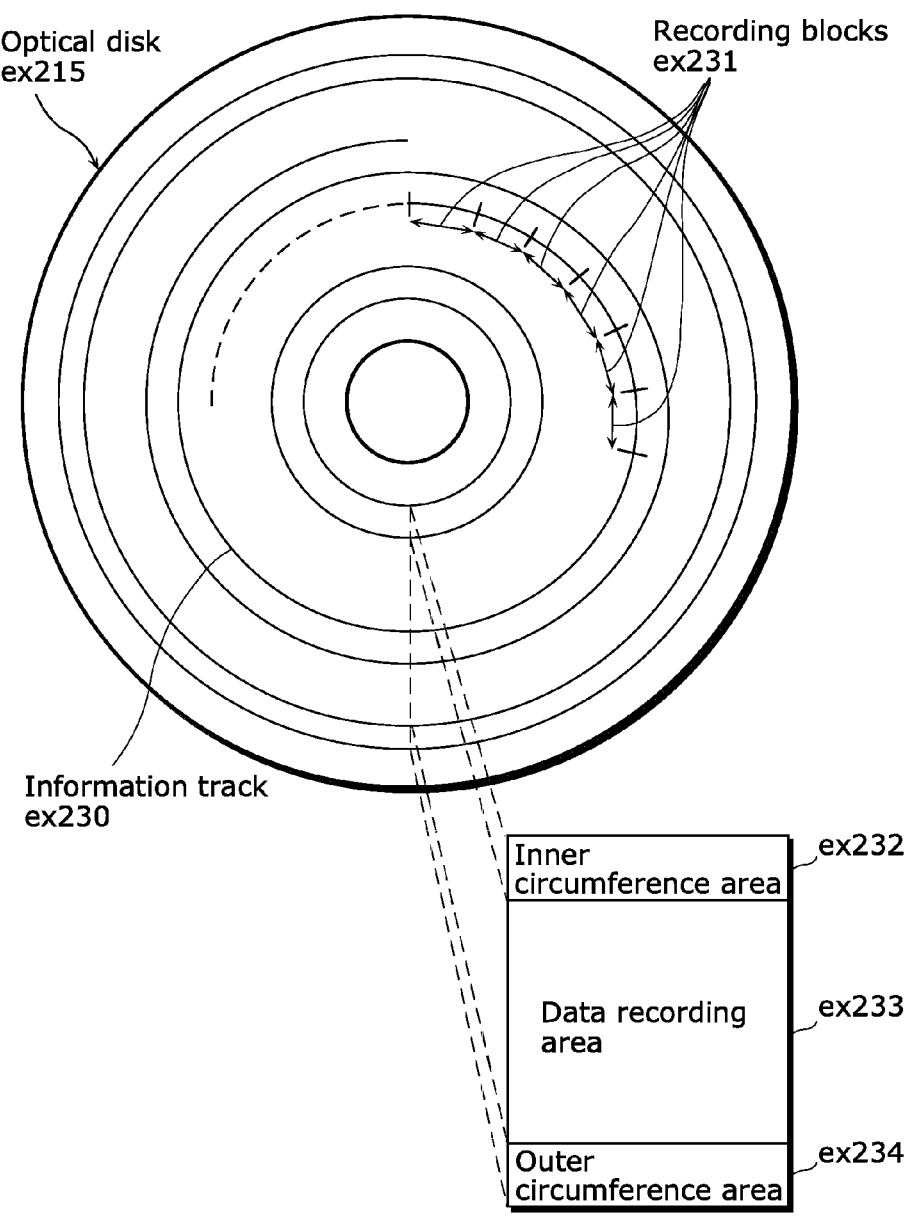
FIG. 32 shows an example of a configuration of a recording medium that is an optical disk.

FIG. 32 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 30. The same will be true for the configuration of the computer ex111, the cellular phone ex114, and others.

Figure 33A:
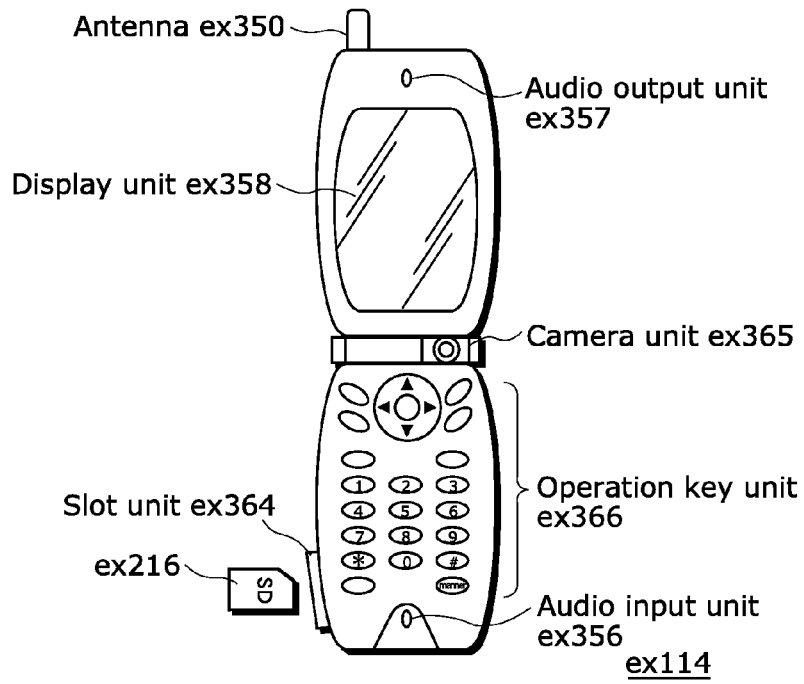
FIG. 33A shows an example of a cellular phone.

FIG. 33A illustrates the cellular phone ex114 that uses the moving picture coding method and the moving picture decoding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Figure 33B:
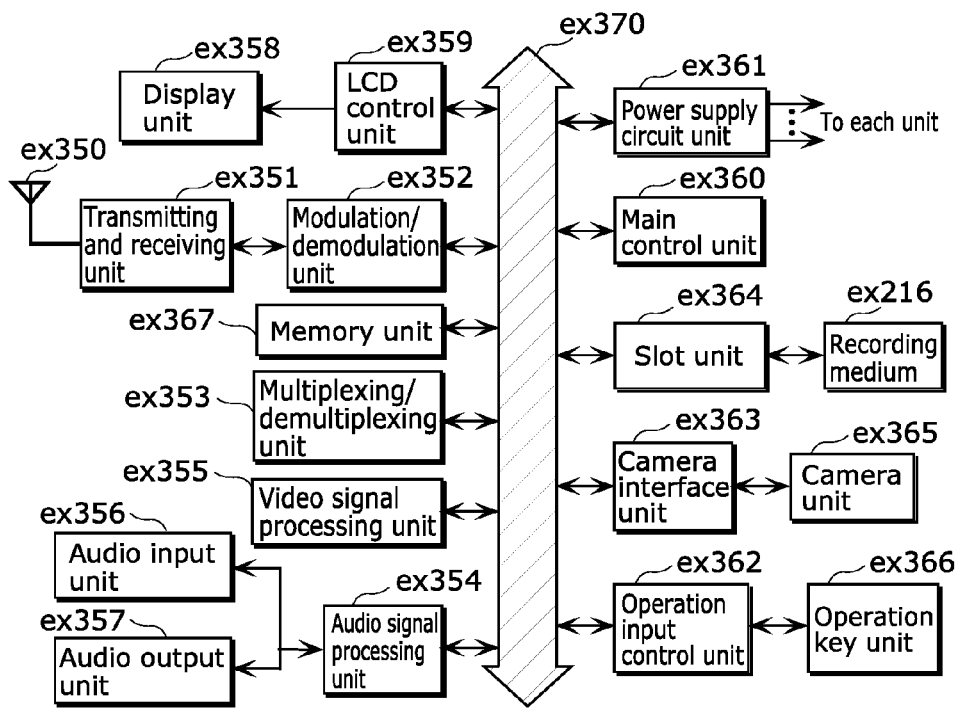
FIG. 33B is a block diagram showing an example of a configuration of a cellular phone.

Next, an example of a configuration of the cellular phone ex114 will be described with reference to FIG. 33B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of embodiments (i.e., functions as the image coding apparatus according to the aspect of the present disclosure), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of embodiments (i.e., functions as the image decoding apparatus according to the aspect of the present disclosure), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of embodiments can be used in any of the devices and systems described. Thus, the advantages described in each of embodiments can be obtained.

Furthermore, various modifications and revisions can be made in any of the embodiments in the present disclosure.

Embodiment 4

Video data can be generated by switching, as necessary, between (i) the moving picture coding method or the moving picture coding apparatus shown in each of embodiments and (ii) a moving picture coding method or a moving picture coding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conform cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of embodiments will be hereinafter described. The multiplexed data is a digital stream in the MPEG-2 Transport Stream format.

FIG. 34 illustrates a structure of the multiplexed data. As illustrated in FIG. 34, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of embodiments, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 35:
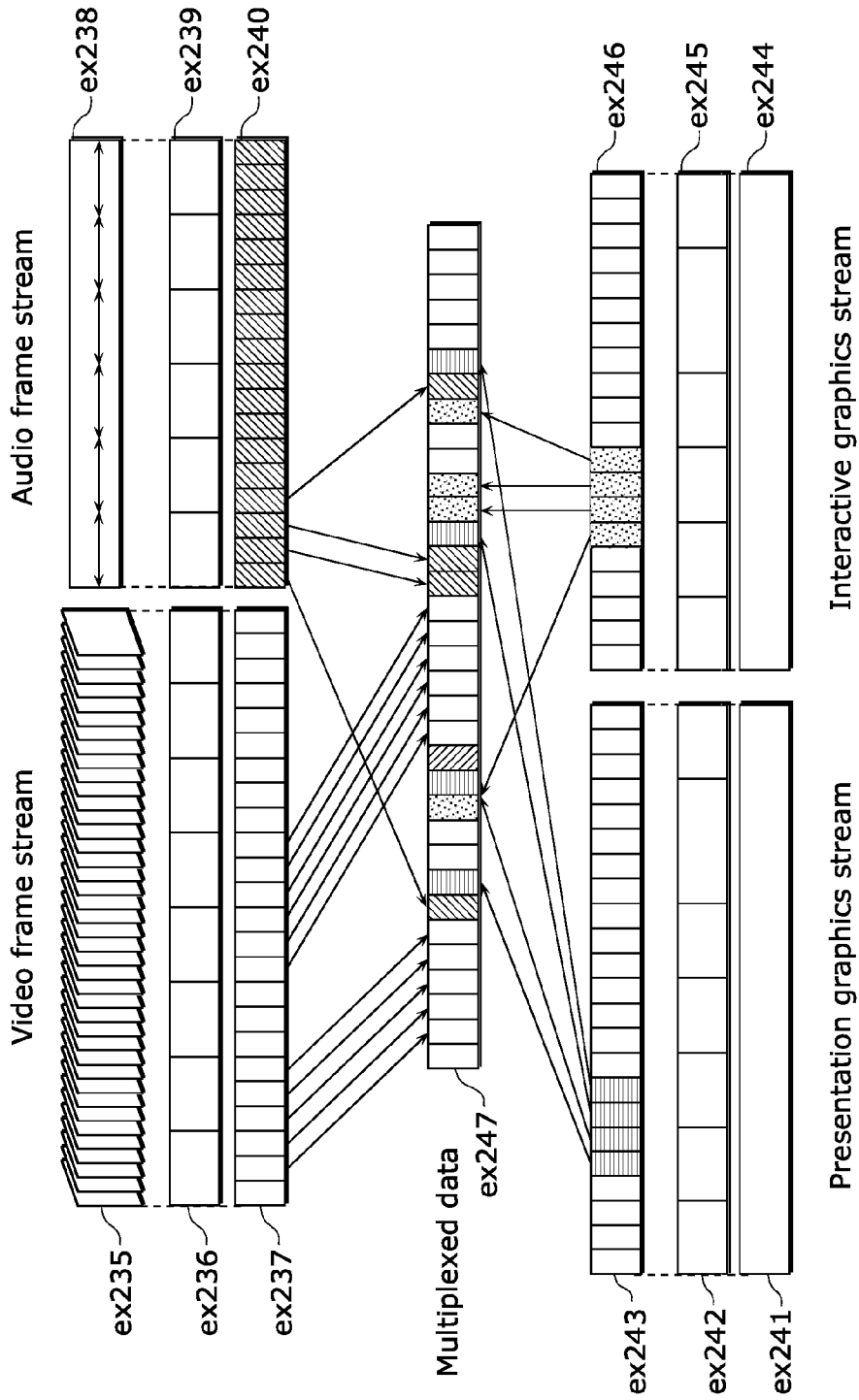
FIG. 35 schematically shows how each stream is multiplexed in multiplexed data.

FIG. 35 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 36:
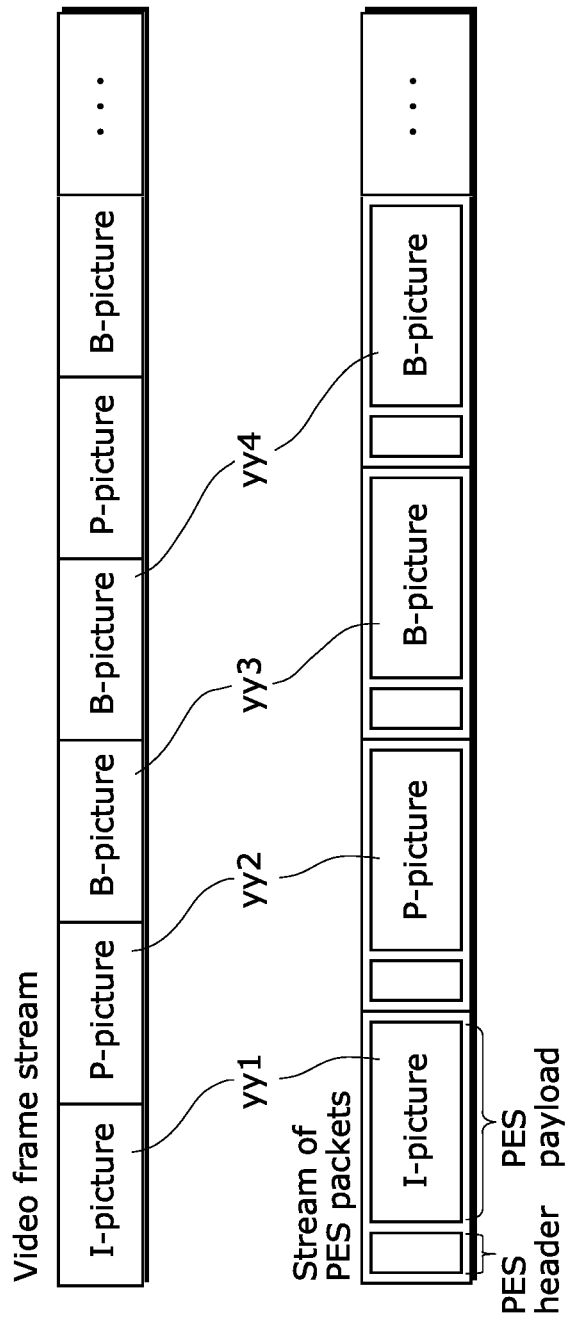
FIG. 36 shows how a video stream is stored in a stream of PES packets in more detail.

FIG. 36 illustrates how a video stream is stored in a stream of PES packets in more detail. The first bar in FIG. 36 shows a video frame stream in a video stream. The second bar shows the stream of PES packets. As indicated by arrows denoted as yy1, yy2, yy3, and yy4 in FIG. 36, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

FIG. 37 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 37. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 38:
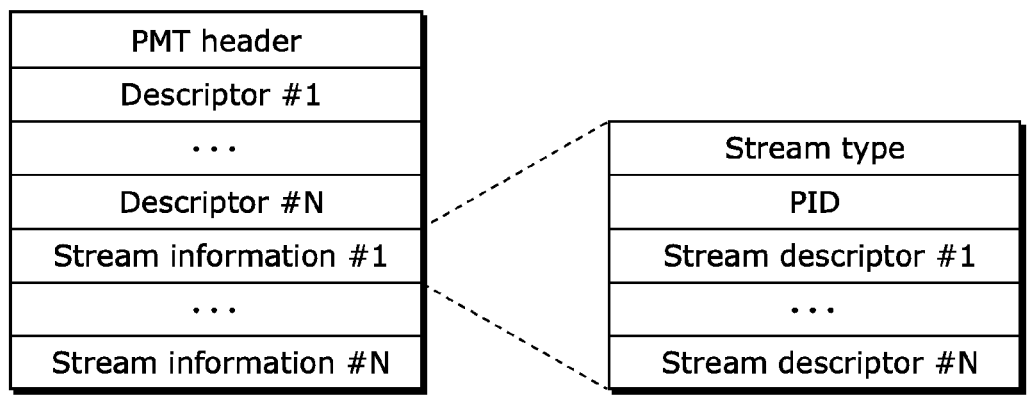
FIG. 38 shows a data structure of a PMT.

FIG. 38 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 39:
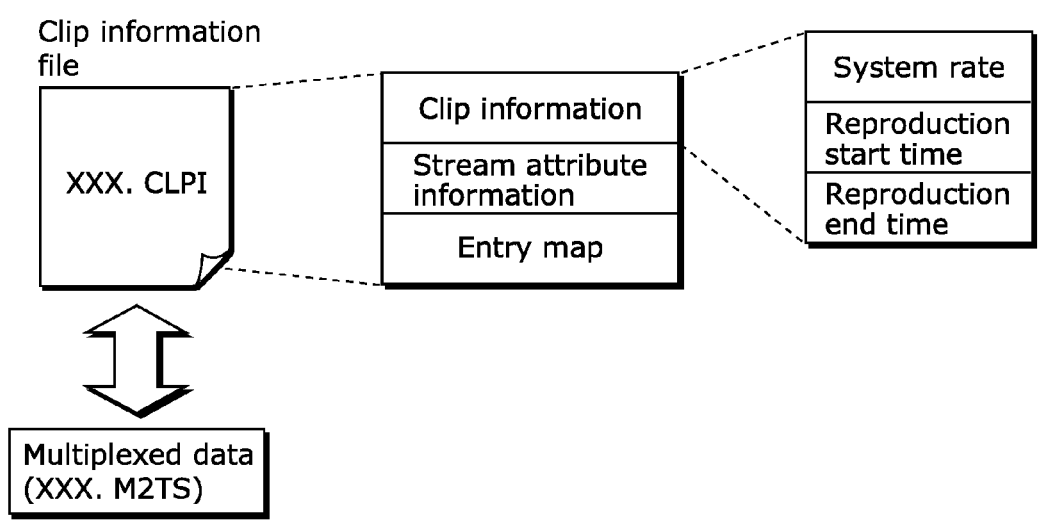
FIG. 39 shows an internal structure of multiplexed data information.

Each of the multiplexed data information files is management information of the multiplexed data as shown in FIG. 39. The multiplexed data information files are in one to one correspondence with the multiplexed data, and each of the files includes multiplexed data information, stream attribute information, and an entry map.

As illustrated in FIG. 39, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 40:
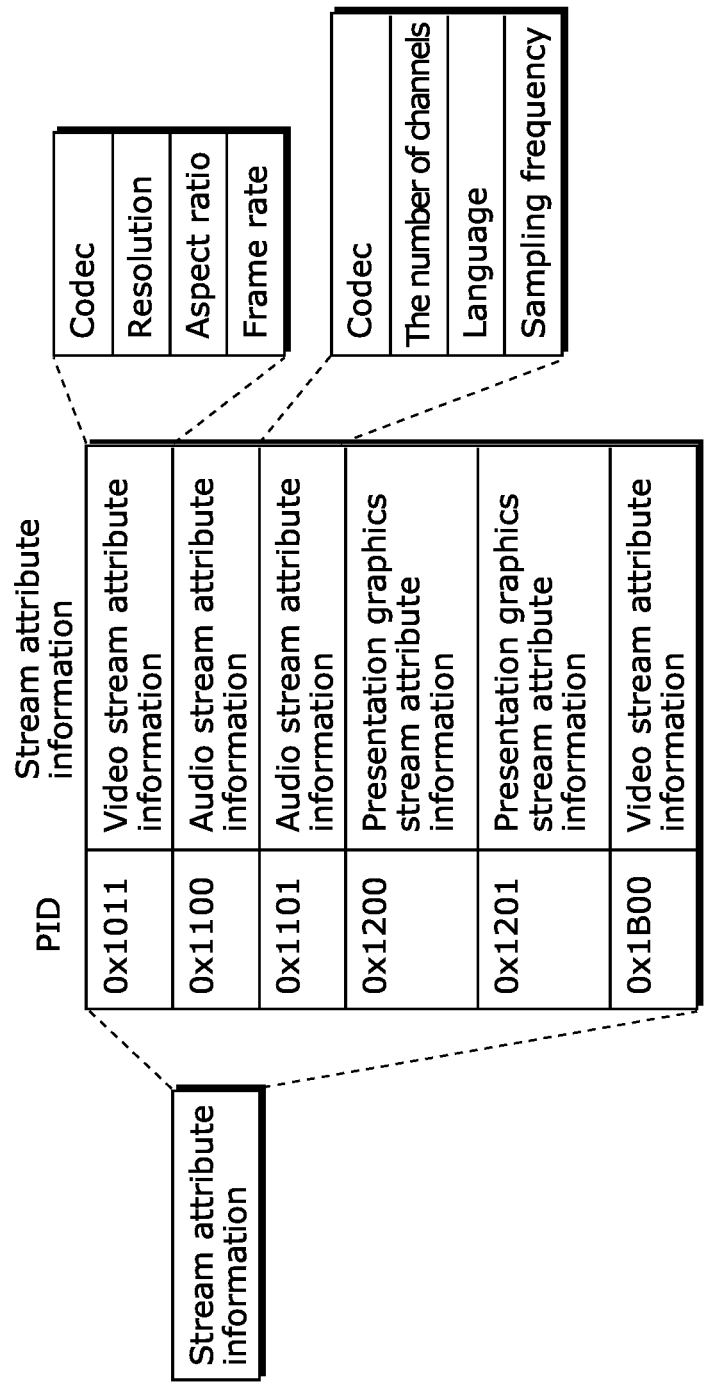
FIG. 40 shows an internal structure of stream attribute information.

As shown in FIG. 40, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of embodiments includes a step or a unit for allocating unique information indicating video data generated by the moving picture coding method or the moving picture coding apparatus in each of embodiments, to the stream type included in the PMT or the video stream attribute information. With the configuration, the video data generated by the moving picture coding method or the moving picture coding apparatus described in each of embodiments can be distinguished from video data that conforms to another standard.

Figure 41:
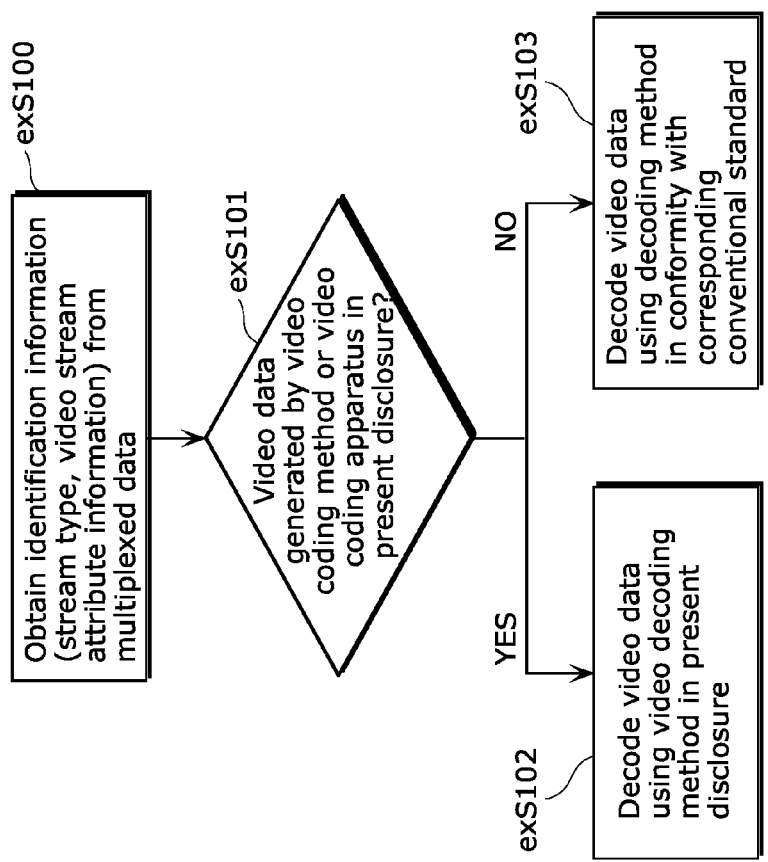
FIG. 41 shows steps for identifying video data.

Furthermore, FIG. 41 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture coding method or the moving picture coding apparatus in each of embodiments. When it is determined that the stream type or the video stream attribute information indicates that the multiplexed data is generated by the moving picture coding method or the moving picture coding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture coding method or apparatus, or the moving picture decoding method or apparatus in the present Embodiment 5 an be used in the devices and systems described above.

Embodiment 5

Figure 42:
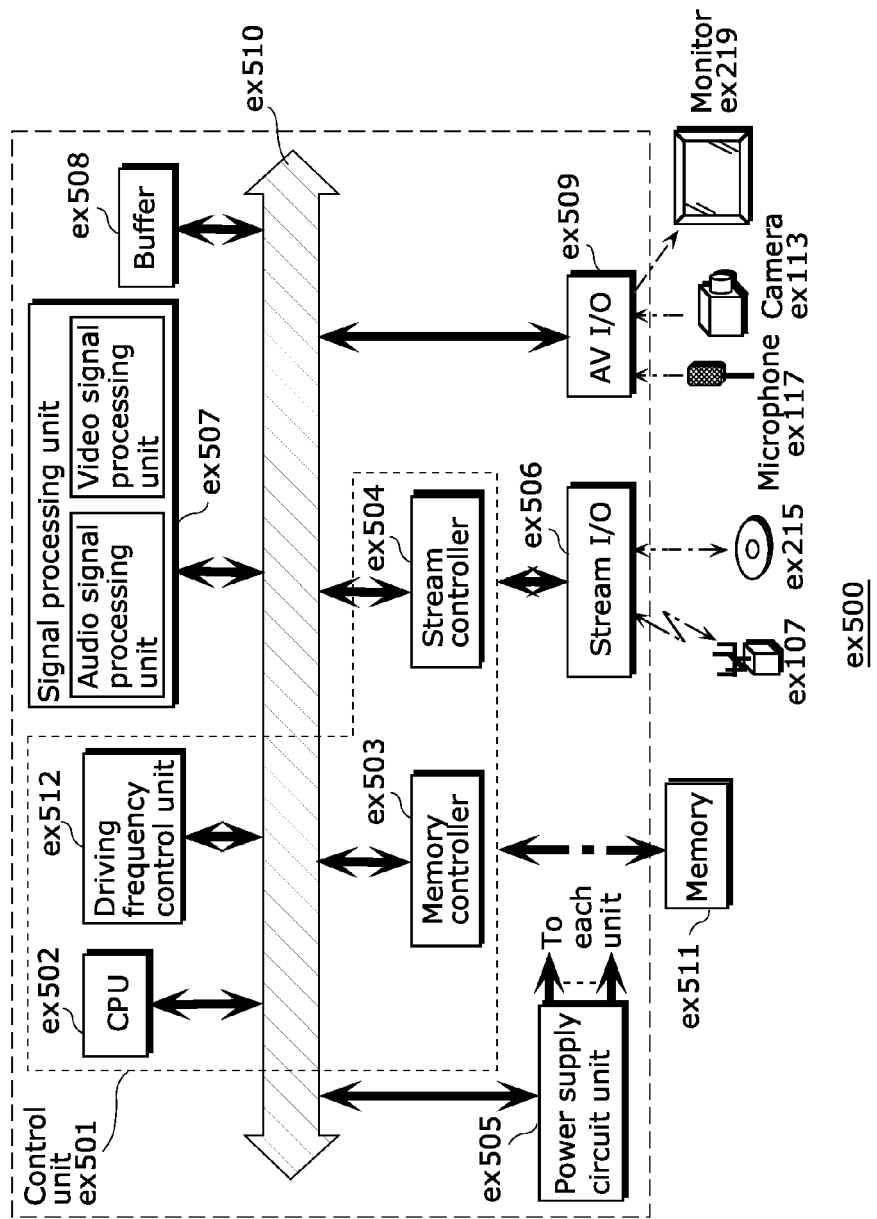
FIG. 42 shows an example of a configuration of an integrated circuit for implementing the moving picture coding method and the moving picture decoding method according to each of embodiments.

Each of the moving picture coding method, the moving picture coding apparatus, the moving picture decoding method, and the moving picture decoding apparatus in each of embodiments is typically achieved in the form of an integrated circuit or a Large Scale Integrated (LSI) circuit. As an example of the LSI, FIG. 42 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of, an LSI can be used for the same purpose.

In the future, with advancement in semiconductor technology, a brand-new technology may replace LSI. The functional blocks can be integrated using such a technology. The possibility is that the present disclosure is applied to biotechnology.

Embodiment 6

When video data generated in the moving picture coding method or by the moving picture coding apparatus described in each of embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 43:
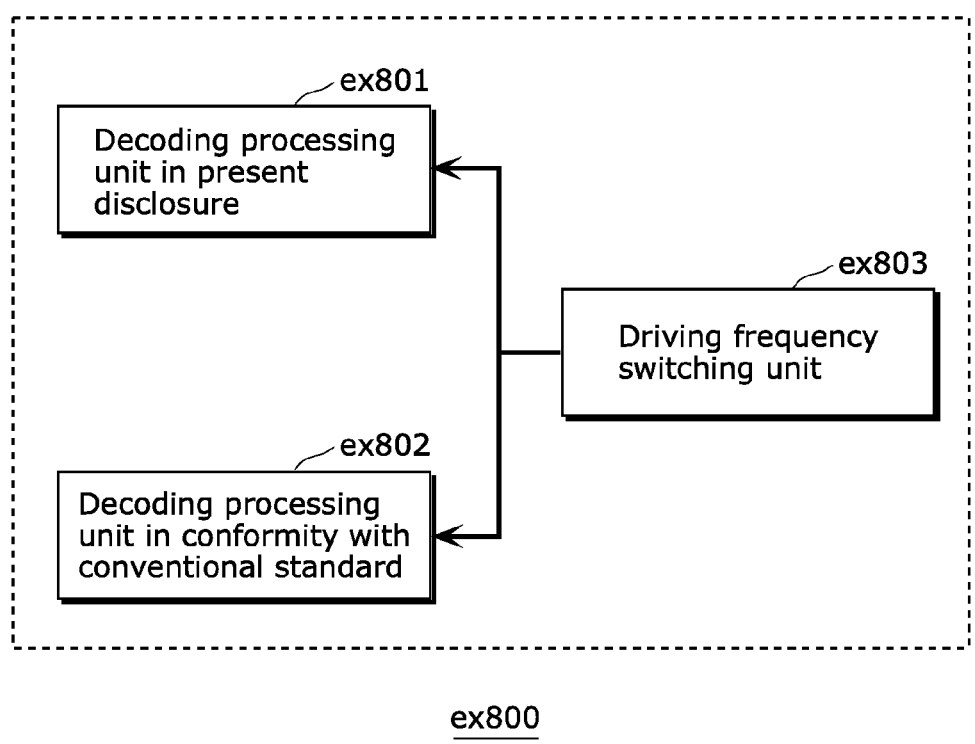
FIG. 43 shows a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 43 illustrates a configuration ex800 in the present embodiment. A driving frequency switching unit ex803 sets a driving frequency to a higher driving frequency when video data is generated by the moving picture coding method or the moving picture coding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 42. Here, each of the decoding processing unit ex801 that executes the moving picture decoding method described in each of embodiments and the decoding processing unit ex802 that conforms to the conventional standard corresponds to the signal processing unit ex507 in FIG. 42. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment 4 is probably used for identifying the video data. The identification information is not limited to the one described in Embodiment 4 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 45. The driving frequency can be selected by storing the look-up table in the buffer ex508 and in an internal memory of an LSI, and with reference to the look-up table by the CPU ex502.

Figure 44:
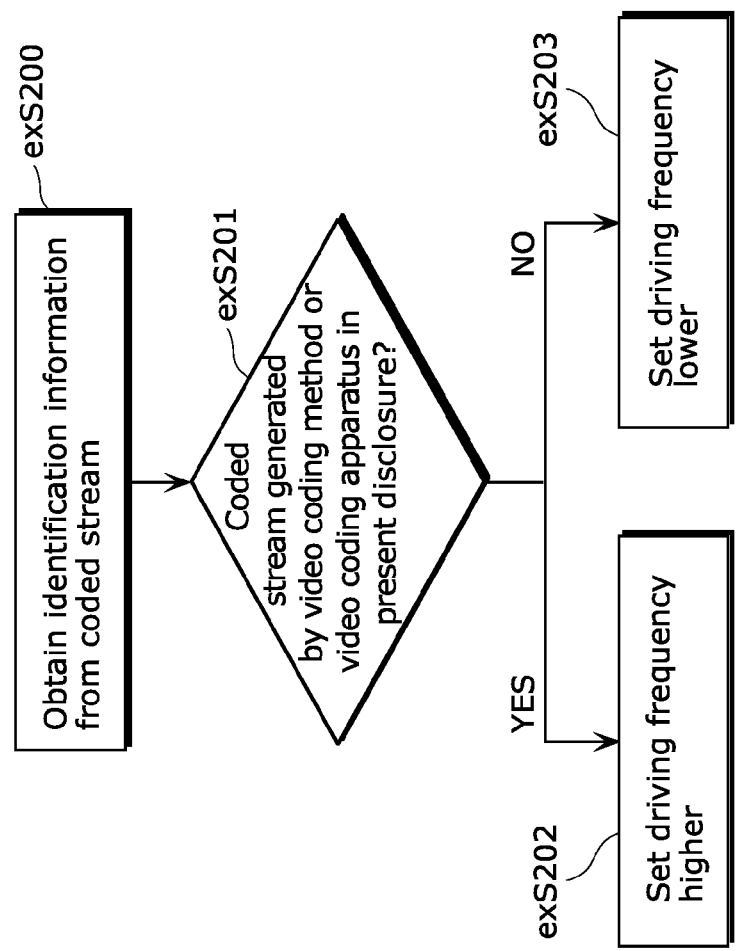
FIG. 44 shows steps for identifying video data and switching between driving frequencies.

FIG. 44 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of embodiments, based on the identification information. When the video data is generated by the moving picture coding method and the moving picture coding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture coding method and the moving picture coding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture coding method and the moving picture coding apparatus described in each of embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture coding method and the moving picture coding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 7

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

Figure 46A:
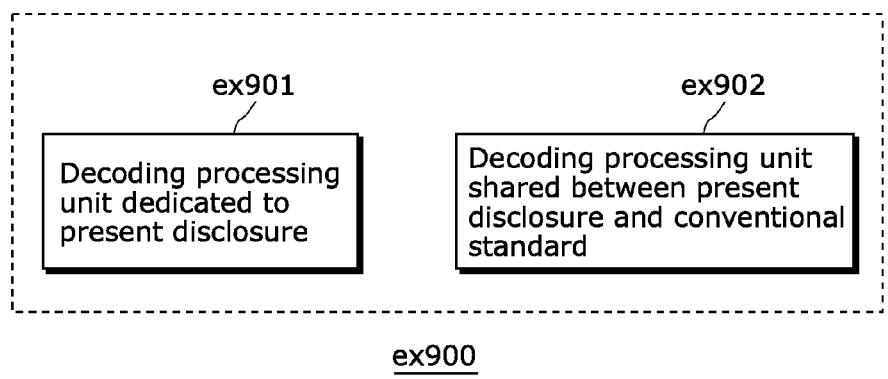
FIG. 46A is a diagram showing an example of a configuration for sharing a module of a signal processing unit.

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 46A shows an example of the configuration. For example, the moving picture decoding method described in each of embodiments and the moving picture decoding method that conforms to MPEG-4 AVC have, partly in common, the details of processing, such as entropy coding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing unique to an aspect of the present disclosure. The decoding processing unit for implementing the moving picture decoding method described in each of embodiments may be shared for the processing to be shared, and a dedicated decoding processing unit may be used for processing unique to that of MPEG-4 AVC.

Figure 46B:
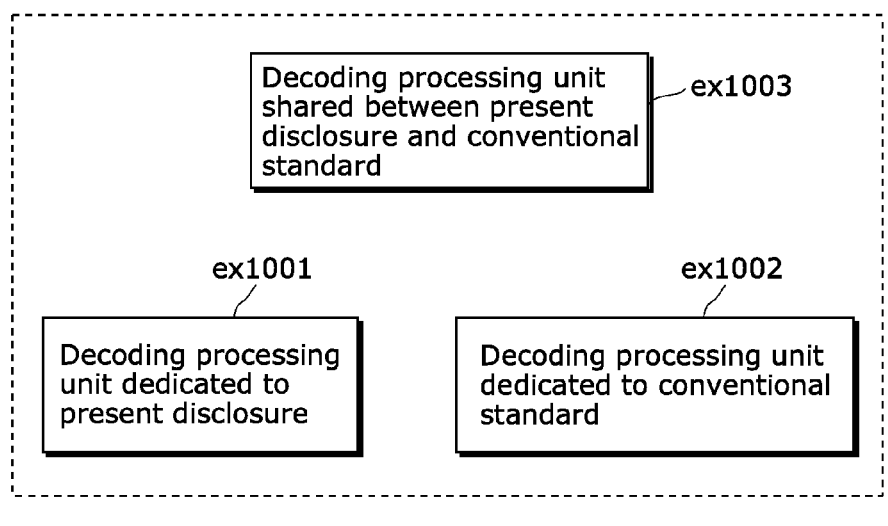
FIG. 46B is a diagram showing another example of a configuration for sharing a module of the signal processing unit.

Furthermore, ex1000 in FIG. 46B shows another example in that processing is partly shared. This example uses a configuration including a dedicated decoding processing unit ex1001 that supports the processing unique to an aspect of the present disclosure, a dedicated decoding processing unit ex1002 that supports the processing unique to another conventional standard, and a decoding processing unit ex1003 that supports processing to be shared between the moving picture decoding method according to the aspect of the present disclosure and the conventional moving picture decoding method. Here, the dedicated decoding processing units ex1001 and ex1002 are not necessarily specialized for the processing according to the aspect of the present disclosure and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present disclosure and the moving picture decoding method in conformity with the conventional standard.

INDUSTRIAL APPLICABILITY

The moving picture coding method and the moving picture decoding method according to the present disclosure are applicable to any multimedia data, and can improve error resistance in coding and decoding moving pictures. The moving picture coding method and the moving picture decoding method according to the present disclosure are useful as a moving picture coding method and a moving picture decoding method in storage, transmission, communication, and the like using cellular phones, DVD apparatuses, and personal computers, for example.

What is claimed is:

1. A method for decoding a current block included in a bitstream, the method comprising:
   generating, in a memory, a candidate list including a fixed number of candidates for a motion vector to be used for decoding the current block;
   decoding an index, included in the bitstream, identifying one candidate in the candidate list;
   selecting, based on the decoded index, the candidate;
   predicting the current block using the selected candidate; and
   generating an image using the predicted current block,
   wherein the generating the candidate list includes:
      adding, into the candidate list, one or more candidates of a first type for the motion vector for the current block, each of the candidates of the first type being derived from a first motion vector of a first block that is adjacent to the current block; and
      adding, into the candidate list, one or more candidates of a second type for the motion vector for the current block, each of the candidates of the second type being derived from a second motion vector of a second block that is different from each first block when a total number of the candidates of the first type is less than the fixed number, the candidates of the second type being added until a total number of the candidates of the first type and the candidates of the second type reaches the fixed number, the candidates of the second type being different from the candidates of the first type,
   wherein only the one or more candidates of the first type are added to the candidate list before the one or more candidates of the second type are added to the candidate list.

2. An apparatus for decoding a current block included in a bitstream, the apparatus comprising:
   a processor; and
   a non-transitory storage, wherein the processor performs, using the non-transitory storage, processes including:
      generating a candidate list including a fixed number of candidates for a motion vector to be used for decoding the current block;
      decoding an index, included in the bitstream, identifying one candidate in the candidate list;
      selecting, based on the decoded index, the candidate;
      predicting the current block using the selected candidate; and
      generating an image using the predicted current block,
      wherein the generating the candidate list includes:
         adding, into the candidate list, one or more candidates of a first type for the motion vector for the current block, each of the candidates of the first type being derived from a first motion vector of a first block that is adjacent to the current block; and
         adding, into the candidate list, one or more candidates of a second type for the motion vector for the current block, each of the candidates of the second type of being derived from a second motion vector of a second block that is different from each first block when a total number of the candidates of the first type is less than the fixed number, the candidates of the second type being added until a total number of the candidates of the first type and the candidates of the second type reaches the fixed number, the candidates of the second type being different from the candidates of the first type,
      wherein only the one or more candidates of the first type are added to the candidate list before the one or more candidates of the second type are added to the candidate list.

* * * * *